(12) United States Patent
McComb

(10) Patent No.: US 11,549,523 B2
(45) Date of Patent: Jan. 10, 2023

(54) AUTOMATIC FLUID PUMP INLET STABILIZERS AND VACUUM REGULATORS

(71) Applicant: BLACOH FLUID CONTROLS, INC., Riverside, CA (US)

(72) Inventor: David Dean McComb, Highland, CA (US)

(73) Assignee: BLACOH FLUID CONTROLS, INC., Riverside, CA (US)

( * ) Notice: Subject to any disclaimer, the term of this patent is extended or adjusted under 35 U.S.C. 154(b) by 0 days.

(21) Appl. No.: 17/660,511

(22) Filed: Apr. 25, 2022

(65) Prior Publication Data

US 2022/0341406 A1 Oct. 27, 2022

Related U.S. Application Data

(60) Provisional application No. 63/180,393, filed on Apr. 27, 2021.

(51) Int. Cl.
*F15B 1/02* (2006.01)
*F04B 11/00* (2006.01)
(Continued)

(52) U.S. Cl.
CPC .......... *F15B 1/021* (2013.01); *F04B 11/0016* (2013.01); *F04B 23/08* (2013.01);
(Continued)

(58) Field of Classification Search
CPC .... F04B 7/0015; F04B 9/127; F04B 11/0016; F04B 43/073; F04B 53/109;
(Continued)

(56) References Cited

U.S. PATENT DOCUMENTS 461,997 A 10/1891 Choen
916,136 A 3/1909 Ford
(Continued)

FOREIGN PATENT DOCUMENTS

DE 804 635 C 4/1951
DE 10116698 A1 10/2002
(Continued)

OTHER PUBLICATIONS

Blacoh Fluid Control, Sentry XP Series.
Hidracar, A., "Can you Recognize a Good Design?," Pumps and Systems, Oct. 2016.

*Primary Examiner* — Kenneth Bomberg
*Assistant Examiner* — Matthew Wiblin
(74) *Attorney, Agent, or Firm* — Knobbe, Martens, Olson & Bear, LLP

(57) ABSTRACT

A fluid pump inlet stabilizer dampener includes a deformable diaphragm separating an enclosure into a gas chamber and a liquid chamber; and a piston coupled to the deformable diaphragm and being movable with respect to a valve housing, wherein the piston is configured to be positioned in at least first, second, and third positions, wherein in the first position a first fluid flow path from a pressurized gas inlet port to the gas chamber is open, in the second position the first fluid flow path is closed, and in the third position the first fluid flow path is closed and a second fluid flow path that activates a venturi vacuum generator is open.

30 Claims, 25 Drawing Sheets

(51) Int. Cl.
  *F04B 53/10* (2006.01)
  *F16L 55/053* (2006.01)
  *F04B 23/08* (2006.01)
  *F15B 1/24* (2006.01)

(52) U.S. Cl.
  CPC .............. *F04B 53/106* (2013.01); *F15B 1/24* (2013.01); *F16L 55/053* (2013.01); *F15B 2201/31* (2013.01)

(58) Field of Classification Search
  CPC .................. F04B 53/1092; F15B 1/021; F15B 2201/4155; F16L 55/053
  See application file for complete search history.

(56) References Cited

U.S. PATENT DOCUMENTS

| | | |
|---|---|---|
| 1,648,046 A | 11/1927 | Fulton |
| D96,405 S | 7/1935 | Murphy |
| 2,261,948 A | 11/1941 | Beach |
| 2,341,556 A | 2/1944 | Joy |
| 2,504,424 A | 4/1950 | Kraak |
| 2,523,826 A | 9/1950 | Heinzelman |
| D160,948 S | 11/1950 | Kisling |
| 2,540,424 A | 2/1951 | Bures et al. |
| D162,663 S | 3/1951 | Kisling |
| D163,483 S | 5/1951 | Reichelderfer et al. |
| 2,593,316 A | 4/1952 | Kraft |
| 2,633,146 A | 3/1953 | Witt |
| 2,638,932 A | 5/1953 | Lee |
| 2,677,393 A | 5/1954 | Cornelius |
| 2,861,595 A | 11/1955 | Pier |
| 2,774,374 A | 12/1956 | Schneider |
| 2,829,857 A | 4/1958 | Williams |
| 2,838,073 A | 6/1958 | DiMattia et al. |
| 2,875,787 A | 3/1959 | Evans |
| 2,908,294 A | 10/1959 | DiMattia et al. |
| 3,020,928 A | 2/1962 | Harold |
| 3,052,378 A | 9/1962 | Wright et al. |
| 3,063,470 A | 11/1962 | Forster |
| 3,091,258 A | 5/1963 | Marette |
| 3,103,234 A | 9/1963 | Washburn |
| 3,143,144 A | 8/1964 | Harold |
| D199,376 S | 10/1964 | Uttermohlen |
| D199,937 S | 12/1964 | Palmer et al. |
| 3,162,371 A | 12/1964 | Palmer et al. |
| 3,215,089 A | 11/1965 | Hoffmann |
| 3,239,131 A | 3/1966 | Whyte |
| 3,314,276 A | 4/1967 | Peyton |
| 3,418,708 A | 12/1968 | Siver |
| 3,424,201 A | 1/1969 | Sugimura et al. |
| 3,429,274 A * | 2/1969 | Nilsson .................. F04B 43/073 91/50 |
| 3,470,910 A | 10/1969 | Loveless |
| 3,473,565 A | 10/1969 | Blendermann |
| D218,519 S | 8/1970 | Hisyaoshi |
| 3,536,102 A | 10/1970 | Zahid et al. |
| 3,601,128 A | 8/1971 | Hakim |
| 3,878,867 A | 4/1975 | Dirks |
| 3,935,882 A | 2/1976 | Matthews |
| 3,974,862 A | 8/1976 | Fuhrmann |
| 4,032,265 A | 6/1977 | Miller |
| 4,052,852 A | 10/1977 | Hart |
| 4,056,334 A | 11/1977 | Fortune |
| 4,190,403 A | 2/1980 | Glover |
| 4,215,726 A | 8/1980 | Tagami |
| 4,273,158 A | 6/1981 | Chun |
| 4,483,665 A | 11/1984 | Hauser |
| 4,512,514 A | 4/1985 | Elcott |
| D282,562 S | 2/1986 | Looney |
| 4,585,400 A | 4/1986 | Miller |
| 4,600,363 A | 7/1986 | Ise et al. |
| 4,610,369 A | 9/1986 | Jacques |
| 4,636,226 A | 1/1987 | Canfora |
| 4,642,833 A | 2/1987 | Stoltz et al. |
| 4,651,781 A | 3/1987 | Kandelman |
| 4,655,692 A | 4/1987 | Ise |
| 4,690,245 A | 9/1987 | Gregorich et al. |
| 4,696,684 A | 9/1987 | Shen |
| 4,705,077 A | 11/1987 | Sugimura |
| 4,732,175 A | 3/1988 | Pareja |
| 4,759,387 A | 7/1988 | Arendt |
| 4,782,204 A | 11/1988 | Gartland |
| 4,802,507 A | 2/1989 | Wilson |
| 4,814,688 A | 3/1989 | Colles |
| 4,817,688 A | 4/1989 | Corniea |
| 4,886,432 A | 12/1989 | Kimberlin |
| 4,936,383 A | 6/1990 | Towner et al. |
| D310,262 S | 8/1990 | Lemire |
| 5,015,002 A | 5/1991 | Goodman et al. |
| 5,050,438 A | 9/1991 | Ezell, Jr. |
| 5,065,788 A | 11/1991 | McManigal et al. |
| 5,171,134 A | 12/1992 | Morgart et al. |
| 5,186,209 A | 2/1993 | McManigal et al. |
| 5,253,374 A | 10/1993 | Langill |
| D341,187 S | 11/1993 | Stachiowak |
| 5,307,782 A | 5/1994 | Davis |
| 5,318,073 A | 6/1994 | Kendrick et al. |
| 5,337,791 A * | 8/1994 | Plager .................... F16L 55/04 138/30 |
| 5,345,857 A | 9/1994 | Murphy |
| 5,372,116 A | 12/1994 | Davis |
| 2,712,831 A | 7/1995 | Day |
| 5,465,576 A | 11/1995 | Miller |
| 5,505,327 A | 4/1996 | Witt |
| 5,562,429 A | 10/1996 | Romstad et al. |
| 5,718,952 A | 2/1998 | Zimmermann et al. |
| 5,771,936 A | 6/1998 | Sasaki et al. |
| 5,772,414 A | 6/1998 | Kaneko |
| 5,772,899 A | 6/1998 | Snodgrass et al. |
| 5,798,156 A | 8/1998 | Mitlitsky et al. |
| 5,848,617 A | 12/1998 | Enomoto |
| 5,858,617 A | 1/1999 | Nakayama et al. |
| 5,860,452 A | 1/1999 | Ellis |
| 5,937,895 A | 8/1999 | Le Febre |
| 5,941,283 A | 8/1999 | Forte |
| 6,041,820 A | 3/2000 | Boehme |
| 6,041,821 A | 3/2000 | Kurt |
| 6,089,837 A | 7/2000 | Cornell |
| 6,173,735 B1 | 1/2001 | Pery, Jr. et al. |
| 6,264,069 B1 | 7/2001 | Hughes et al. |
| D447,792 S | 9/2001 | Renaud |
| 6,318,978 B1 | 11/2001 | Burns |
| 6,325,105 B1 * | 12/2001 | Rogers .................... F16L 55/05 138/30 |
| 6,386,509 B1 | 5/2002 | Matsuzawa et al. |
| 6,390,131 B1 | 5/2002 | Kilgore |
| D460,536 S | 7/2002 | Renaud |
| D484,953 S | 1/2004 | Renaud |
| 6,719,536 B2 | 4/2004 | Schmalz et al. |
| 6,796,772 B2 | 9/2004 | Ikeda et al. |
| 6,948,479 B1 | 9/2005 | Raney et al. |
| 7,066,211 B2 | 6/2006 | Gustaffson |
| 7,108,015 B2 | 9/2006 | Lombari et al. |
| 7,140,406 B2 | 11/2006 | Gustaffson |
| 7,165,535 B2 | 1/2007 | Braun et al. |
| 7,306,006 B1 | 12/2007 | Cornell |
| 7,353,845 B2 | 4/2008 | Underwood et al. |
| 7,887,305 B2 | 2/2011 | Yajima |
| 7,921,882 B2 | 4/2011 | Gebhardt |
| 8,176,940 B2 | 5/2012 | Lehnert |
| D675,721 S | 2/2013 | Frank |
| D675,722 S | 2/2013 | Frank |
| 8,733,392 B2 | 5/2014 | Smith et al. |
| 8,875,741 B2 | 11/2014 | Jae |
| 9,915,957 B2 | 3/2018 | Brice |
| 10,353,409 B2 | 7/2019 | McComb et al. |
| 10,508,750 B2 | 12/2019 | Burris |
| D893,678 S | 8/2020 | McComb et al. |
| 2004/0016466 A1 | 1/2004 | Lombari et al. |
| 2004/0129325 A1 | 7/2004 | Bleeck et al. |
| 2005/0238504 A1 | 10/2005 | Yajima |
| 2005/0278841 A1 | 12/2005 | Coronado et al. |
| 2006/0054232 A1 | 3/2006 | Gustafsson |

(56) References Cited

U.S. PATENT DOCUMENTS

| | | |
|---|---|---|
| 2014/0081217 A1 | 3/2014 | Holtwick |
| 2014/0203198 A1 | 7/2014 | Jennings et al. |
| 2015/0027567 A1 | 1/2015 | Shreve et al. |
| 2017/0298914 A1 | 10/2017 | Mori et al. |
| 2018/0306210 A1 | 10/2018 | Arikawa |
| 2019/0050004 A1* | 2/2019 | Rogers ............... F04B 11/0033 |
| 2019/0332130 A1 | 10/2019 | McComb et al. |
| 2020/0300400 A1 | 9/2020 | Burke et al. |

FOREIGN PATENT DOCUMENTS

| | | | |
|---|---|---|---|
| DE | 102005025208 B4 | 7/2007 | |
| EP | 943799 B1 * | 10/2004 | ......... F04B 11/0016 |
| EP | 1877331 B1 | 6/2009 | |
| EP | 1979625 B1 | 7/2016 | |
| EP | 2380712 B1 | 3/2018 | |
| GB | 668451 | 3/1952 | |
| JP | S6098200 A | 6/1985 | |
| JP | 2997862 B2 | 1/2000 | |
| TW | 201727084 A | 8/2017 | |
| WO | WO 2012173557 A1 | 12/2012 | |
| WO | WO 2018/106547 | 6/2018 | |
| WO | WO 2019/169349 | 9/2019 | |

\* cited by examiner

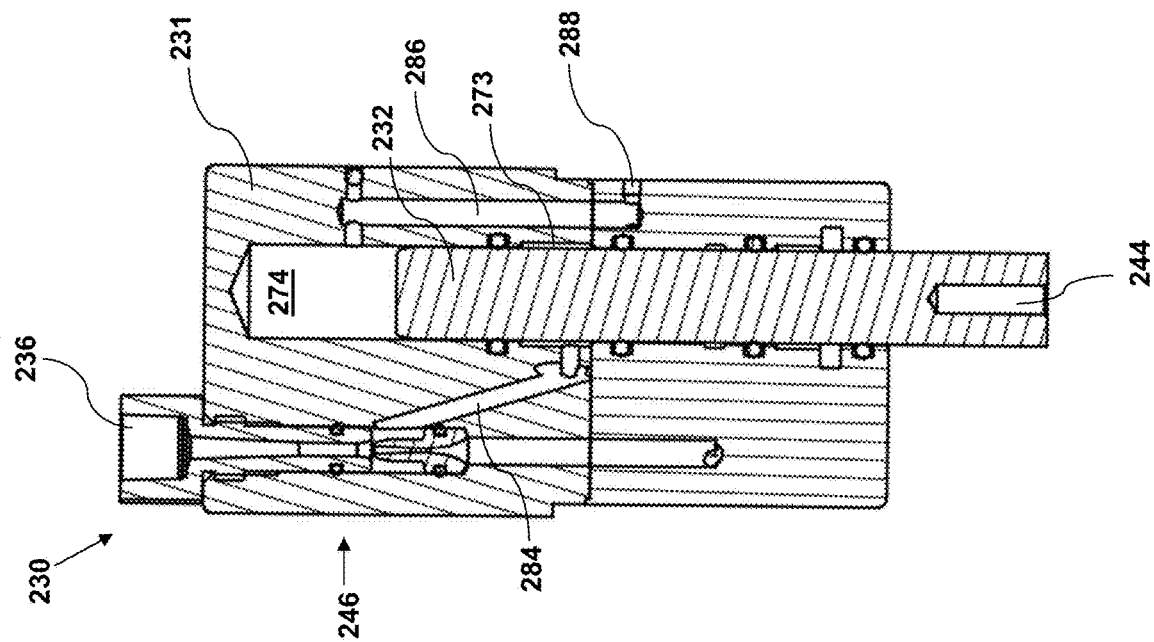
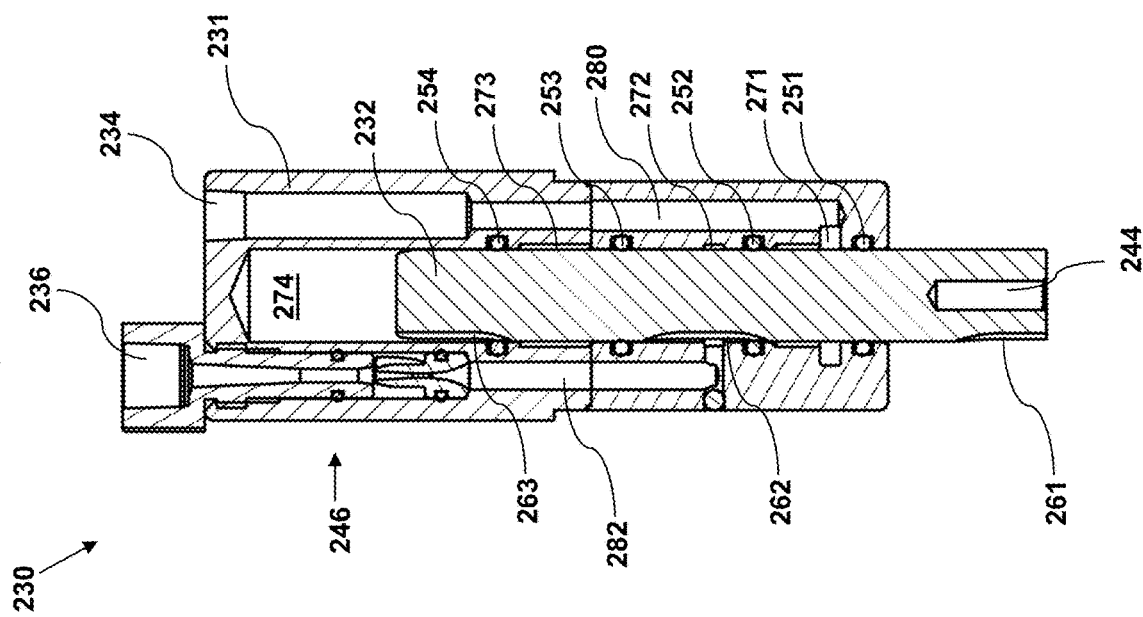

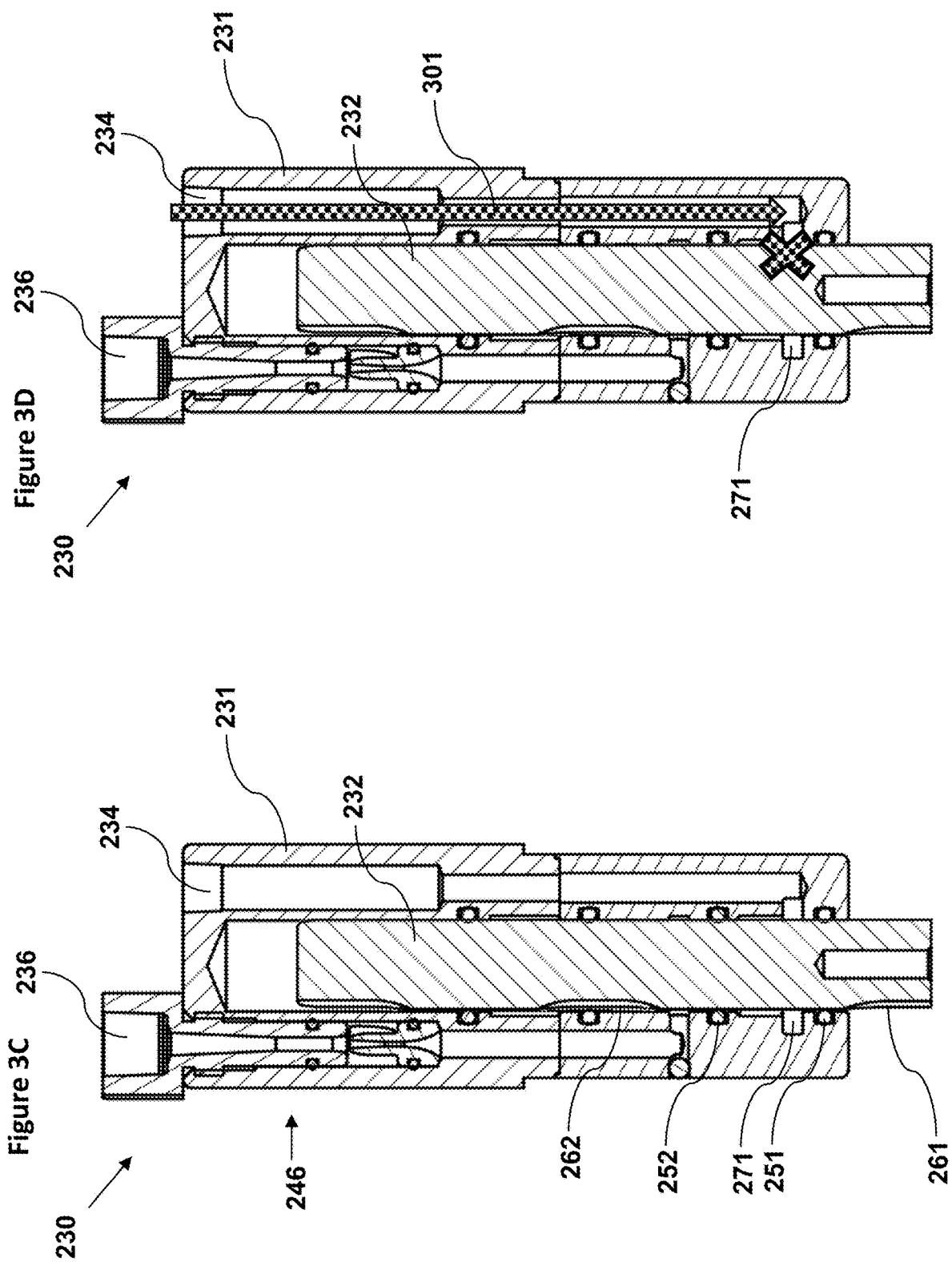

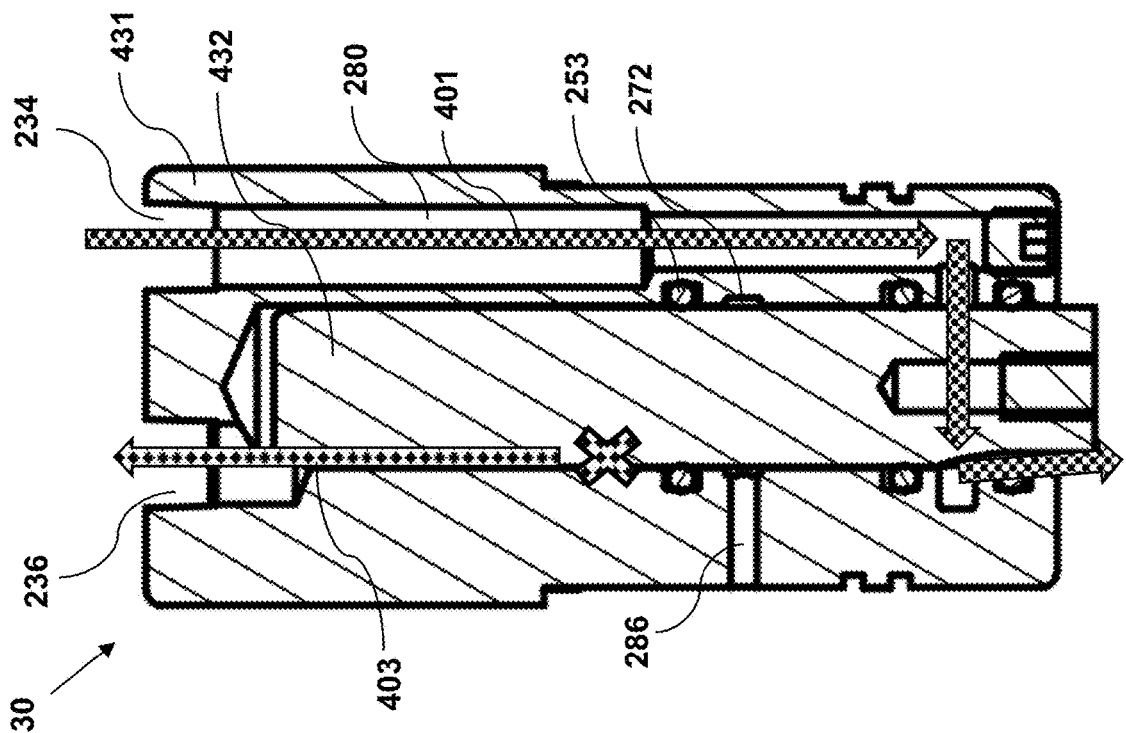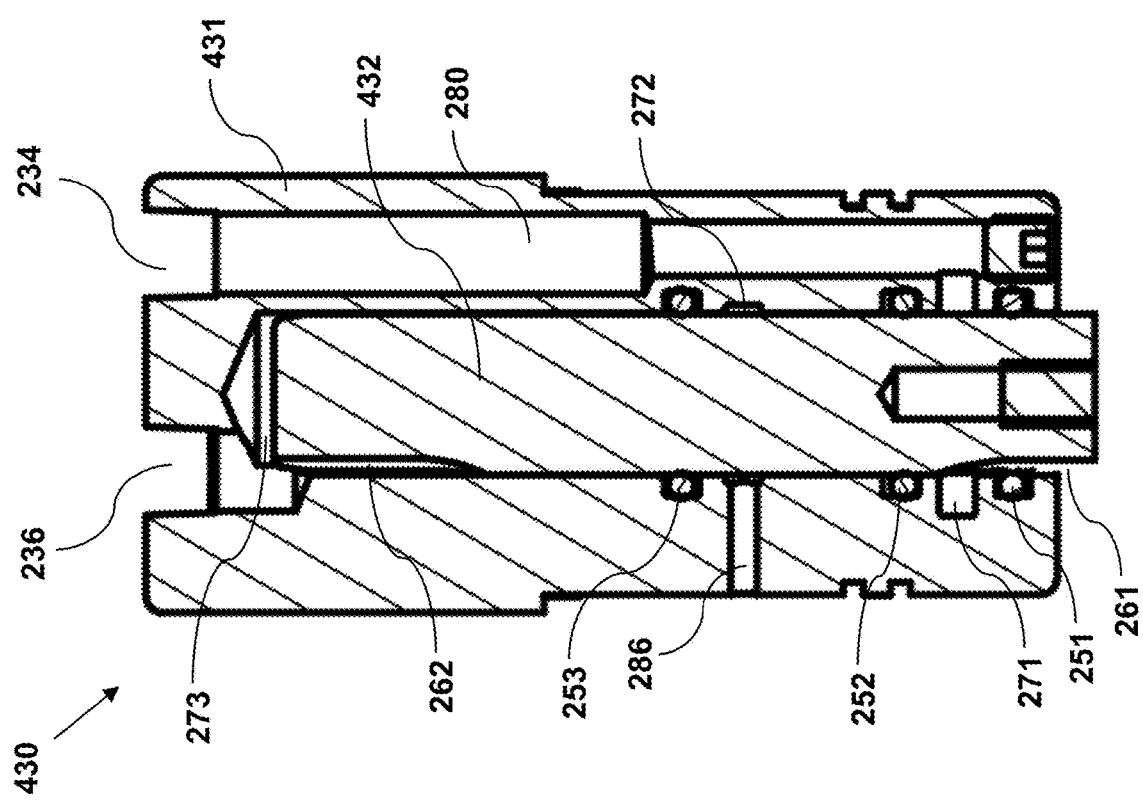

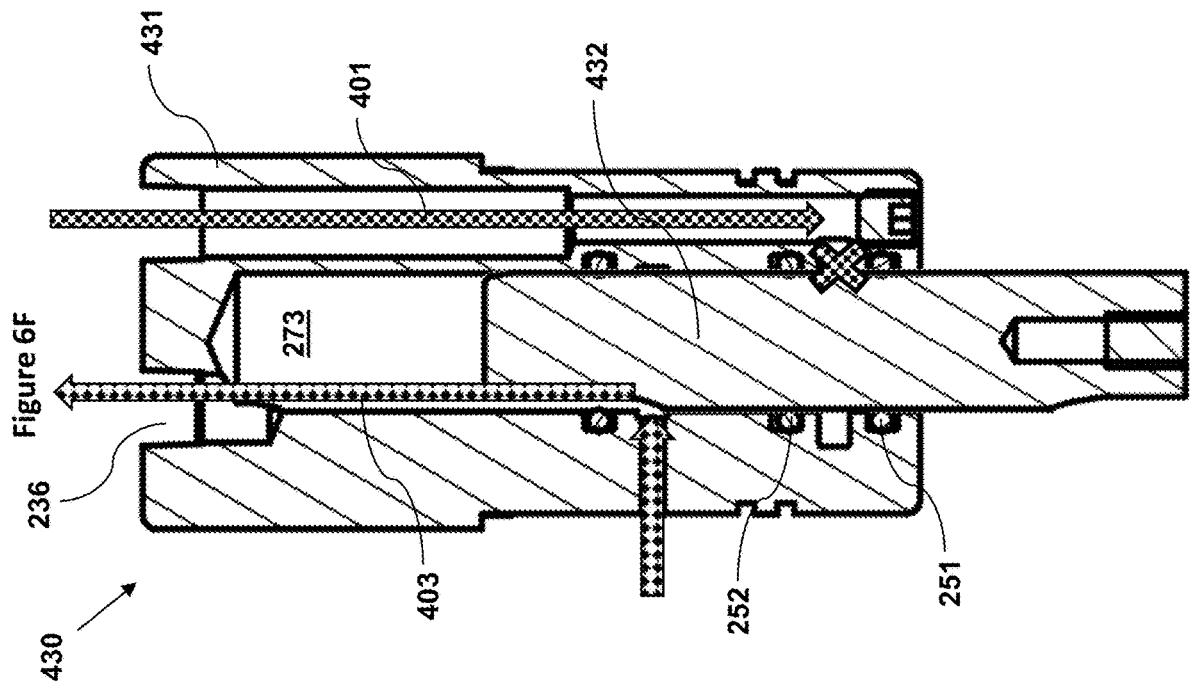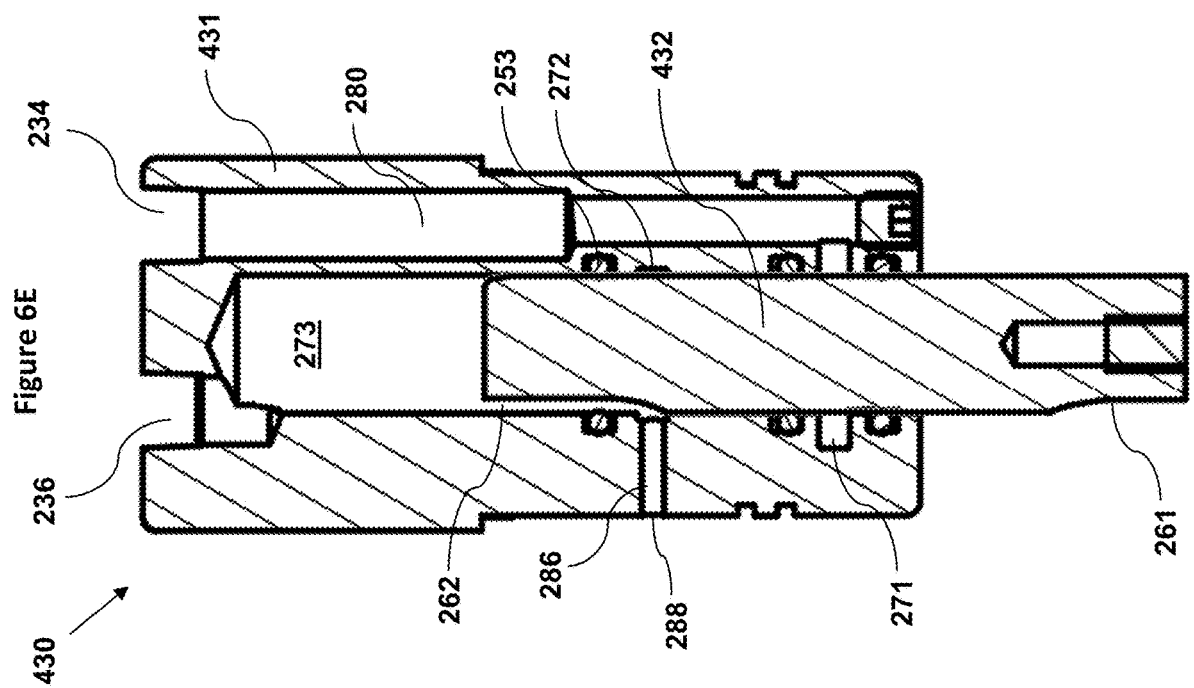

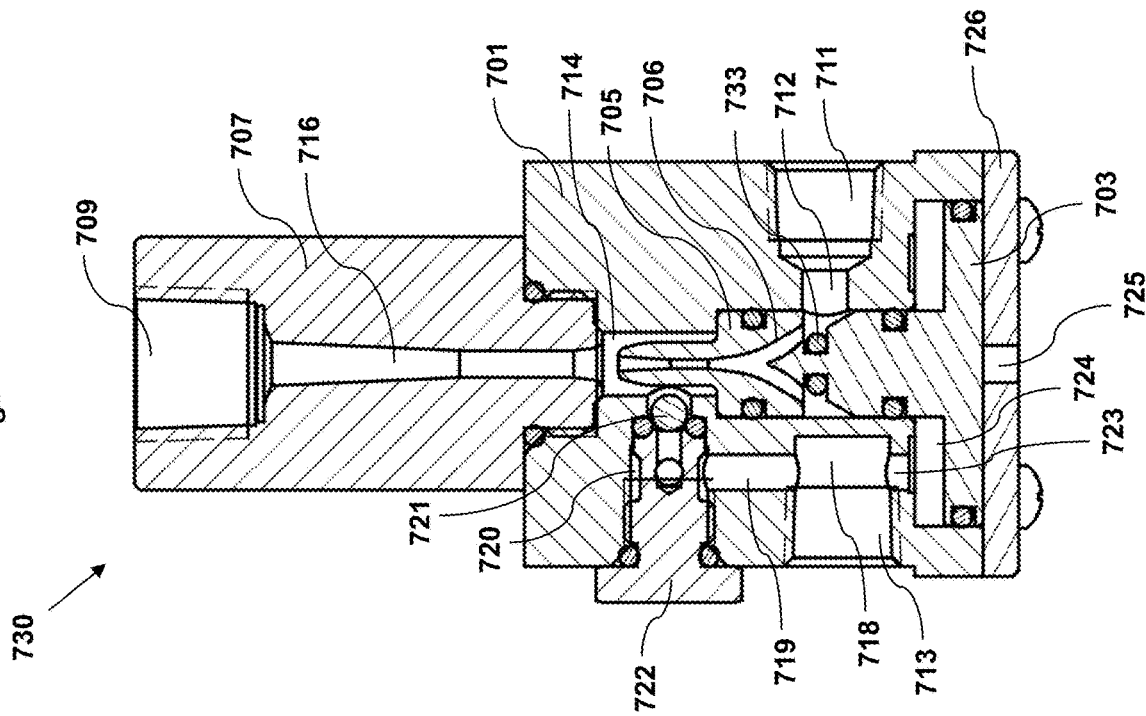
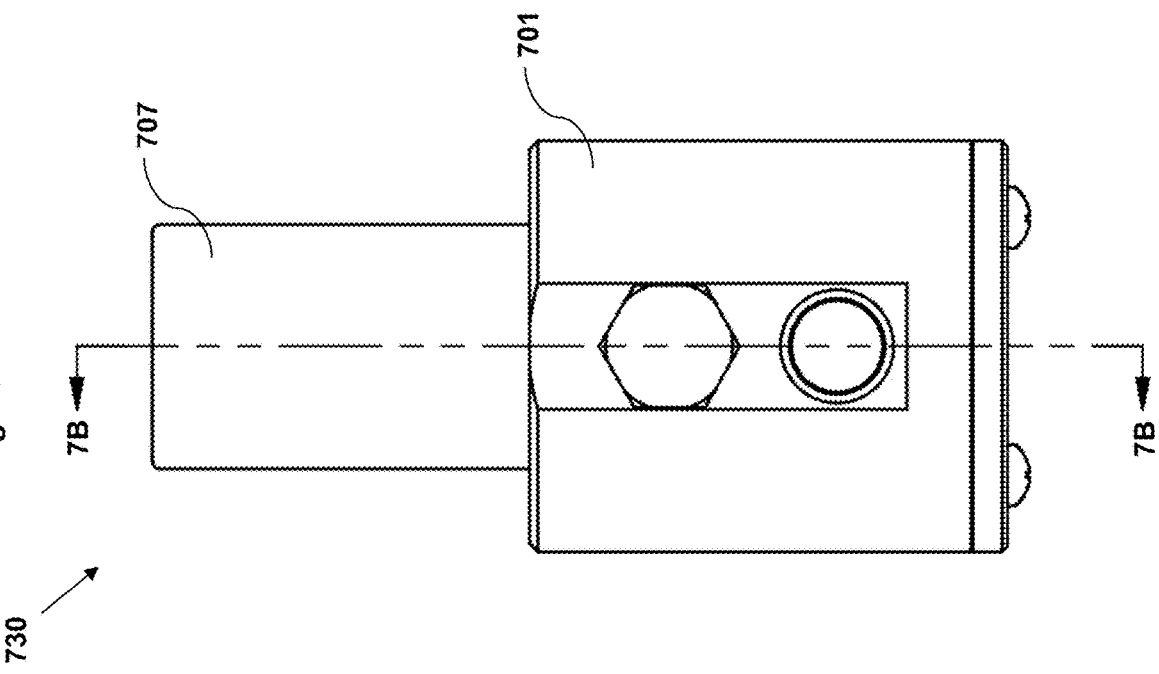

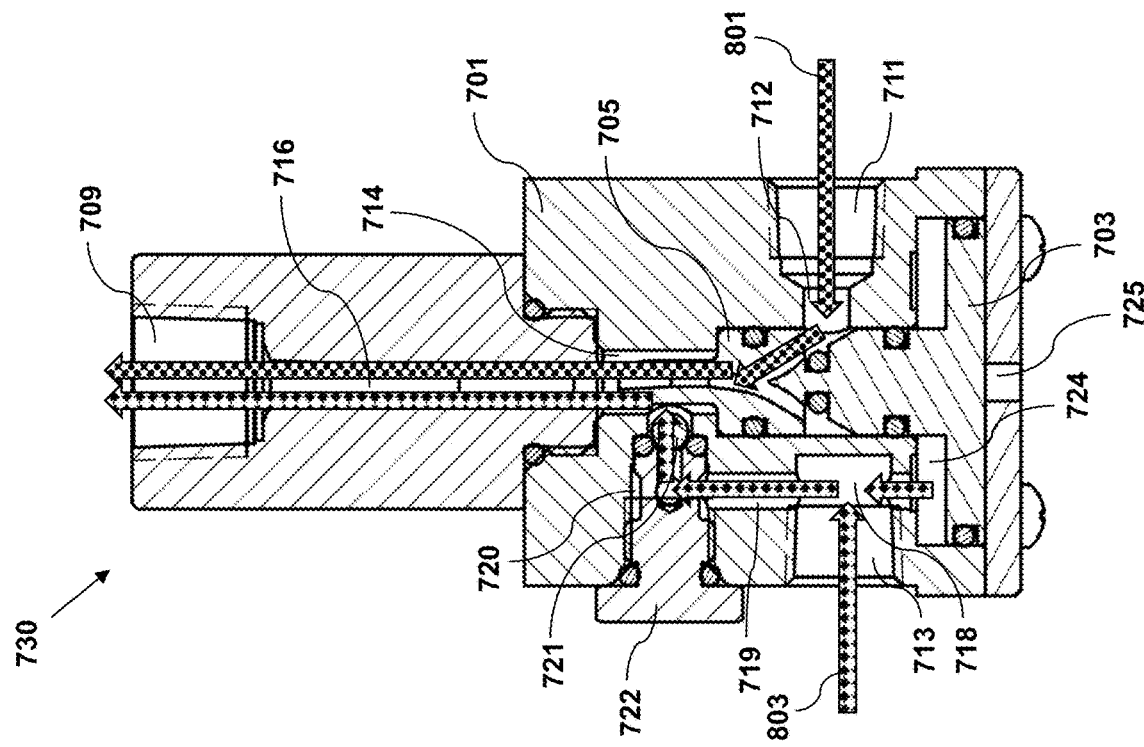
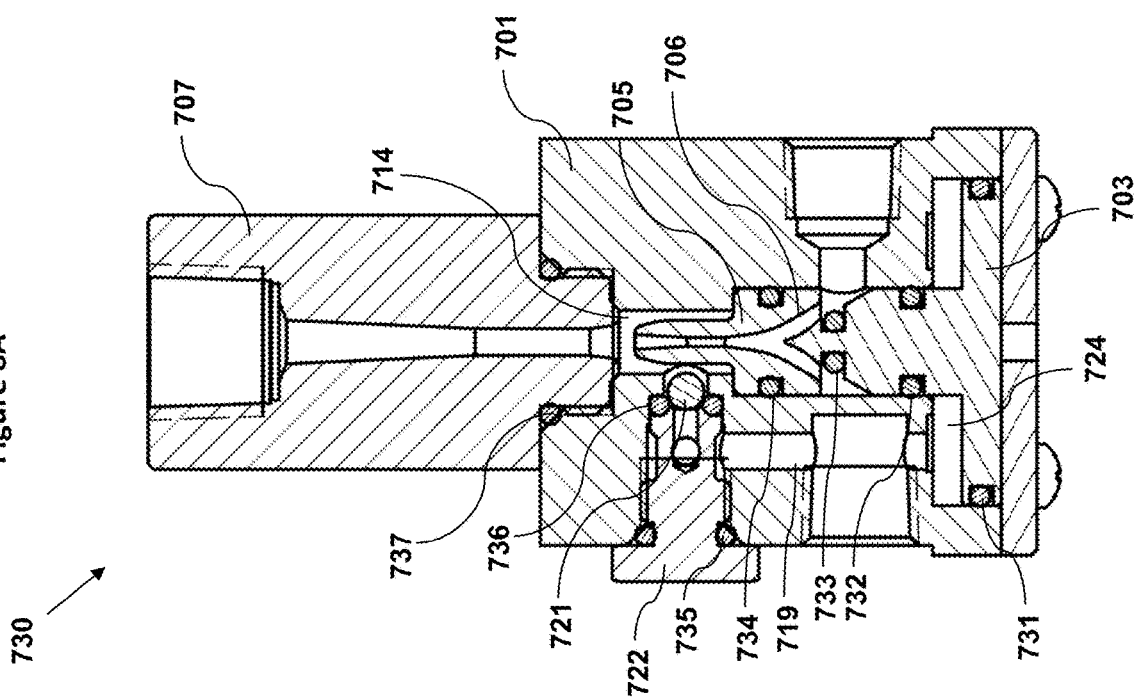

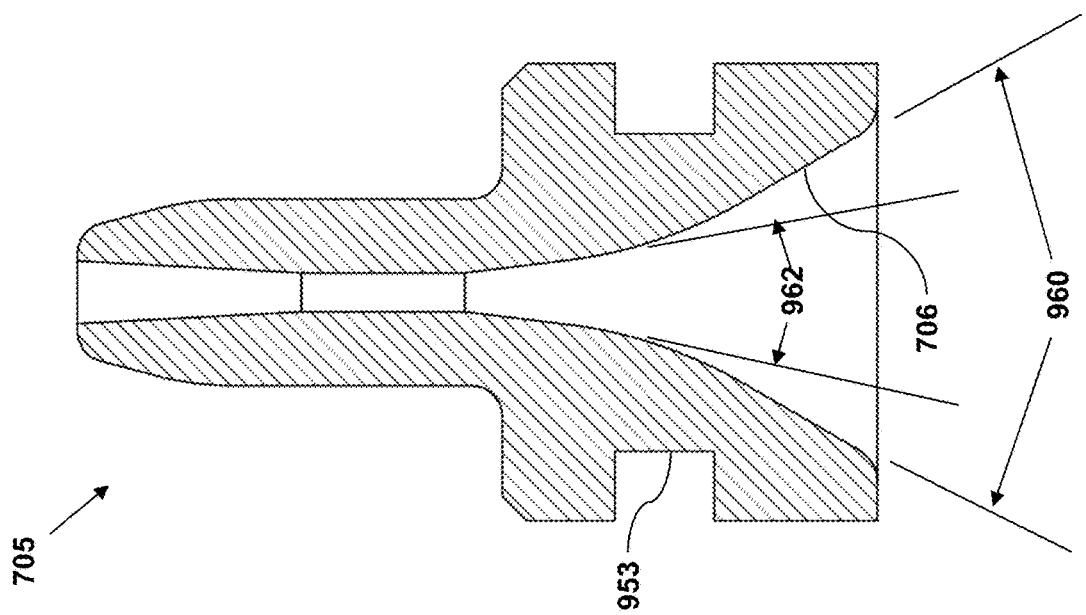
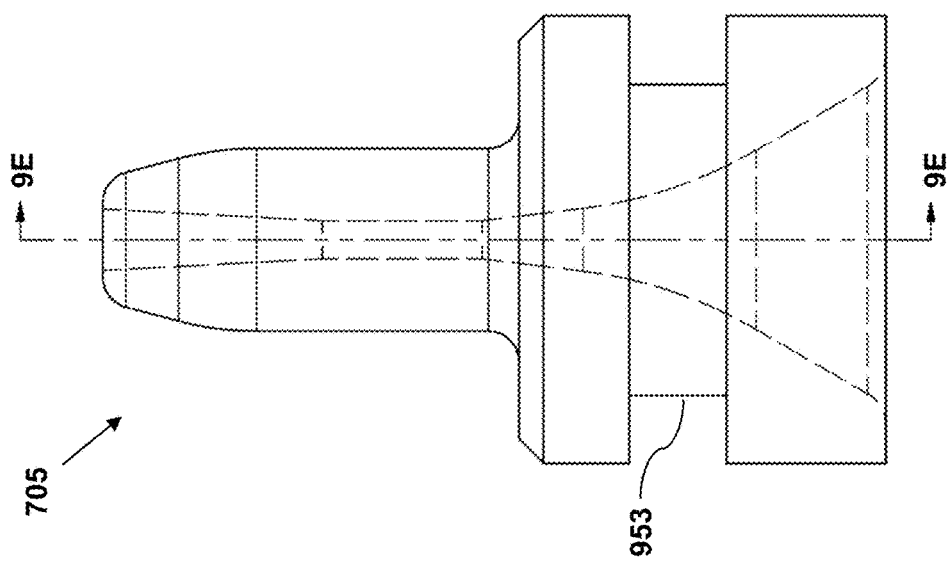

AUTOMATIC FLUID PUMP INLET STABILIZERS AND VACUUM REGULATORS

BACKGROUND

Field

This disclosure generally relates to fluid pumping systems, and more specifically to fluid pump inlet stabilizer dampeners.

Description

Hydraulic systems, such as fluid pumping systems, are used to transport fluid under pressure in various applications. Positive displacement pumps are often used in such systems. Positive displacement pumps contain an inlet valve that alternately opens and closes, creating pressure fluctuations and acceleration head losses. Such pressure fluctuations and acceleration head losses can cause undesirable behavior in the system and/or lead to reduced service life.

SUMMARY

The disclosure herein provides various embodiments of automated inlet stabilizer dampeners. The inlet stabilizer dampeners disclosed herein can, for example, be positioned on the inlet side of a positive displacement fluid pump and in fluid communication with a supply of liquid being pumped by such a fluid pump. The stabilizer dampener can be used to help the pump operate more effectively and efficiently, and to extend the life of the pump. In some embodiments, the inlet stabilizer dampener is configured to automatically switch between a pressure mode and a suction mode. For example, when a liquid supply tank is full, the liquid supply may be fed to the pump under the force of a pressure head caused by gravity. When such a tank supply gets lower, however, the pump may need to change to operating in a suction mode, meaning the liquid supply needs to be sucked from the supply tank by the pump. In some embodiments, when the pump needs to change to operating in a suction mode, the inlet stabilizer dampener can also be configured to automatically change to operating in a suction mode. In some embodiments, the inlet stabilizer dampener utilizes and/or incorporates a unique venturi vacuum regulator and/or generator as part of the system that enables such automatic changing of operating modes. In some embodiments, such a venturi vacuum regulator may be used as a general-purpose vacuum regulator separate from an inlet stabilizer dampener.

According to some embodiments, a fluid pump inlet stabilizer dampener comprises: an enclosure defining an internal volume; a deformable diaphragm separating the internal volume into a gas chamber and a liquid chamber, wherein the enclosure comprises a liquid inlet port in fluid communication with the liquid chamber; and a valve comprising a venturi vacuum generator, a valve housing, and a piston axially slideable with respect to the valve housing, wherein a distal end of the piston is coupled to a portion of the deformable diaphragm such that movement of the deformable diaphragm will cause sliding of the piston with respect to the valve housing, wherein the valve defines a plurality of selectively closable fluid flow paths comprising at least: a first fluid flow path from a pressurized gas inlet port to the gas chamber; a second fluid flow path from the pressurized gas inlet port to the venturi vacuum generator; and a third fluid flow path from the gas chamber to the venturi vacuum generator, wherein the piston is configured to cooperate with a plurality of sealing members that seal the piston to the valve housing in order to selectively open or close the plurality of selectively closable fluid flow paths, wherein the piston is configured to be positioned at a plurality of positions with respect to the valve housing, comprising at least: a first position wherein the first fluid flow path is open and both of the second and third fluid flow paths are closed; a second position wherein the first, second, and third fluid flow paths are each closed; and a third position wherein the first fluid flow path is closed and both of the second and third fluid flow paths are open.

In some embodiments, the first position of the piston comprises a retracted position. In some embodiments, the third position of the piston comprises an extended position. In some embodiments, the second position of the piston comprises a position between the retracted position and the extended position. In some embodiments, the piston comprises a plurality of grooves that cooperate with the plurality of sealing members by allowing fluid to flow past a sealing member through a groove when a groove is positioned adjacent a sealing member. In some embodiments, the plurality of grooves comprises at least three grooves spaced apart along the length of the piston. In some embodiments, the plurality of sealing members comprises at least four sealing members spaced apart along the length of a cavity of the valve housing within which the piston slides. In some embodiments, the fluid pump inlet stabilizer dampener further comprises: a variable volume chamber defined at least in part by the valve housing and the piston, the variable volume chamber configured such that movement of the piston with respect to the valve housing in an extension direction increases a volume of the variable volume chamber, and movement of the piston with respect to the valve housing in a retraction direction decrease the volume of the variable volume chamber; and wherein the plurality of selectively closeable fluid flow paths further comprises a fourth fluid flow path from the variable volume chamber to a discharge port of the valve housing. In some embodiments, the fourth fluid flow path is open with the piston positioned in the first position and the second position, and the fourth fluid flow path is closed with the piston positioned in the third position. In some embodiments, the fourth fluid flow path passes through a channel in the piston. In some embodiments, the second fluid flow path also passes through the channel in the piston. In some embodiments, the fourth fluid flow path passes through at least a portion of the venturi vacuum generator. In some embodiments, the variable volume chamber is in fluid communication with the discharge port of the valve housing through a portion of the second fluid flow path when the fourth fluid flow path is closed. In some embodiments, the plurality of sealing members comprise O-rings. In some embodiments, the venturi vacuum generator comprises at least a venturi nozzle positioned within the valve housing. In some embodiments, the piston is configured to be axially slidable between the first position and the third position by a stroke length that is at least 0.5 times a diameter of the piston.

According to some embodiments, a fluid pump inlet stabilizer dampener comprises: an enclosure defining an internal volume; a deformable diaphragm separating the internal volume into a gas chamber and a liquid chamber, wherein the enclosure comprises a liquid inlet port in fluid communication with the liquid chamber; and a valve comprising a venturi vacuum generator, a valve housing, and a piston axially slideable with respect to the valve housing, wherein a distal end of the piston is coupled to a portion of the deformable diaphragm, wherein the piston is configured to cooperate with a plurality of sealing members that seal the piston to the valve housing in order to selectively open or close a plurality of selectively closable fluid flow paths, and wherein the piston is configured to be positioned at a plurality of positions with respect to the valve housing, comprising at least: a first position wherein a first fluid flow path from a pressurized gas inlet port to the gas chamber is open; a second position wherein the first fluid flow path is closed; and a third position wherein the first fluid flow path is closed and a second fluid flow path that activates the venturi vacuum generator is open.

In some embodiments, the second fluid flow path comprises a fluid flow path from the pressurized gas inlet port to the venturi vacuum generator. In some embodiments, the plurality of selectively closable fluid flow paths further comprises a third fluid flow path from the gas chamber to the venturi vacuum generator. In some embodiments, the third fluid flow path is configured to be open with the piston in the third position, and closed with the piston in the first position or the second position. In some embodiments, the fluid pump inlet stabilizer dampener further comprises: a variable volume chamber defined at least in part by the valve housing and the piston, the variable volume chamber configured such that movement of the piston with respect to the valve housing in an extension direction increases a volume of the variable volume chamber, and movement of the piston with respect to the valve housing in a retraction direction decrease the volume of the variable volume chamber; and wherein a fluid flow path that selectively fluidly couples the variable volume chamber to the atmosphere is open with the piston in the first position and the second position and closed with the piston in the third position. In some embodiments, the second fluid flow path passes through the variable volume chamber. In some embodiments, the variable volume chamber is in fluid communication with the atmosphere through a portion of the second fluid flow path when the fluid flow path that selectively fluidly couples the variable volume chamber to the atmosphere is closed. In some embodiments, the first position of the piston comprises a retracted position. In some embodiments, the third position of the piston comprises an extended position. In some embodiments, the second position of the piston comprises a position between the retracted position and the extended position. In some embodiments, the piston comprises a plurality of grooves that cooperate with the plurality of sealing members by allowing fluid to flow past a sealing member through a groove when a groove is positioned adjacent a sealing member. In some embodiments, the plurality of grooves comprises at least three grooves spaced apart along the length of the piston. In some embodiments, the plurality of sealing members comprises at least four sealing members spaced apart along the length of a cavity of the valve housing within which the piston slides. In some embodiments, the piston comprises at least one groove that enables at least one of the plurality of selectively closable fluid flow paths to flow around at least one of the plurality of sealing members; and wherein the piston comprises at least one channel that enables at least one other of the plurality of selectively closable fluid flow paths to flow through the piston.

According to some embodiments, a fluid pump inlet stabilizer dampener comprises: an enclosure defining an internal volume; a deformable diaphragm separating the internal volume into a gas chamber and a liquid chamber, wherein the enclosure comprises a liquid inlet port in fluid communication with the liquid chamber; a valve comprising a compressed gas port, a vacuum port, a valve housing, and a piston axially slideable with respect to the valve housing, wherein a distal end of the piston is coupled to a portion of the deformable diaphragm such that movement of the deformable diaphragm will cause sliding of the piston with respect to the valve housing, wherein the valve housing defines a plurality of selectively closable fluid flow paths comprising at least: a first fluid flow path from the compressed gas port to the gas chamber; and a second fluid flow path from the gas chamber to the vacuum port, wherein the piston is configured to cooperate with a plurality of sealing members that seal the piston to the valve housing in order to selectively open or close the plurality of selectively closable fluid flow paths, wherein the piston is configured to be positioned at a plurality of positions with respect to the valve housing, comprising at least: a first position wherein the first fluid flow path is open and the second fluid flow path is closed; a second position wherein the first and second fluid flow paths are each closed; and a third position wherein the first fluid flow path is closed and the second fluid flow path is open; and an automatic venturi vacuum regulator fluidly coupled to the vacuum port of the valve, automatic venturi vacuum regulator comprising: a regulator housing having a pressure inlet port and a vacuum outlet port; a venturi vacuum pump within the regulator housing, the venturi vacuum pump configured to receive compressed air from the pressure inlet port in order to generate suction at the vacuum outlet port; a movable regulator piston configured to seal the pressure inlet port from the venturi vacuum pump responsive to a sufficient pressure differential between the vacuum outlet port and the pressure inlet port; and a check valve configured to seal the vacuum outlet port from the venturi vacuum pump to resist loss of vacuum at the vacuum outlet port.

In some embodiments, the movable regulator piston comprises a first portion having a first diameter and a second portion having a second diameter that is smaller than the first diameter, wherein the first portion of the movable regulator piston is in fluid communication with the vacuum outlet port on a first side and with the environment on a second side, in a configuration that will cause a negative pressure differential between the vacuum outlet port and the environment to bias the movable regulator piston toward a closed position, wherein the second portion of the movable regulator piston is in fluid communication with the vacuum outlet port on a first side and with the pressure inlet port on a second side, in a configuration that will cause a positive pressure differential between the pressure inlet port and the vacuum outlet port to bias the movable regulator piston toward an open position, wherein the first diameter and the second diameter are sized such that the movable regulator piston is configured to move to the closed position responsive to a sufficient pressure differential between the vacuum outlet port and the pressure inlet port. In some embodiments, the second portion of the movable regulator piston comprises a tapered portion configured to be positioned at least partially within a venturi nozzle of the venturi vacuum pump in the closed position. In some embodiments, a ratio of the second diameter to the first diameter is less than 0.5.

According to some embodiments, an automatic venturi vacuum regulator comprises: a housing having a pressure inlet port and a vacuum outlet port; a venturi vacuum pump within the housing, the venturi vacuum pump configured to receive compressed air from the pressure inlet port in order to generate suction at the vacuum outlet port; a movable piston movable between a closed position and an open position, wherein in the closed position a portion of the movable piston seals against a surface of a venturi nozzle of the venturi vacuum pump to close a flow path from the pressure inlet port to the venturi vacuum pump, wherein the movable piston comprises a first portion having a first diameter and a second portion having a second diameter that is smaller than the first diameter, wherein the first portion of the movable piston is in fluid communication with the vacuum outlet port on a first side and with the environment on a second side, in a configuration that will cause a negative pressure differential between the vacuum outlet port and the environment to bias the movable piston toward the closed position, wherein the second portion of the movable piston is in fluid communication with the vacuum outlet port on a first side and with the pressure inlet port on a second side, in a configuration that will cause a positive pressure differential between the pressure inlet port and the vacuum outlet port to bias the movable piston toward the open position, wherein the first diameter and the second diameter are sized such that the piston is configured to move to the closed position responsive to a sufficient pressure differential between the vacuum outlet port and the pressure inlet port; and a check valve configured to seal the vacuum outlet port from the venturi vacuum pump to resist loss of vacuum at the vacuum outlet port.

In some embodiments, the second portion of the movable piston comprises a tapered portion configured to be positioned at least partially within the venturi nozzle in the closed position. In some embodiments, a ratio of the second diameter to the first diameter is less than 0.5. In some embodiments, a ratio of the second diameter to the first diameter is less than 0.8. In some embodiments, the movable piston is not biased by a mechanical spring.

According to some embodiments, an automatic venturi vacuum regulator comprises: a housing having a pressure inlet port and a vacuum outlet port; a venturi vacuum pump within the housing, the venturi vacuum pump configured to receive compressed air from the pressure inlet port in order to generate suction at the vacuum outlet port; a movable piston configured to seal the pressure inlet port from the venturi vacuum pump responsive to a sufficient pressure differential between the vacuum outlet port and the pressure inlet port; and a check valve configured to seal the vacuum outlet port from the venturi vacuum pump to resist loss of vacuum at the vacuum outlet port.

In some embodiments, the movable piston is configured to seal against a surface of a venturi nozzle of the venturi vacuum pump to seal the pressure inlet port from the venturi vacuum pump. In some embodiments, the movable piston comprises a first portion having a first diameter and a second portion having a second diameter that is smaller than the first diameter, wherein the first portion of the movable piston is in fluid communication with the vacuum outlet port on a first side and with the environment on a second side, in a configuration that will cause a negative pressure differential between the vacuum outlet port and the environment to bias the movable piston toward sealing the pressure inlet port from the venturi vacuum pump. In some embodiments, the second portion of the movable piston is in fluid communication with the vacuum outlet port on a first side and with the pressure inlet port on a second side, in a configuration that will cause a positive pressure differential between the pressure inlet port and the vacuum outlet port to bias the movable piston away from sealing the pressure inlet port from the venturi vacuum pump. In some embodiments, the second portion of the movable piston comprises a tapered portion configured to be positioned at least partially within the venturi nozzle in the closed position. In some embodiments, a ratio of the second diameter to the first diameter is less than 0.5. In some embodiments, a ratio of the second diameter to the first diameter is less than 0.8. In some embodiments, the movable piston is not biased by a mechanical spring.

For purposes of this summary, certain aspects, advantages, and novel features of the inventions are described herein. It is to be understood that not necessarily all such advantages may be achieved in accordance with any particular embodiment of the inventions. Thus, for example, those skilled in the art will recognize that the inventions may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects, and advantages of the present disclosure are described in detail below with reference to the drawings of various embodiments, which are intended to illustrate and not to limit the disclosure. The features of some embodiments of the present disclosure, which are believed to be novel, will be more fully disclosed in the following detailed description. The following detailed description may best be understood by reference to the accompanying drawings wherein the same numbers in different drawings represents the same parts. All drawings are schematic and are not intended to show any dimension to scale. The drawings comprise the following figures in which:

FIGS. 2C and 2D are cross-sectional views of the valve assembly of FIG. 2B.

FIGS. 3C and 3D are cross-sectional views of the valve assembly of FIG. 2B illustrating fluid flow paths with the piston in an intermediate position.

FIGS. 6A and 6B are cross-sectional views of the valve assembly of FIG. 5B illustrating fluid flow paths with a piston in a retracted position.

FIGS. 6E and 6F are cross-sectional views of the valve assembly of FIG. 5B illustrating fluid flow paths with the piston in an extended position.

FIGS. 7A and 7B are side and cross-sectional views, respectively, of a venturi vacuum regulator of the automatic inlet stabilizer dampener of FIG. 5A.

FIGS. 8A and 8B are cross-sectional views of the venturi vacuum regulator of FIG. 7B illustrating fluid flow paths with a flow control piston in an open position.

FIGS. 9D and 9E are side and cross-sectional views, respectively, of a venturi nozzle of the venturi vacuum regulator of FIG. 7B.

DETAILED DESCRIPTION

Figure 1:
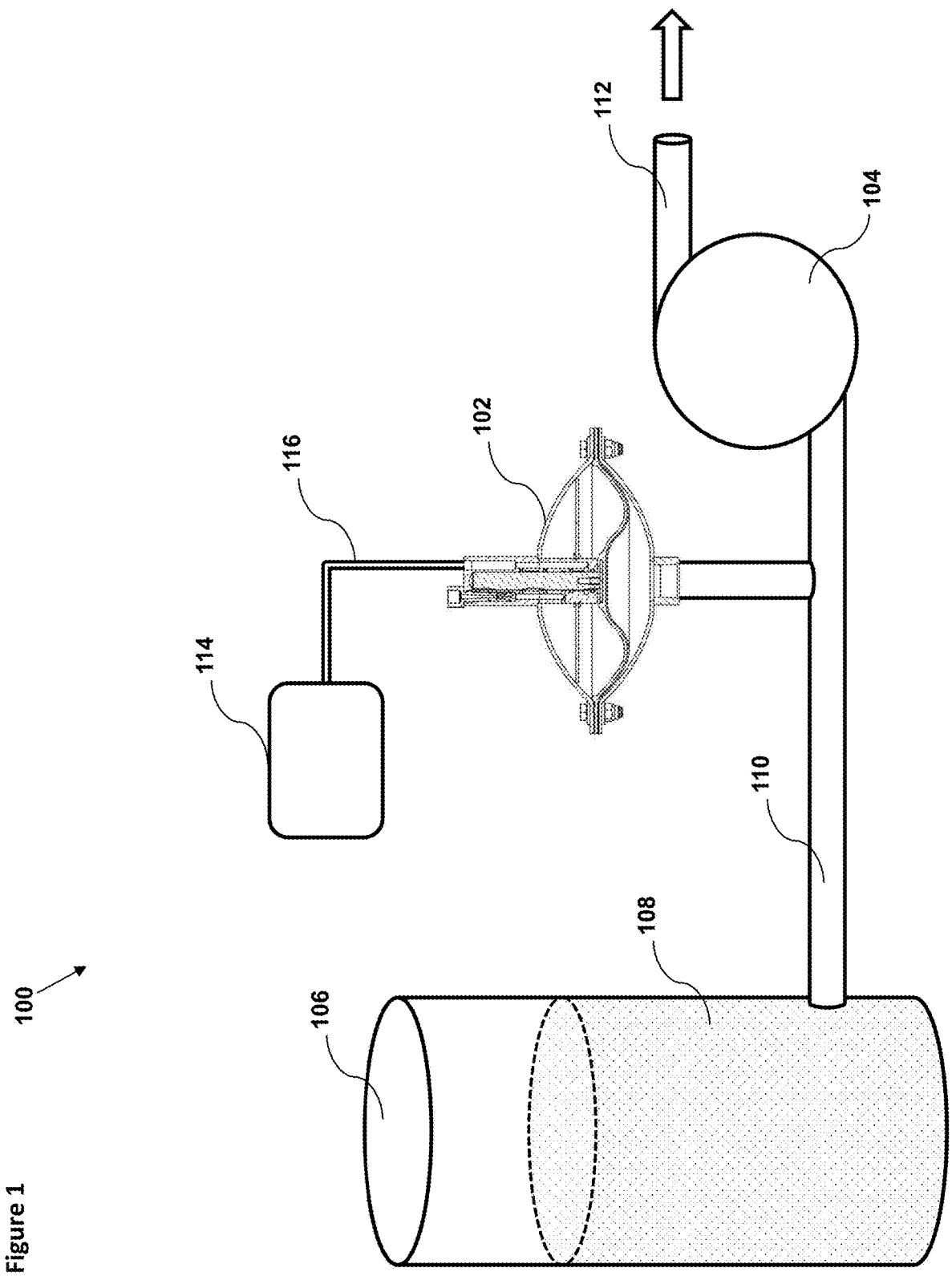
FIG. 1 illustrates a schematic diagram of a fluid pumping system that includes an embodiment of an automatic inlet stabilizer dampener.

Although several embodiments, examples, and illustrations are disclosed below, it will be understood by those of ordinary skill in the art that the inventions described herein extend beyond the specifically disclosed embodiments, examples, and illustrations and include other uses of the inventions and obvious modifications and equivalents thereof. Embodiments of the inventions are described with reference to the accompanying figures, wherein like numerals refer to like elements throughout. These drawings are considered to be a part of the entire description of some embodiments of the inventions. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Fluid pumping systems are used in various industries to transfer liquid, such as water, gas, oil, chemicals, and/or the like. A pump is often used to transfer such liquid from an upstream portion of the pumping system, such as from a liquid supply tank, to a downstream portion of the pumping system. Pumps may sometimes operate inefficiently, ineffectively, and/or may be caused to wear prematurely when, for example, the supply of liquid to the pump inlet is unstable, has significantly fluctuating pressure, and/or the like. For example, some fluid pumping systems utilize positive displacement pumps that contain an inlet valve that alternately opens and closes. This opening and closing creates pressure fluctuations and acceleration head losses. Such pressure fluctuations and acceleration head losses can cause undesirable behavior in the system and/or lead to reduced service life.

The disclosure herein presents various embodiments of automated inlet stabilizer dampeners that can be inserted into such a pumping system in fluid communication with the upstream side of the fluid pump in order to stabilize the flow of liquid into the pump, maintain a more consistent pressure in the liquid flowing into the pump, dampen vibrations or pulsations in the liquid flowing into the pump inlet, and/or the like. Such functionality can be beneficial, for example, because it can help the pump to operate more efficiently, more effectively, and/or to have a longer service life.

Some embodiments disclosed herein help to stabilize and/or dampen a liquid flow by using a deformable diaphragm, bladder, bellows, and/or the like that separates a gas chamber from a liquid chamber that is in fluid communication with the flow of liquid to the pump inlet. As the pressure in the liquid chamber fluctuates, the diaphragm or bladder can deform in order to help absorb such pressure fluctuations and smooth out the fluid flow. In some embodiments, it can be desirable to separate the internal volume of the stabilizer dampener into a gas chamber that takes up approximately 80% of the volume and a liquid chamber that takes up approximately 20% of the volume. In a system that operates under a relatively stable static pressure or average pressure in the liquid flow, and which merely experiences some fluctuations up or down from that average pressure level, a predetermined pressure in the gas chamber may be set that keeps the gas chamber at the approximately 80% volume over time. However, particularly in a system that is supplied from a supply tank, where the pressure head in the tank changes as liquid is drawn from the tank, it can be desirable to continually adjust the pressure charge in the gas chamber in order to maintain the volume of the gas chamber at approximately 80%, even as the average pressure in the liquid chamber changes over time. It should be noted that percentages other than 80% can be used, and the techniques disclosed herein may be used with any desired distribution of chamber volume between the liquid and gas chambers. Testing has shown, however, that an 80%/20% split between the gas chamber volume and liquid chamber volume can be desirable.

As mentioned above, one challenge in stabilizing and dampening the inlet fluid flow to a pump that is supplied by a storage tank is that the pressure head in the storage tank will change as the storage tank goes from full to empty. For example, the highest pressure head or pressure output from the storage tank will be when the tank is full, and the lowest pressure head will exist when the tank is almost empty. If the complete tank is above the height of the pump, then the pump inlet will be operating in a positive pressure situation throughout the entire capacity of the tank, albeit with reducing pressure as the tank is drained. If the height of the pump is somewhere between the top and bottom of the tank, however, then the pump may switch from operating in a positive pressure situation to a negative pressure or suction situation at some point during the draining of the liquid supply tank. Stated another way, when the tank is full, the tank will be forcing liquid into the pump inlet, whereas when the tank is at a lower level, the pump will be sucking fluid from the tank. In order to effectively stabilize the flow of fluid from the tank to the pump in both situations, it can be desirable for the inlet stabilizer dampener's gas chamber to be able to be at a positive pressure when the pump is operating in a positive pressure situation, and to be at a negative pressure (e.g. to have a level of vacuum) when the pump is operating in a suction situation. Various embodiments disclosed herein are capable of automatically switching between a pressure mode and a suction mode in order to enable a pump to operate efficiently throughout a range of positive pressure and suction situations.

In some embodiments, an automated inlet stabilizer dampener comprises an enclosure defining a gas chamber and a liquid chamber separated by a deformable diaphragm or bladder. A portion of the deformable diaphragm, such as a central portion, is coupled to a movable piston of a valve assembly. The piston is configured to move in and out with respect to the housing of the valve assembly in response to movement of the deformable diaphragm caused by changes in pressure in the liquid chamber that cause deformation of the diaphragm and thus changes in the relative volumes of the gas and liquid chambers. In some embodiments, the piston is configured to selectively open and close a number of fluid flow paths that result in introducing pressurized gas into the gas chamber and/or sucking gas out of the gas chamber. For example, when the piston is in a fully retracted position, it may be caused to open a fluid path that introduces pressurized gas into the gas chamber. When the piston is in a fully extended position, the piston may be caused to open a fluid path that causes gas to be sucked out of the gas chamber. When the piston is in a middle, intermediate, or equilibrium position, the piston may be caused to close both of those fluid paths, resulting in the gas chamber being sealed off from both compressed gas and vacuum sources. In some embodiments, the piston is configured to be passive, meaning that movement of the piston is driven by the diaphragm that is attached to the distal end of the piston.

In some embodiments, the piston of the valve assembly is configured to selectively open a fluid path from the gas chamber to a vacuum source when in an extended position. In some embodiments, the vacuum source is integrated into the valve assembly, such as by including one or more components of a venturi vacuum generator within the valve assembly. In such an embodiment, the piston may also be configured to activate and deactivate the venturi vacuum generator as needed (such as by opening a fluid path from a compressed air source to the venturi vacuum generator). For example, the system may be configured to activate the venturi vacuum generator at the same time as the piston opens a fluid path from the gas chamber to the venturi vacuum generator. Such a configuration is not required; however, such a configuration may be desirable, such as to save energy by not having the vacuum generator activated when a source of vacuum is not needed.

Although some embodiments disclosed herein incorporate a vacuum generator within the stabilizer dampener valve assembly, other embodiments disclosed herein may separate the vacuum generator from the main valve housing of the stabilizer dampener. For example, a separate venturi vacuum regulator may be attached to a vacuum or discharge port of the stabilizer dampener valve assembly. The venturi vacuum regulator may be configured to automatically activate a venturi vacuum generator when vacuum is lost in the gas chamber of the stabilizer dampener and/or when the level of vacuum falls below a certain threshold. The venturi vacuum regulator may further be configured to automatically stop the venturi vacuum generator when a threshold vacuum level is reached and maintain such vacuum level, such as by using a check valve and/or the like.

In some embodiments, the novel venturi vacuum regulator techniques disclosed herein may also be used for a general-purpose vacuum regulator in systems other than fluid pump inlet stabilizer dampeners. In some embodiments, the novel venturi vacuum regulators disclosed herein have a variety of benefits, such as having a relatively small number of moving parts that make the design robust and requiring of minimal maintenance. For example, some embodiments bias a flow control piston using only pressure differentials, without using any mechanical biasing components such as springs. In some embodiments, such a design can be more desirable than significantly more complex vacuum regulators, particularly in use cases where a precise level of vacuum is not required to be maintained.

Although various embodiments disclosed herein are described with reference to providing stabilization and/or dampening at the inlet of a fluid pump, the systems, methods, and devices disclosed herein are not limited to such use cases, and could be beneficial in other systems, including at other areas of fluid piping systems and the like.

Stabilization and Dampening in Fluid Pumping Systems

FIG. 1 illustrates a schematic diagram of an example embodiment of a fluid pumping system 100. The fluid pumping system 100 comprises a pump 104 (shown in cross-section) that pumps a liquid 108 from a supply tank 106 through upstream or inlet piping 110 and out downstream or outlet piping 112. The pump 104 may comprise, for example, a positive displacement pump. The system further includes an automated inlet stabilizer dampener 102 connected in fluid communication with the inlet piping 110 in order to stabilize and dampen the fluid flow from the supply tank 106 to the pump 104. In this embodiment, the stabilizer dampener 102 is connected in an appendage configuration (e.g., in parallel with the pump 104), although other embodiments may connect the stabilizer dampener 102 in series with the pump 104. A pressurized gas source 114, such as an air compressor or other source of pressurized gas (such as compressed air), supplies compressed air through pipe 116 to an inlet of the automated inlet stabilizer dampener 102.

As discussed above, in some situations, a pump may be operating in a positive pressure mode or a suction mode depending on the level of liquid supply in a supply tank. The embodiment of FIG. 1 illustrates such a situation, where pump 104 is positioned vertically between the upper and lower limits of the supply tank 106. Accordingly, when the liquid 108 is at a relatively high level within the supply tank 106, the supply tank 106 will be supplying liquid 108 to the pump 104 in a positive pressure fashion, whereas when the liquid 108 is at a relatively low level, the pump 104 will need to suck the liquid 108 from the supply tank 106. The automated inlet stabilizer dampener 102 is desirably able to compensate for both situations, by automatically pressurizing a gas chamber of the stabilizer dampener 102 when the pump is operating in a positive pressure fashion, and automatically generating a vacuum within the gas chamber of the stabilizer dampener 102 when the pump is operating in a suction fashion. Further details of how the stabilizer dampener 102 is able to function in this manner are given below.

Automatic Inlet Stabilizer Dampener

Figure 2A:
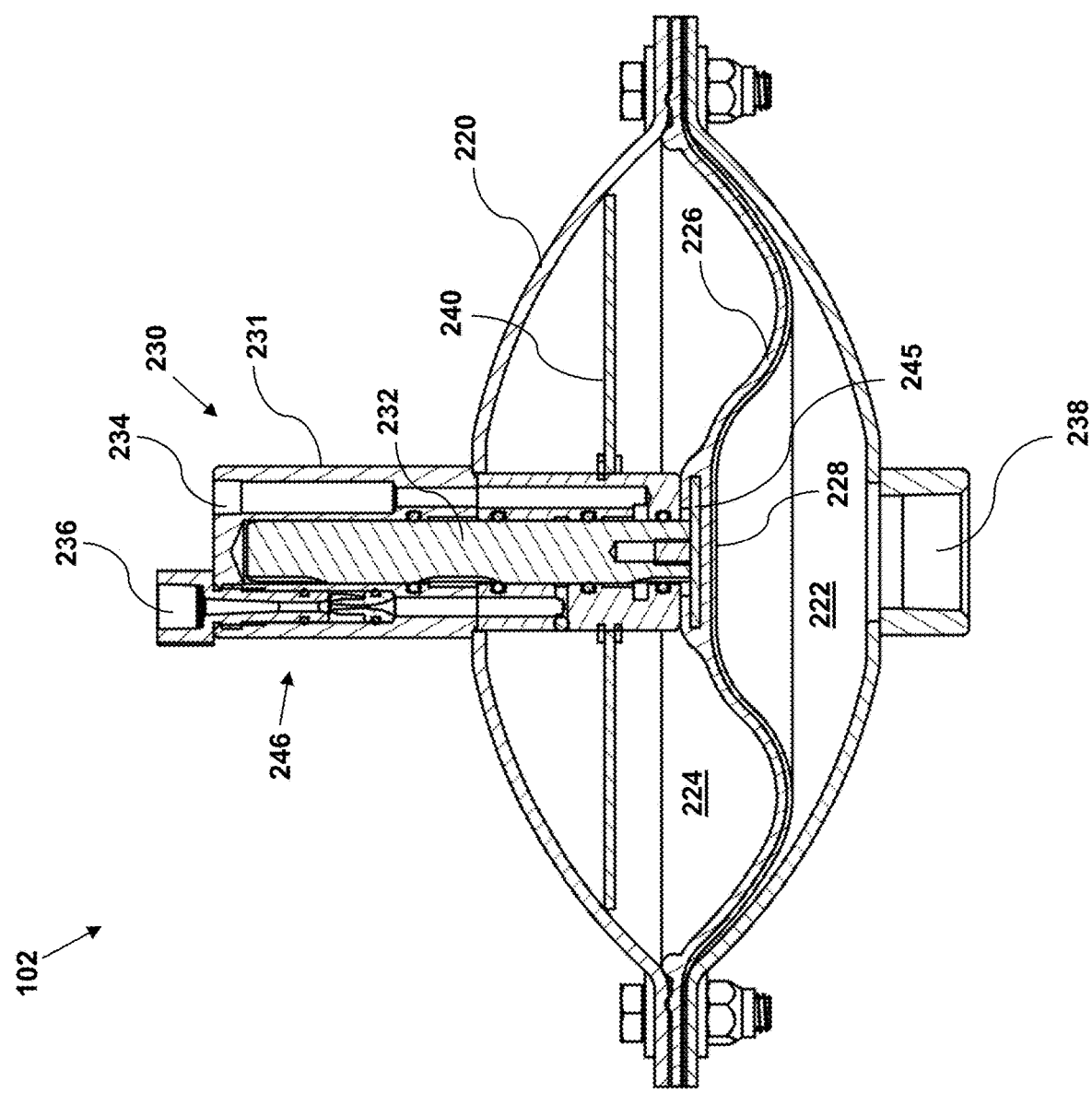
FIG. 2A is a cross-sectional view of the automatic inlet stabilizer dampener of FIG. 1.

FIGS. 2A-2E illustrate further details of the automatic inlet stabilizer dampener 102 of FIG. 1. FIG. 2A is a cross-sectional view of the overall stabilizer dampener 102. The stabilizer dampener 102 comprises a valve assembly 230 coupled to an enclosure 220. Enclosure 220 comprises an internal cavity that is separated into a liquid chamber 222 and a gas chamber 224 by a deformable diaphragm or bladder 226. The liquid chamber 222 is able to be connected in fluid communication with, for example, inlet piping 110 of FIG. 1, through liquid inlet port 238. The stabilizer dampener 102 further desirably comprises an annular ring or other deformation limiter 240 that helps to limit excess deformation of the deformable diaphragm 226, such as, for example, in response to a pressure spike, particularly when the gas chamber 224 is in a vacuum mode, which might otherwise cause the deformable diaphragm 226 to be over-extended, damaged, and/or plastically deformed.

As discussed above, it can be desirable for the volume of the internal cavity defined by enclosure 220 to be devoted approximately 80% to the gas chamber 224 and 20% to the liquid chamber 222. Other percentages may be used, however, and the portion of the volume of the internal cavity defined by enclosure 220 that is targeted to comprise the gas chamber 224 may in some embodiments be approximately 50%, 60%, 70%, 80%, or 90%. In some embodiments, the targeted size of the gas chamber 224 may be within a range bounded by any of the above numbers. In some embodiments, the stabilizer dampener 102 is configured to automatically make adjustments in response to pressure fluctuations and/or changes in the liquid chamber 222 in order to attempt to maintain such desirable sizes of the gas chamber 224. At least some of such automatic adjustments may be caused to occur through movement of a piston, shaft, and/or other component, as described in greater detail below. In some embodiments, the piston or shaft 232 is the only moving part of the valve 230, which can, for example, help to increase the robustness of the design and/or to reduce maintenance requirements. In some embodiments, the system may be configured to target a certain gas chamber volume (such as approximately 80%) through analysis and/or testing that determines the ideal positions of the piston 232 relative to the valve housing 231 at which to cause introduction of pressurized gas into the gas chamber and to cause extraction of gas from the gas chamber.

Automatically adjusting the pressure in the gas chamber 224 based on relative volume differentials between the gas chamber and liquid chamber can be a more desirable way of controlling systems disclosed herein than, for example, adjusting the pressure in the gas chamber 224 based on relative pressure differentials between the gas chamber and liquid chamber. Testing has shown that, in operation, the gas chamber and liquid chamber of dampeners similar to designs disclosed herein will generally exhibit the same pressure, meaning little to no pressure differential between them, as long as the diaphragm or bladder has not been moved to the end of its stroke. Once the pressure in the liquid chamber increases or decreases enough for the diaphragm or bladder to move completely to one end of the assembly (e.g., to the end of its stroke), however, then a pressure differential may arise between the gas and liquid chambers. Once the diaphragm or bladder has been deformed that much, however, dampening performance is significantly decreased. Accordingly, while it may be possible to at least somewhat automatically control inlet stabilizer dampeners similar to embodiments disclosed herein based on detecting pressure differentials between the gas and liquid chambers, testing has shown that it can be more desirable to control embodiments disclosed herein based on detecting volume differentials between the gas and liquid chamber. In some embodiments, the volume differential between the gas and liquid chamber is detected by the position of a piston with respect to a valve housing (with, for example, the position of the piston being driven by the position of a deformable diaphragm attached to the piston). Other techniques may be used to detect the volume differential, however.

With continued reference to FIG. 2A, the valve assembly 230 comprises a valve housing 231 and a piston 232 longitudinally slidable with respect to the valve housing 231. A distal end of the piston 232 is coupled to a portion of the deformable diaphragm 226, in this case a central portion of the deformable diaphragm 226. This can, for example, enable movement and/or deformation of the deformable diaphragm 226 to cause longitudinal or axial sliding of the piston 232 with respect to the valve housing 231 (or at least to influence a magnitude of the longitudinal or axial sliding). The deformable diaphragm 226 may be connected to the piston 232 using, for example, a disc 245 (such as a metal disc or other suitably rigid component) that decreases the deformability of the diaphragm in the area that connects to the piston 232. Desirably, the disc 245 comprises a diameter that is larger than a diameter of the liquid inlet port 238, in order to reduce the risk of damage to the deformable diaphragm 226 in a situation where the pressure in the liquid chamber 222 is significantly lower than the pressure in the gas chamber 224. Stated another way, it is desirable for the disc 245 to be sized such that the disc 245 will help to prevent the deformable diaphragm 226 from being sucked into the liquid inlet port 238 in response to a high pressure differential between the gas chamber 224 and liquid chamber 222. A bolt, screw, or the like may then be used to connect that portion of the diaphragm 226 to the piston 232, such as by connecting to threaded region 244 (see FIG. 2C). The sliding of the piston 232 with respect to the valve housing 231 may also be caused or influence by other factors, such as pressure differentials between the gas chamber 224, the liquid chamber 222, the compressed air source (e.g., the pressure at inlet port 234), and/or the vacuum source (e.g., the level of vacuum at cavity 275, as discussed below with reference to FIG. 2E).

FIG. 2A also illustrates that the valve housing 230 further comprises a pressure inlet port 234 that can be connected to, for example, a supply of compressed air. The valve housing 231 further comprises a discharge port 236 that can be used to, for example, expel gas from the valve assembly 230 when generating a vacuum within the gas chamber 224. The discharge port 236 may be connected to a discharge pipe, a silencer, another component of the fluid piping system, or may in some embodiments be unconnected. The valve assembly 230 can further comprise a venturi vacuum generator 246, which operates as described in more detail below.

As described in more detail below with reference to FIGS. 2B-2E, the valve assembly 230 desirably comprises a plurality of fluid flow paths that can be selectively opened and closed depending on the position of the piston 232 with respect to the valve housing 231. For example, when the piston 232 is in a fully retracted position, as shown in FIG. 2A, a flow path that enables introduction of compressed gas from the pressure inlet port 234 into the gas chamber 224 may be opened. When the piston 232 is in an extended position with respect to the valve housing 231 (as shown in FIGS. 3E and 3F, described below), the compressed gas flow path into the gas chamber 224 may be closed, and a flow path from the gas chamber 224 through the venturi vacuum generator 246 and out the discharge port 236 may be open. Further, in such a configuration, a flow path from the pressure inlet port 234 through the valve housing 231 and out the discharge port 236 through the venturi vacuum generator 246 may be opened, in order activate the venturi vacuum generator 246. Further, when the piston 232 is in a position between the retracted and extended positions, the piston 232 may be configured to close all three of the above described flow paths.

Figure 2B:
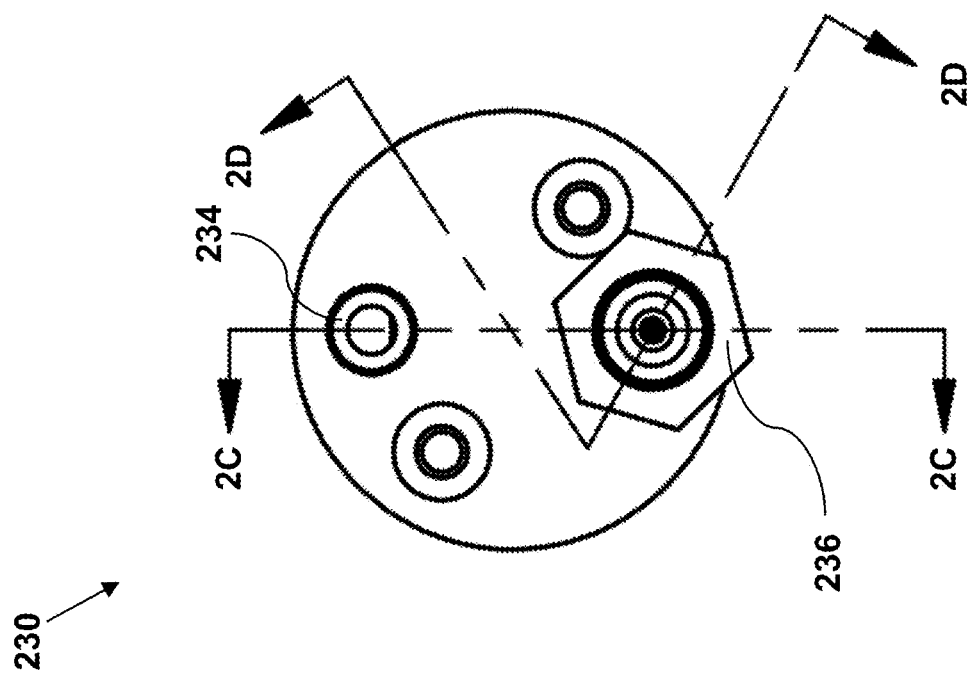
FIG. 2B is a top view of a valve assembly of the automatic inlet stabilizer dampener of FIG. 1.
Figure 2E:
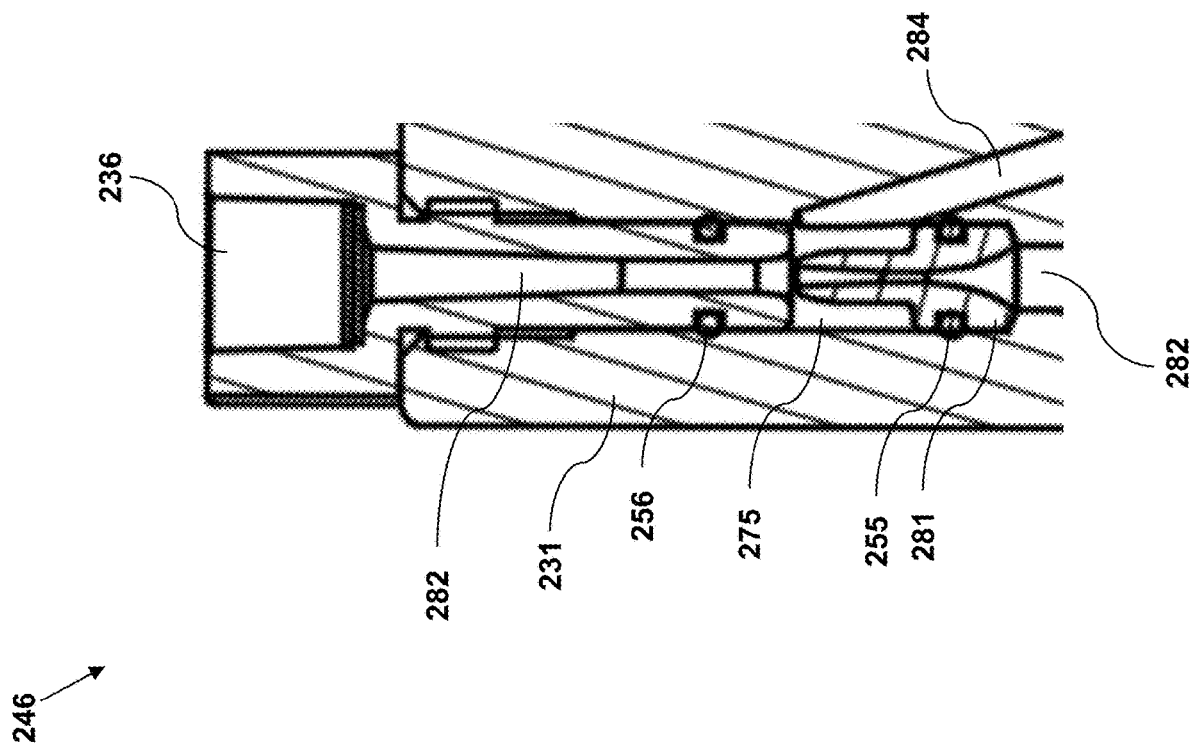
FIG. 2E is an enlarged cross-sectional view of venturi vacuum generator of the valve assembly of FIG. 2B.

FIGS. 2B-2E illustrate further details of the valve assembly 230 and venturi vacuum generator 246 that enable the above described operation. FIG. 2B is a top view of the valve assembly 230 that illustrates the section planes used for the side cross-sectional views of FIGS. 2C and 2D. FIG. 2E is an enlarged detail cross-sectional view of FIG. 2D showing additional detail of the venturi vacuum generator 246.

With reference to FIGS. 2C and 2D, the valve assembly 230 comprises a number of chambers, channels, O-rings, and grooves that cooperate to open and close a number of flow paths between the pressure inlet port 234, the discharge port 236, and the gas chamber 224 (shown in FIG. 2A) depending on the position of the piston 232 with respect to the valve housing 231. For example, the valve assembly 230 comprises a pressure inlet channel 280, a vacuum generator inlet channel 282, a vacuum channel 284, and a gas chamber channel 286. The valve assembly 230 further comprises a first chamber 271, a second chamber 272, a third chamber 273, and a fourth chamber 274. The fourth chamber 274 is desirably in fluid communication with the gas chamber 224 through gas chamber channel 286 and gas chamber port 288. The first chamber 271 is desirably in fluid communication with a compressed air source through pressure inlet channel 280 and pressure inlet port 234. The inlet of the venturi vacuum generator 246 (e.g., the proximal end of venturi nozzle 281 of FIG. 2E) is desirably in fluid communication with the vacuum generator inlet channel 282, while the suction portion of the venturi vacuum generator 246 (e.g., chamber 275 of FIG. 2E) is desirably in fluid communication with vacuum channel 284.

The four chambers 271, 272, 273, and 274 are selectively sealed from one another by first O-ring 251, second O-ring 252, third O-ring 253, and fourth O-ring 254. One or more of the chambers can be selectively connected together in fluid communication through one or more grooves in the piston 232 that allow a fluid to flow around the O-rings. Specifically, the piston 232 comprises a first groove 261, a second groove 262, and a third groove 263. Although this and other embodiments disclosed herein are described as utilizing O-rings to seal chambers from one another, and grooves in a piston to allow selective fluid flow past the O-rings, various alterations to such a design may be used without departing from the spirit of the inventions disclosed herein. For example, sealing members other than O-rings may be used, something other than a groove in the piston may be used, such as another type of recess, depression, flow path through the piston, and/or the like. Further, some embodiments may place the O-rings on the piston 232 and the grooves on the valve housing 231. Further detail of how the various chambers are selectively connected together based on the position of the piston 232 are provided below with reference to FIGS. 3A-3F.

Turning to FIG. 2E, FIG. 2E illustrates further detail of the venturi vacuum generator 246. The venturi vacuum generator 246 comprises a venturi nozzle 281 and a discharge housing 282. The venturi nozzle 281 is desirably sealed within a fifth chamber 275 by a fifth O-ring 255, and the discharge housing 282 is desirably sealed within the fifth chamber 275 by a sixth O-ring 256. In operation, when compressed air (or another pressurized gas) is caused to flow through the vacuum generator inlet channel 282, the tapered nozzle shape of the venturi nozzle 281 desirably causes the speed of the compressed air to increase as it flows through the venturi nozzle 281, thus reducing the pressure in fifth chamber 275 through the venturi effect. The compressed air then flows out through the tapered channel of the discharge housing 282. Due to the reduced pressure in the fifth chamber 275, a vacuum can be generated in vacuum channel 284 that desirably sucks air (or another gas) out of the gas chamber 224 of the stabilizer dampener 102 (see FIG. 2A), thus reducing the pressure within the gas chamber and/or generating a vacuum within the gas chamber.

Valve Assembly Selectable Flow Paths

As discussed above, the valve 230 can selectively open and close a number of fluid flow paths depending on the position of the piston 232 with respect to the valve housing 231. With reference to FIG. 2D, the position of the piston 232 with respect to the housing 231 is desirably controlled by (or at least partially controlled by) the connection of the distal end of the piston 232 to the deformable diaphragm, such as by using connecting feature 244 (such as a threaded connection or other suitable connection). The deformable diaphragm desirably moves or deforms in response to pressure changes in the liquid chamber 222, which changes the volume differential between the gas and liquid chambers 224, 222, and also changes the position of the piston 232 with respect to the housing 231.

Figure 3B:
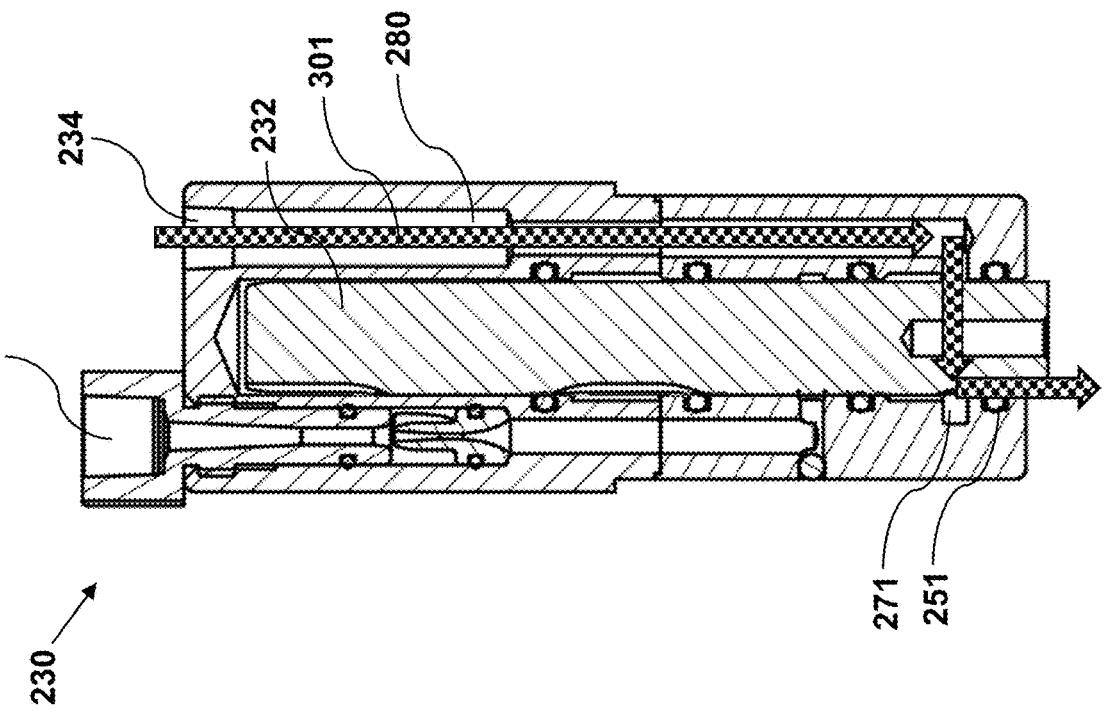
FIGS. 3A and 3B are cross-sectional views of the valve assembly of FIG. 2B illustrating fluid flow paths with a piston in a retracted position.
Figure 3A:
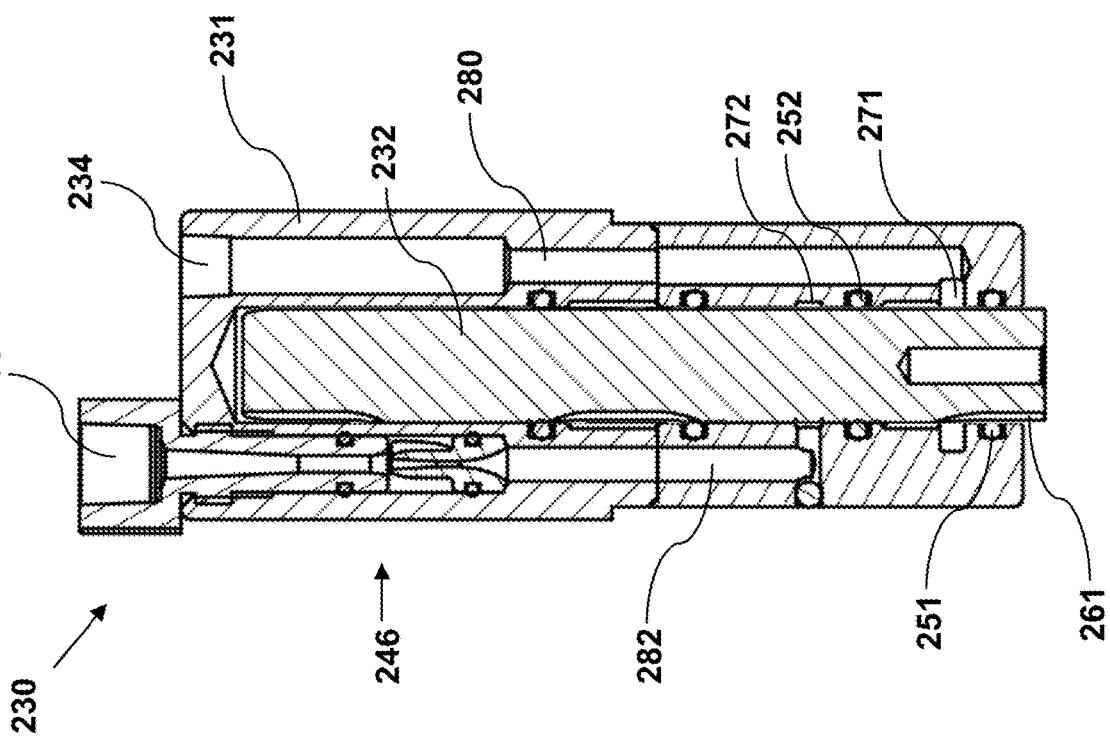
Figure 3F:
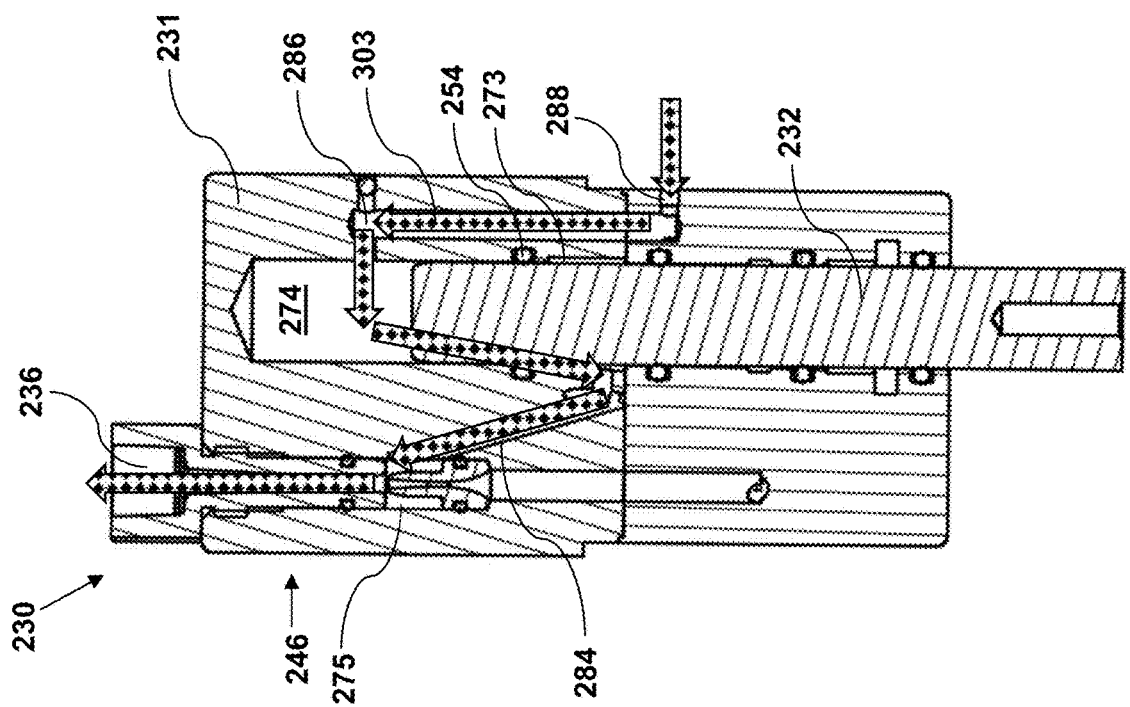
FIGS. 3E and 3F are cross-sectional views of the valve assembly of FIG. 2B illustrating fluid flow paths with the piston in an extended position.
Figure 3E:
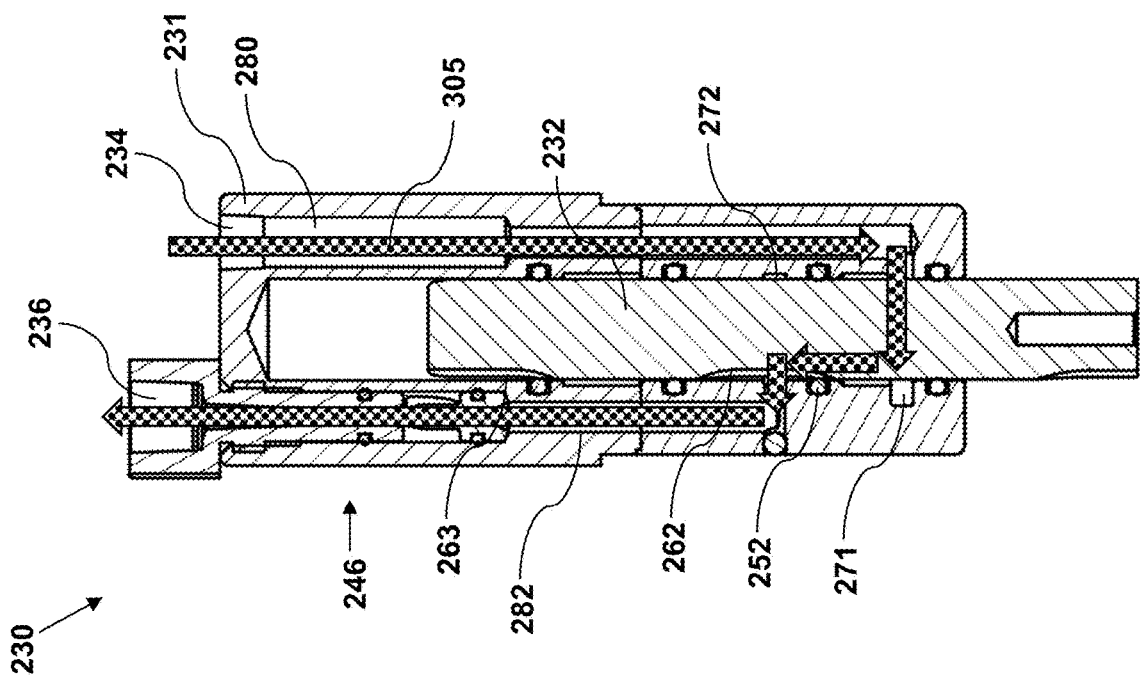

Moving to FIGS. 3A-3F, these figures illustrate how the various flow paths defined by the valve assembly 230 are opened and closed depending on the position of the piston 232 with respect to the valve housing 231. In each of these figures, a compressed air flow path 301 or 305 is depicted by arrows with a square pattern fill, and a vacuum flow path 303 is depicted by arrows with a diamond pattern fill. FIGS. 3A and 3B illustrate the piston 232 in a retracted position with respect to valve housing 231, FIGS. 3C and 3D illustrate the piston 232 and an intermediate, middle, or equilibrium position with respect to the valve housing 231, and FIGS. 3E and 3F illustrate the piston 232 in an extended position with respect to the valve housing 231.

With reference to FIGS. 3A and 3B, the piston 232 is shown in the retracted position with respect to the valve housing 231. The piston 232 may be in such a position, for example, as a result of a pressure increase in the liquid chamber 222 that causes the diaphragm to deform toward the gas chamber. Accordingly, it may be desirable in such a situation to introduce compressed air into the gas chamber 224 to increase the volume of the gas chamber 224 with respect to the liquid chamber 222, to move back toward a targeted volume distribution between the gas and liquid chambers (such as 80%/20%). The compressed gas is introduced into the gas chamber 224 through compressed air flow path 301 that starts at pressure inlet port 234 and passes through pressure inlet channel 280 into first chamber 271. Due to the piston 232 being in the retracted position, first groove 261 of the piston 232 is aligned such that the compressed air flow path 301 can then pass from first chamber 271, through first groove 261 around first O-ring 251, and into the gas chamber 224 of the inlet stabilizer dampener 102.

With continued reference to FIGS. 3A and 3B, with the piston 232 in the retracted position, the venturi vacuum generator 246 desirably is not activated, because a flow path is not open from the pressure inlet port 234 to the vacuum generator inlet channel 282. Stated another way, the flow path 305 from the pressure inlet port 234 to the vacuum generator inlet channel 282 described below with reference to FIG. 3E is closed. Further, with the piston 232 in the retracted position, the flow path 303 from the gas chamber 224 to the discharge port 236 (shown in FIG. 3F) is closed.

Turning now to FIGS. 3C and 3D, these figures illustrate the piston 232 in an intermediate, middle, or equilibrium position with respect to the valve housing 231. The piston 232 may move to such a position, for example, from the retracted position of FIG. 3A, due to sufficient compressed air being introduced into the gas chamber 224 of the inlet stabilizer dampener 102 to cause the diaphragm to deform sufficiently toward the liquid chamber such that the relative volumes of the gas chamber 224 and liquid chamber 222 are within a desirable range. For example, in some embodiments, it may be desirable for intermediate position to be equivalent to when the volume distribution between the gas chamber and liquid chamber is 80%/20%. As another example, it may be desirable for the intermediate position to be equivalent to when the volume distribution between the gas chamber and liquid chamber is within a certain range, such as 90%/10% to 70%/30%, 85%/15% to 75%/25%, and/or the like. Some techniques used to set such a range and/or equilibrium point may be to adjust to the pressure of the gas introduced to the valve assembly 230 at the pressure in the port 234, to adjust to the diameter of the piston 232, to adjust the longitudinal positions of the grooves and/or O-rings, and/or the like.

When the piston 232 is in the intermediate position with respect to the valve housing 231, the compressed air flow path 301 is desirably closed at first chamber 271. Due to the positioning of the first groove 261 of the piston 232 as being below first O-ring 251, and of the second groove 262 being positioned above the second O-ring 252, the first chamber 271 is desirably closed off from any other chambers or channels other than the pressure inlet channel 280. Further, as with the retracted position of the piston 232 (shown in FIGS. 3A and 3B), the venturi vacuum generator 246 is still desirably disabled, because there is no open flow path from the pressure inlet channel 282 the vacuum generator inlet channel 282. Further, the flow path 303 from the gas chamber 224 to the discharge port 236 (shown in FIG. 3F) is still desirably closed.

If the pressure in the liquid chamber 222 decreases, the piston 232 may extend with respect to the housing 231 (e.g., in response to the diaphragm deforming toward liquid chamber) until it reaches an extended position, as shown in FIGS. 3E and 3F. In the extended position, the venturi vacuum generator 246 is desirably activated in order to suck some gas out of the gas chamber 224 and/or to generate a vacuum in gas chamber 224. In order to do so, with reference to FIG. 3E, the compressed air supply is again allowed to flow through the valve assembly 230, but following compressed air flow path 305 instead of compressed air flow path 301 of FIG. 3B. Specifically, the second groove 262 of the piston 232 is positioned over the second O-ring 252 such that the compressed air flow path 305 can flow through pressure inlet channel 280 to first chamber 271, around second O-ring 252 into second chamber 272, and then through vacuum generator inlet channel 282 and the venturi vacuum generator 246.

Turning now to FIG. 3F, the compressed air flow path 305 desirably causes the venturi vacuum generator 246 to generate a vacuum at fifth chamber 275. This accordingly also generates a vacuum in vacuum channel 284, which is in fluid communication with fifth chamber 275, and in third chamber 273 that is in fluid communication with vacuum channel 284. Further, because the third groove 263 of the piston 232 is positioned over the fourth O-ring 254, fluid communication is allowed between fourth chamber 274 and third chamber 273. Accordingly, a vacuum flow path 303 is opened from the gas chamber 224 through gas chamber port 288, gas chamber channel 286, fourth chamber 274, third groove 263, third chamber 273, vacuum channel 284, fifth chamber 275, and out the discharge housing 282 through the discharge port 236. The vacuum flow path 303 may desirably remain open until a desirable ratio of volumes between the gas chamber 224 and liquid chamber 222 is again achieved, resulting in the diaphragm deforming sufficiently toward the gas chamber that the piston 232 returns to an intermediate position such as shown in FIGS. 3C and 3D, at which time all compressed air and vacuum flow paths are again closed off. Closing off vacuum flow path 303 by moving third groove 263 above fourth O-ring 254 can be desirable, such as to maintain the generated level of vacuum in the gas chamber 224 without having to continually run the venturi vacuum generator 246.

The valve assembly 230 may be configured to have a certain amount of hysteresis in the system that allows there to be a certain range of volume ratios between the liquid chamber 222 and gas chamber 224 within which the piston 232 will remain in an intermediate, middle, or equilibrium position such as shown in FIGS. 3C and 3D where each of the compressed air and vacuum flow paths 301, 303, and 305 are closed off. For example, such allowable movement of the piston 232 in the intermediate position may extend from a retracted point where the piston 232 is retracted such that the upper edge of first groove 261 is just below first O-ring 251 to an extended point where the piston 232 is extended such that the lower edge of second groove 262 is just above second O-ring 252 and the lower edge of third groove 263 is just above fourth O-ring 254. The amount of stroke of the piston 232 between such retracted and extended points within the intermediate position can define the amount of hysteresis in the valve assembly 230. In some embodiments, a ratio of this stroke length to a diameter of the piston 232 can be approximately 0.7. In some embodiments, the ratio can be approximately or at least 0.2, 0.3, 0.4, 0.5, 0.6, 0.7, 0.8, 0.9, 1.0, 1.1, 1.2, 1.3, 1.4, 1.5, or higher. In some embodiments, the ratio can be within a range bounded by any of the above numbers. In some embodiments, the amount of hysteresis can be defined as the percentage of total stroke of the piston 232 that comprises the intermediate position. For example, in some embodiments, it may be desirable for 30% of the total stroke of the piston to comprise the intermediate position, 25% of the total stroke of the piston to comprise the retracted position, and 45% of the total stroke of the piston to comprise the extended position. In some embodiments, the percentage of the total stroke of the piston that comprises the intermediate position may be higher or lower than the above example. For example, the percentage of the total stroke of the piston that comprises the intermediate position can be approximately or at least 10%, 20%, 30%, 40%, 50%, or 60%. In some embodiments, the percentage of the total stroke of the piston that comprises the intermediate position can be within a range of 10 to 60%, 10 to 50%, 20 to 40%, or 25 to 35%. Further, the percentage of the total stroke of the piston that comprises the retracted position can be approximately or at least 10%, 20%, 30%, 40%, or 50%. Further, the percentage of the total stroke of the piston that comprises the extended position can be approximately or at least 20%, 30%, 40%, 50%, 60%, 70%, 80%, or 90%. These various percentages can be adjusted by, for example, changing the lengths and the relative positions of the grooves and O-rings.

Allowing a certain amount of hysteresis in the piston stroke can be desirable, for example, such as to keep the flow paths 301, 303, and/or 305 from opening and closing at a rapid rate that could introduce undesirable effects into the system, cause premature wear of the system, and/or the like. Further, although in this embodiment flow paths 303 and 305 desirably open and close simultaneously, some embodiments may not open and close flow paths 303 and 305 at the same time.

Although the presently described embodiment includes only three grooves 261, 262, 263 in the piston 232 in order to open and close various fluid flow paths in the retracted, intermediate, and extended positions, various other embodiments may include a greater number of grooves and/or differently sized grooves. For example, in order to change the sensitivity and/or response time of the valve, the sizes of the grooves may be increased or decreased such that more or less fluid can flow through the grooves at a given pressure, and/or the number of grooves may be changed. The sizes of the grooves may be varied in a number of ways, such as varying the length, width, depth, shape, and/or the like. For example, although the presently described embodiment includes only one groove 261 that couples chamber 271 to the liquid chamber, one groove 262 that couples chamber 271 to chamber 272, and one groove 263 that couples chamber 273 to chamber 274, some embodiments may include more than one groove to couple any of the chambers. Adding additional grooves could be used to, for example, increase the fluid flow rate between chambers for a given pressure, similarly to how increasing the size of a groove could be used to increase the fluid flow rate between chambers for a given pressure. In some embodiments, both the sizes of the grooves and the numbers of grooves can be adjusted to obtain a desirable sensitivity and/or responsiveness of the valve. In some embodiments, when there are two or more grooves configured to couple a particular combination of chambers together, some or all of the two or more grooves may comprise different sizes and/or positions. For example, one groove may be longer than another, wider than another, deeper than another, shaped differently than another, shifted in an axial direction with respect to another, and/or the like. Such a design may enable more fine control and/or tuning of the flow paths. For example, such a design may enable a flow path between two chambers to have a smaller cross-sectional area when first opened (e.g., when the piston first reaches the retracted, intermediate, or extended position) than when the piston continues moving further into the retracted, intermediate, or extended position. Such a design can have a number of benefits. For example, such a design may allow for a more gradual start to the flow of fluid between the two chambers. As another example, if the piston is positioned at the edge of the retracted, intermediate, or extended position, this may be an indication that only a small adjustment needs to be made, and thus it may be desirable to have a smaller flow path opened than if a larger adjustment needed to be made.

Additional Automatic Inlet Stabilizer Dampener

Figure 4:
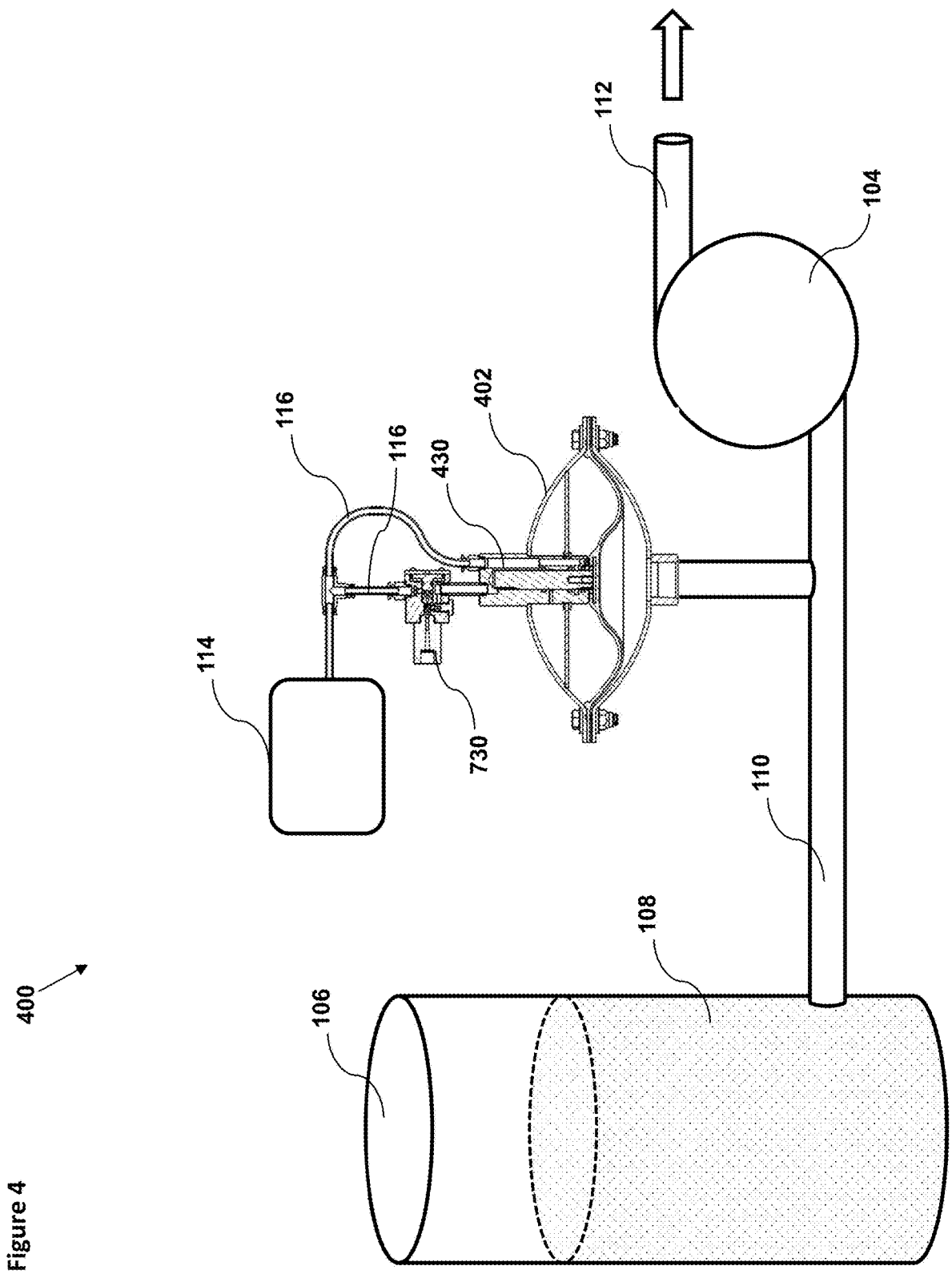
FIG. 4 illustrates a schematic diagram of a fluid pumping system that includes another embodiment of an automatic inlet stabilizer dampener.
Figure 5A:
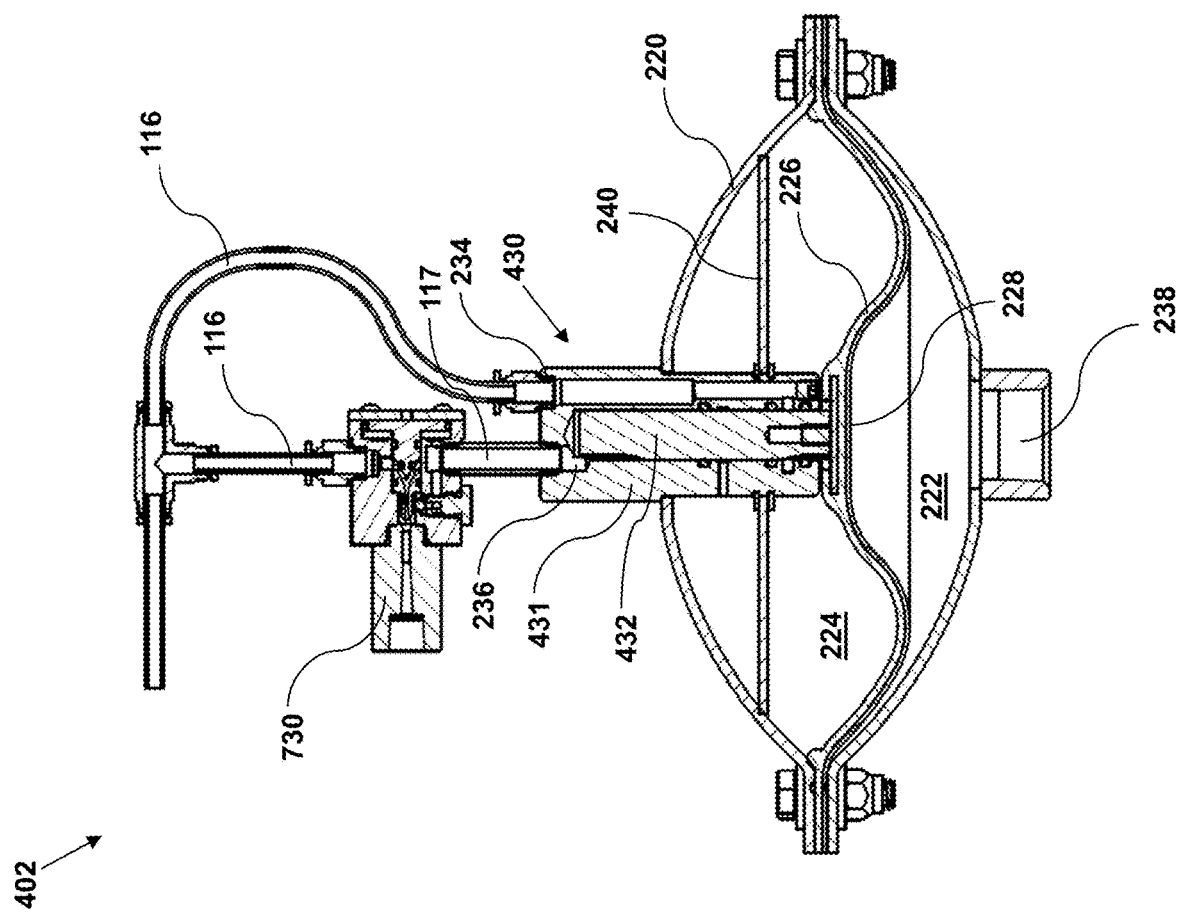
FIG. 5A is a cross-sectional view of the automatic inlet stabilizer dampener of FIG. 4.

FIG. 4 illustrates an alternative embodiment of a pumping system 400 comprising an automatic inlet stabilizer dampener 402. The pumping system 400 is similar to the pumping system 100 of FIG. 1, and the same or similar reference numbers are used to refer to the same or similar components. One main difference between the pumping systems 400 and 100 is that a different automatic inlet stabilizer dampener 402 is used. The inlet stabilizer dampener 402 can perform similar functions as the inlet stabilizer dampener 102 describe above, but by operating in a somewhat different fashion. For example, with reference to the enlarged cross-sectional view of the automatic inlet stabilizer dampener 402 of FIG. 5A, the stabilizer dampener 402 still comprises an enclosure 220 defining a gas chamber 224 and liquid chamber 222 separated by a deformable diaphragm 226. Further, a center portion 228 of the deformable diaphragm 226 is still coupled to a piston 432 that can slide or move longitudinally with respect to a valve housing 431 of a valve assembly 430. The valve housing 431 and piston 432 are configured somewhat differently than in the valve assembly 230 described above, however. These differences are described in greater detail below.

Another difference between the inlet stabilizer dampener 402 and the inlet stabilizer dampener 102 is that the inlet stabilizer dampener 402 separates the vacuum control or regulation into a vacuum regulator 730 that is separate from the valve assembly 430. Stated another way, instead of having an integrated venturi vacuum generator in the valve assembly 230, the valve assembly 430 connects its discharge port 236 to an automatic venturi vacuum regulator 730 through pipe 117. Like the valve assembly 230, the valve assembly 430 comprises a pressure inlet port 234 connectable to a compressed air source, such as through a pipe 116. Further, because the vacuum source of the inlet stabilizer dampener 402 is separated out into its own venturi vacuum regulator 730, an additional pipe 116 can supply compressed air (or another pressurized gas) to the venturi vacuum regulator 730.

Like in the automatic inlet stabilizer dampener 102, it can be desirable in the automatic inlet stabilizer dampener 402 to disable the venturi vacuum generation mechanism when additional vacuum is not needed. This can help to conserve energy, reduce noise, and/or the like. Accordingly, the venturi vacuum regulator 730 can be configured to automatically turn on and off when additional vacuum does or does not need to be applied to the discharge port 236 of the valve assembly 430. Further details of the operation of the venturi vacuum regulator 730 are given below with reference to FIGS. 7A-8D.

Figure 5B:
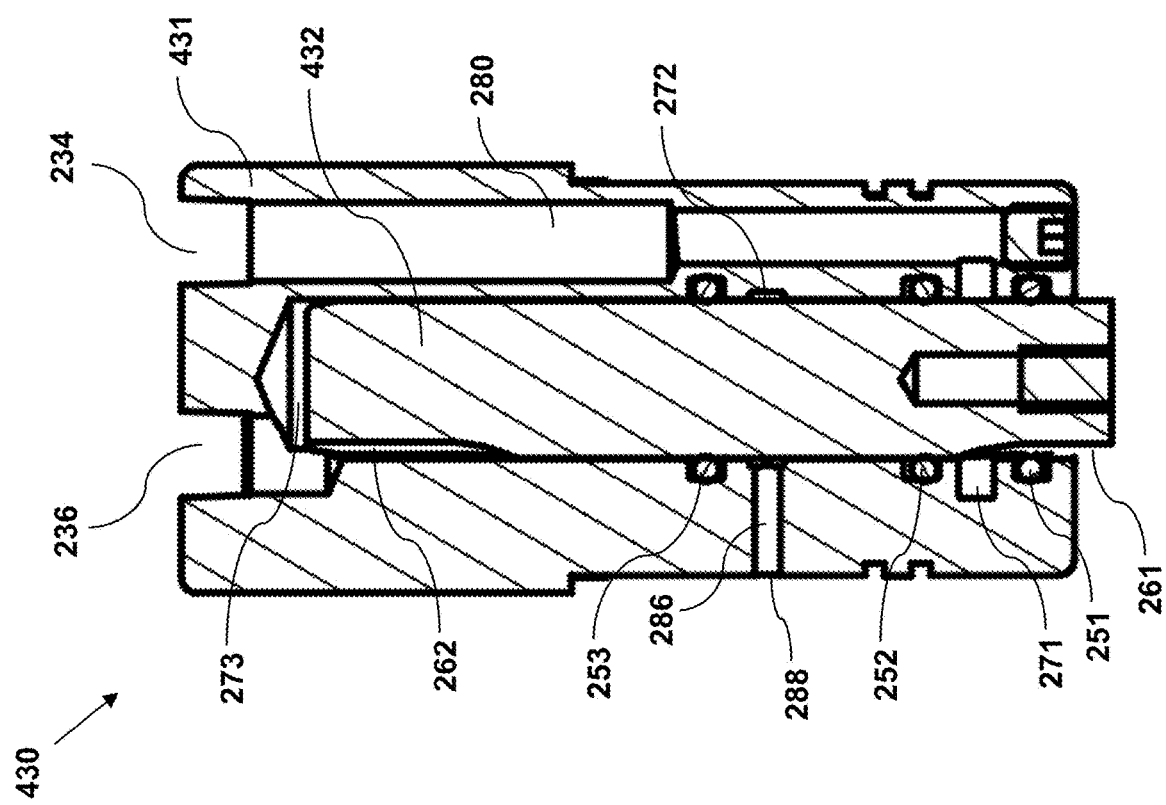
FIG. 5B is a cross-sectional view of a valve assembly of the automatic inlet stabilizer dampener of FIG. 5A.

Turning to FIG. 5B, FIG. 5B illustrates a cross-sectional view of the valve assembly 430. The valve assembly 430 contains several similar features to the valve assembly 230, and the same or similar reference numbers are used to refer to the same or similar features. Like the valve assembly 230, the valve assembly 430 comprises a piston 432 that is slidably coupled to a valve housing 431. Depending on the position of the piston 432 with respect to the valve housing 431, a plurality of fluid flow paths may be opened or closed. For example, the valve housing 431 defines a pressure inlet channel 280 that extends from the pressure inlet port 234 to the first chamber 271. The first chamber 271 may be selectively in fluid communication with the gas chamber 224 (shown in FIG. 5A) through the first groove 261 of the piston 432 (and thus around first O-ring 251). The valve housing 431 further comprises a second chamber 272 that is sealed from the first chamber 271 by second O-ring 252. The second chamber 272 is desirably in fluid communication with the gas chamber 224 through the gas chamber channel 286 and gas chamber port 288. The valve housing 431 further defines a third chamber 273 that is in fluid communication with the discharge port 236 and may selectively be in fluid communication with the second chamber 272 through second groove 262 of piston 432 (and thus around third O-ring 253), depending on the position of the piston 432.

Similar to as discussed above with reference to valve assembly 230, the position of the piston 432 with respect to the valve housing 431 can be controlled by relative volume differentials between the liquid chamber 222 and the gas chamber 224 (based on movement of a diaphragm connected to the piston). The sensitivity and/or magnitude of the piston 432 movement as a result of pressure changes in the liquid chamber can be adjusted based on a number of factors, such as the magnitude of the gas pressure at pressure inlet port 234, the magnitude of vacuum at discharge port 236, the diameter of the piston 432, the diameter of the valve housing 431, the sizes of grooves in the piston 432 (e.g., length, width, depth, shape), the positioning of grooves in the piston 432, and/or the like. Although some of these factors may be set at the time of manufacturing the inlet stabilizer dampener, some of these factors may also be adjusted in the field, such as the pressurized gas level and/or the vacuum level provided by the vacuum regulator 730.

Valve Assembly Selectable Flow Paths

Figure 6C:
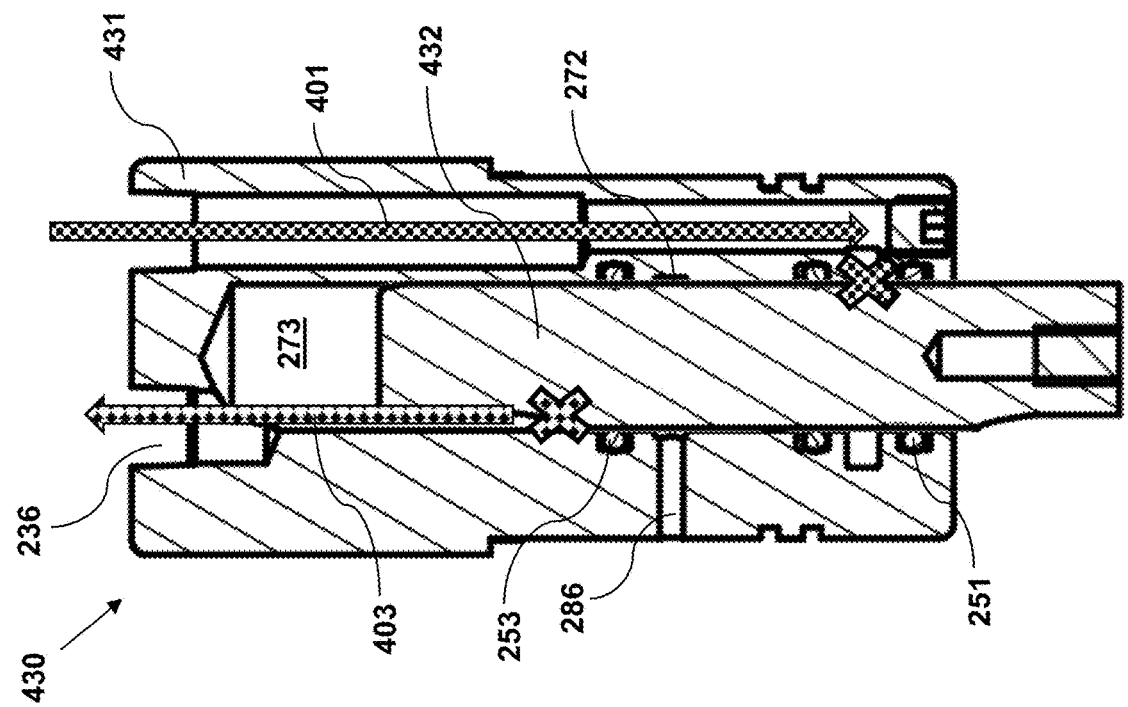
FIGS. 6C and 6D are cross-sectional views of the valve assembly of FIG. 5B illustrating fluid flow paths with the piston in an intermediate position.
Figure 6D:
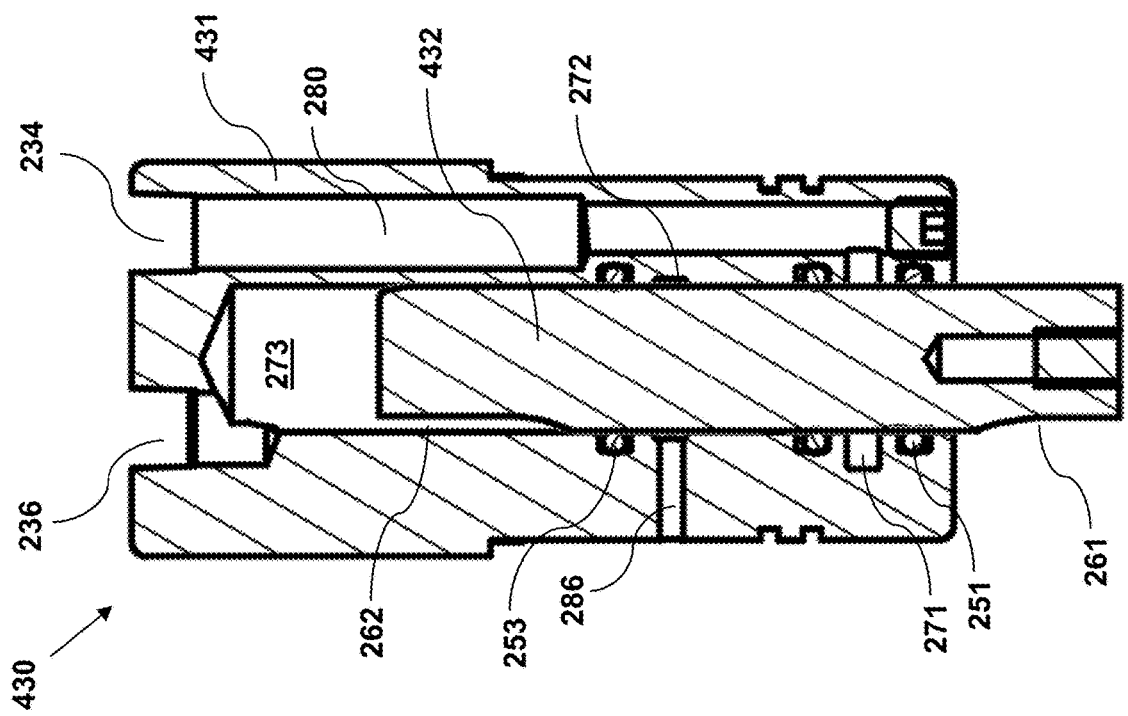

As discussed above, the valve 430 can selectively open and close a number of fluid flow paths depending on the position of the piston 432 with respect to the housing 431. FIGS. 6A-6F illustrate three different configurations, with FIGS. 6A and 6B showing the piston 432 in a retracted position with respect to the housing 431, FIGS. 6C and 6D showing the piston 432 and an intermediate, middle, or equilibrium position with respect to the housing 431, and FIGS. 6E and 6F showing the piston 432 and an extended position with respect to the valve housing 431.

With reference to FIGS. 6A and 6B, the piston 432 is shown in a retracted position with respect to the valve housing 431. The piston 432 may be in such a position, for example, if there has been a significant increase in pressure in the liquid chamber 222 of the stabilizer dampener 402 (e.g., a pressure increase significant enough to cause the diaphragm to deform toward the gas chamber sufficiently to move the piston to the retracted position). Accordingly, it may be desirable to introduce compressed air into the gas chamber 224 to bring the volume ratio between the liquid chamber 222 and gas chamber 224 toward an equilibrium and/or toward a desired range.

With the piston 432 in the retracted position, the first groove 261 of the piston 432 is positioned to allow fluid communication between the first chamber 271 and the gas chamber 224 through the first groove 261 around the first O-ring 251. FIG. 6B illustrates such a flow path as compressed air flow path 401 which flows from the pressure inlet port 234, through pressure inlet channel 280 to first chamber 271, around first O-ring 251 through first groove 261, and into the gas chamber 224.

Further, with the piston 432 in the retracted position, the second groove 262 of the piston 432 is positioned above the third O-ring 253 such that no fluid communication is allowed between the third chamber 273 and second chamber 272, which is in fluid communication with the gas chamber 224 through gas chamber channel 286. Desirably, compressed gas will continue to flow through compressed air flow path 401 until the gas chamber 224 volume is increased sufficiently, and thus the diaphragm causes the piston 432 to extend sufficiently, to a point where the first groove 261 passes the first O-ring 251 and closes off compressed air flow path 401, as shown in FIGS. 6C and 6D.

With reference to FIGS. 6C and 6D, the piston 432 is shown in an intermediate, middle, or equilibrium position with respect to the housing 431. In this position, similar to the position described above with reference to FIGS. 3C and 3D, all compressed air and vacuum flow paths within the valve assembly 430 are closed off. For example, the first groove 261 of the piston 432 is below the first O-ring 251, thus sealing off compressed air flow path 401 from passing from first chamber 271 into the gas chamber 224. Further, vacuum flow path 403 from third chamber 273 to discharge port 236 is sealed off from communicating with second chamber 272 and thus the gas chamber 224 through gas chamber channel 286 by positioning the second groove 262 of the piston 432 above the third O-ring 253. The piston 432 may remain within such an intermediate or equilibrium position until the volume ratio between the liquid chamber 222 and gas chamber 224 falls outside of a desirable range, thus causing the piston 432 to move to the retracted position of FIG. 6A or the extended position of FIG. 6E. Desirably, because both paths from the gas chamber 224 into the valve assembly 430 are closed off, the present volume of the gas chamber 224 is substantially maintained without having to continually add compressed air or operate a vacuum source.

Turning to FIGS. 6E and 6F, these figures illustrate the piston 432 in an extended position with respect to the valve housing 431. In this position, the compressed air flow path 401 remains closed by O-rings 251 and 252 at first chamber 271. The vacuum flow path 403 is opened, however. The vacuum flow path 403 is open to flow from the gas chamber 224 through gas chamber port 288 and gas chamber channel 286 to second chamber 272. Second chamber 272 is then in fluid communication with third chamber 273 through second groove 262 of the piston 432 which allows the flow path to flow around third O-ring 253. The vacuum flow path 403 can then flow from third chamber 273 through discharge port 236 to the vacuum regulator 730 (or another source of vacuum). The piston 432 can remain in an extended position until, for example, the relative volumes of the liquid chamber 222 and gas chamber 224 fall back within a desirable range or equilibrium level, thus causing the diaphragm to move the piston 432 back to an intermediate position such as shown in FIGS. 6C and 6D.

The valve assembly 430 may be configured to have a certain amount of hysteresis in the system that allows there to be a certain range of volume differentials between the liquid chamber 222 and gas chamber 224 within which the piston 432 will remain in an intermediate position such as shown in FIGS. 6C and 6D where both the compressed air and vacuum flow paths 401 and 403 are closed off. For example, such allowable movement of the piston 432 in the intermediate position may extend from a retracted point where the piston 432 is retracted such that the upper edge of first groove 261 is just below first O-ring 251 to an extended point where the piston 432 is extended such that the lower edge of second groove 262 is just above third O-ring 253. The amount of stroke of the piston 432 between such retracted and extended points within the intermediate position can defined the amount of hysteresis in the valve assembly 430. In some embodiments, a ratio of this stroke length to a diameter of the piston 432 can be approximately 0.6. In some embodiments, the ratio can be approximately or at least 0.2, 0.3, 0.4, 0.5, 0.6, 0.7, 0.8, 0.9, 1.0, 1.1, 1.2, 1.3, 1.4, 1.5, or higher. In some embodiments, the ratio can be within a range bounded by any of the above numbers. In some embodiments, the amount of hysteresis can be defined as the percentage of total stroke of the piston 432 that comprises the intermediate position. For example, in some embodiments, it may be desirable for 30% of the total stroke of the piston to comprise the intermediate position, 25% of the total stroke of the piston to comprise the retracted position, and 45% of the total stroke of the piston to comprise the extended position. In some embodiments, the percentage of the total stroke of the piston that comprises the intermediate position may be higher or lower than the above example. For example, the percentage of the total stroke of the piston that comprises the intermediate position can be approximately or at least 10%, 20%, 30%, 40%, 50%, or 60%. In some embodiments, the percentage of the total stroke of the piston that comprises the intermediate position can be within a range of 10 to 60%, 10 to 50%, 20 to 40%, or 25 to 35%. Further, the percentage of the total stroke of the piston that comprises the retracted position can be approximately or at least 10%, 20%, 30%, 40%, or 50%. Further, the percentage of the total stroke of the piston that comprises the extended position can be approximately or at least 20%, 30%, 40%, 50%, 60%, 70%, 80%, or 90%. These various percentages can be adjusted by, for example, changing the lengths and the relative positions of the grooves and O-rings.

Allowing a certain amount of hysteresis in the piston stroke can be desirable, for example, such as to keep the flow paths 401 and 403 from opening and closing at a rapid rate that could introduce undesirable effects into the system, cause premature wear of the system, and/or the like.

Although the presently described embodiment includes only two grooves 261, 262 in the piston 432 in order to open and close various fluid flow paths in the retracted, intermediate, and extended positions, various other embodiments may include a greater number of grooves and/or differently sized grooves. For example, in order to change the sensitivity and/or response time of the valve, the sizes of the grooves may be increased or decreased such that more or less fluid can flow through the grooves at a given pressure, and/or the number of grooves may be changed. The sizes of the grooves may be varied in a number of ways, such as varying the length, width, depth, shape, and/or the like. For example, although the presently described embodiment includes only one groove 261 that couples chamber 271 to the liquid chamber, and one groove 262 that couples the chamber 273 to the gas chamber, some embodiments may include more than one groove to couple any of the chambers. Adding additional grooves could be used to, for example, increase the fluid flow rate between chambers for a given pressure, similarly to how increasing the size of a groove could be used to increase the fluid flow rate between chambers for a given pressure. In some embodiments, both the sizes of the grooves and the numbers of grooves can be adjusted to obtain a desirable sensitivity and/or responsiveness of the valve. In some embodiments, when there are two or more grooves configured to couple a particular combination of chambers together, some or all of the two or more grooves may comprise different sizes and/or positions. For example, one groove may be longer than another, wider than another, deeper than another, shaped differently than another, shifted in an axial direction with respect to another, and/or the like. Such a design may enable more fine control and/or tuning of the flow paths. For example, such a design may enable a flow path between two chambers to have a smaller cross-sectional area when first opened (e.g., when the piston first reaches the retracted, intermediate, or extended position) than when the piston continues moving further into the retracted, intermediate, or extended position. Such a design can have a number of benefits. For example, such a design may allow for a more gradual start to the flow of fluid between the two chambers. As another example, if the piston is positioned at the edge of the retracted, intermediate, or extended position, this may be an indication that only a small adjustment needs to be made, and thus it may be desirable to have a smaller flow path opened than if a larger adjustment needed to be made Venturi Vacuum Regulator Turning now to FIGS. 7A-8D, these figures illustrate more detail of the automatic venturi vacuum regulator 730 that is used in the automatic inlet stabilizer dampener 402 of FIG. 5A. As discussed above, although this specific venturi vacuum regulator 730 is used in the automatic inlet stabilizer dampener 402, a different source of vacuum could be used in the automatic inlet stabilizer dampener 402, and likewise the venturi vacuum regulator 730 may be used in other systems that require a source of vacuum. One of the benefits of the venturi vacuum regulator 730 is that the regulator 730 is capable of generating a certain level of vacuum and maintaining the level of vacuum within a desired range using a small number of moving parts in a robust design that can lead to robust low-maintenance operation. For example, a position of a flow control piston may be configured to be controlled by relative pressure differentials, without requiring mechanical biasing components such as springs. Such a vacuum regulator can be more desirable than alternative designs that rely on complicated assemblies that use components prone to wear and/or failure such as springs and/or the like. Further, some embodiments are configured such that the flow control piston seals directly against the venturi nozzle to close the venturi flow path, instead of having a separate mechanism for closing the venturi flow path. Such a configuration can not only be less complicated and more robust, but can also enable an amount of hysteresis in the system to be more easily controlled (as discussed below), again without adding additional components.

FIGS. 7A and 7B illustrate side and cross-sectional views, respectively, of the venturi vacuum regulator 730. The venturi vacuum regulator 730 comprises a valve housing 701 within which a flow control piston 703 can slide longitudinally. The valve housing 701 further houses a venturi nozzle 705 and couples to a discharge housing 707. The venturi vacuum regulator 730 comprises a number of ports, including a compressed air inlet port 711, a vacuum port 713, a discharge port 709, and a breather port 725 (through cap 726).

In operation, in order to generate a vacuum at vacuum port 713, compressed air flows from compressed air inlet port 711, through chamber 712, and into venturi nozzle 705. The tapered inner surface 706 of the venturi nozzle 705 speeds up the flow of the compressed air and causes a pressure drop to occur in chamber 714 through the venturi effect. The compressed air can then flow out the discharge port 709 through nozzle 716 of the discharge housing 707. Due to the drop in pressure in chamber 714, a vacuum can be formed in chamber 718 through a fluidic connection between chambers 718 and 714. Specifically, the fluid connection between chambers 718 and 714 comprises channel 719, chamber 720, and check valve or one-way valve 721.

Some embodiments may not include a check valve (such as check valve 721) in the vacuum flow path, but having a check valve in the vacuum flow path can be desirable, such as to allow the vacuum regulator 730 to turn off once a desired level of vacuum is achieved and to maintain that desired level of vacuum. In this embodiment, the check valve 721 comprises a ball (such as a ball bearing or the like) positioned next to an O-ring. When a lower pressure is present in chamber 720 than in chamber 714, the ball is forced against the O-ring, thus closing the check valve. When a higher pressure is present in chamber 720 than in chamber 714, on the other hand, the ball can move away from the O-ring and allow gas to flow from chamber 720 to chamber 714. This is merely one example of a check valve or one-way valve, and other types of check valves or one-way valves may be used.

With continued reference to FIG. 7B, the flow control piston 703 is what enables the venturi vacuum regulator 730 to turn off and on as needed. The flow control piston 703 is axially or longitudinally slidable within the valve housing 701. A proximal side of the flow control piston 703 is in fluid communication with a breather port 725, and a distal side of the flow control piston 703 is in fluid communication with chamber 724, which is also in fluid communication with chamber 718 through channel 723. The breather port 725 is desirably in fluid communication with the environment (e.g., it is at atmospheric pressure), but could in some embodiments be connected to something other than the environment.

Following is a brief summary of the operation of the flow control piston 703. Further details, including further descriptions of flow paths, are given below with reference to FIGS. 8A-8D. In operation, when vacuum needs to be generated, the flow control piston 703 begins in the open position, as shown in FIG. 7B. As vacuum is generated at chamber 718, and thus in the valve assembly 430 of FIG. 5A (or whatever other system is connected to the vacuum port 713), a pressure differential begins to develop between breather port 725 and chamber 724. Specifically, the pressure in chamber 724 begins to decrease with respect to the pressure at breather port 725. As the pressure differential grows, the flow control piston 703 will remain biased toward the open position due to the compressed air pressure at chamber 712 acting on the upper end of the flow control piston 703. Once the vacuum generated is sufficiently high to overcome the pressure of the compressed air at chamber 712, however, the pressure differential between breather port 725 and chamber 724 will cause the flow control piston 703 to be pulled upward into a closed position against the pressure of the compressed air at chamber 712.

With continued reference to FIG. 7B, when the flow control piston 703 is moved upward into the closed position, the O-ring 733 will desirably seal against the tapered inner surface 706 of the venturi nozzle 705, thus stopping the flow of compressed air through the venturi nozzle 705. With the flow of compressed air is stopped, the vacuum generation in chamber 714 is also stopped. Due to the check valve 721, however, the vacuum level at the vacuum port 713 is desirably maintained until the system the vacuum regulator 730 is connected to (such as valve assembly 430 of FIG. 5A) allows the vacuum to decrease. Once the vacuum decreases below a threshold level, thus also decreasing the pressure differential between the breather port 725 and chamber 724, the downward force on the flow control piston 703 caused by the compressed air at chamber 712 can then force the flow control piston 703 back down to the open position, causing the venturi nozzle 705 to again generate a vacuum.

In some embodiments, the flow control piston 703 and the check valve 721 are the only moving parts in the venturi vacuum regulator 730. This can help to, for example, create a robust and low maintenance assembly. Further, it can be desirable to bias the flow control piston 703 toward the open and/or closed positions using only pressure differentials, as opposed to using mechanical components, such as springs (although some embodiments may include such mechanical components). For example, the flow control piston 703 may be biased toward the open position by a positive pressure differential between the pressure inlet port 711 and the vacuum outlet port 713, and the flow control piston 703 may be biased toward the closed position by a negative pressure differential between the vacuum outlet port 713 and the breather port 725. The current position of the flow control piston 703 can be determined by which of those pressure differentials is presently generating a larger biasing force, in order to overcome the other biasing force. One way to control the relative biasing forces is to adjust a ratio of diameters 903 and 901, as discussed below.

The venturi vacuum regulator 730 includes a number of O-rings or other sealing members that seal various chambers and flow paths from one another. For clarity, most of these O-rings are labeled in FIG. 8A instead of FIG. 7B. FIG. 8A is a similar cross-sectional view to FIG. 7B except that different elements are numbered. FIG. 8A shows a number of O-rings including first O-ring 731 that seals a first portion of the flow control piston 703 to valve housing 701, second O-ring 732 that seals a second portion of the flow control piston 703 to valve housing 701, and third O-ring 733 that selectively seals the flow control piston 703 to the tapered inner surface 706 of the venturi nozzle 705. FIG. 8A further illustrates a fourth O-ring 734 that seals an outer surface of the venturi nozzle 705 to the valve housing 701. FIG. 8A further illustrates a check valve seat screw 722 that configured to hold O-ring 736 of the check valve 721 in place and also to provide a fluid flow path between chamber 714 and channel 719. An O-ring 735 seals the check valve seat screw 722 to the valve housing 701. Finally, a seventh O-ring 737 seals the discharge housing 707 to the valve housing 701.

Vacuum Regulator Flow Paths

Figure 8D:
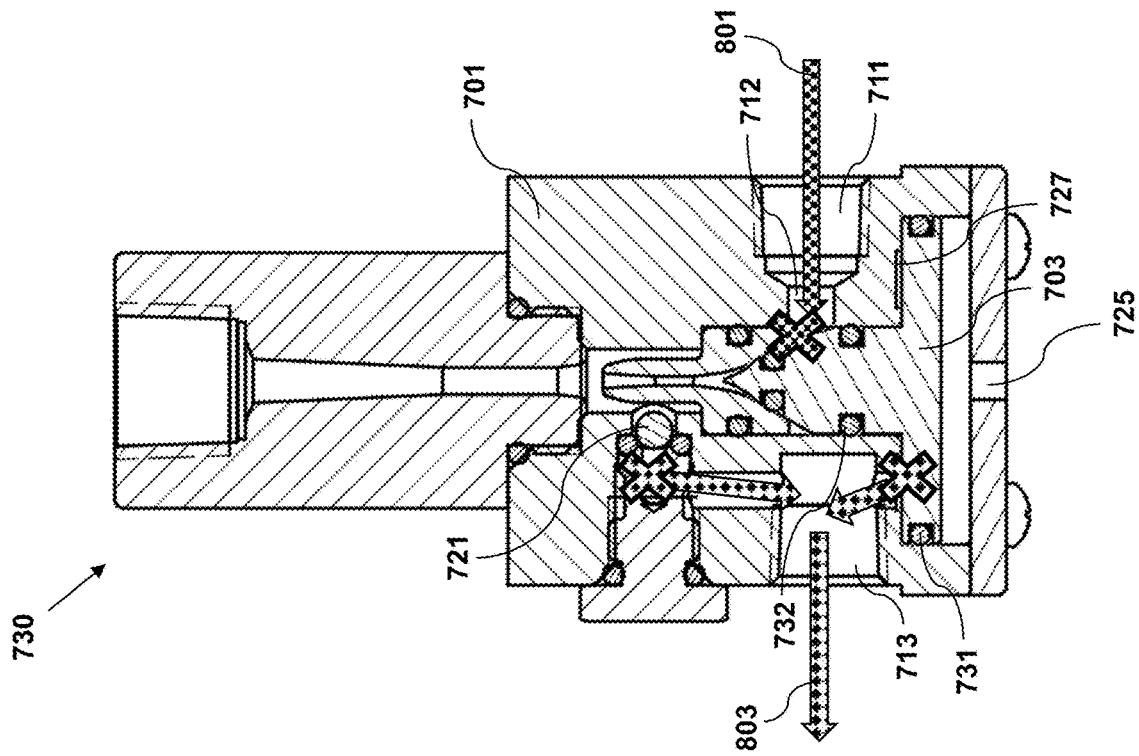
FIGS. 8C and 8D are cross-sectional views of the venturi vacuum regulator of FIG. 7B illustrating fluid flow paths with the flow control piston in a closed position.

FIGS. 8A-8D illustrate the compressed air and vacuum flow paths through the vacuum regulator 730. As discussed above, the position of the flow control piston 703 with respect to the valve housing 701 desirably dictates whether compressed air and vacuum flow paths are open or closed. FIGS. 8A and 8B illustrate the flow control piston 703 in an open configuration, meaning the flow control piston 703 is moved away from the venturi nozzle 705 (and specifically O-ring 733 is disengaged from surface 706 of venturi nozzle 705) such that compressed air flow path 801 is open. Compressed air flow path 801 starts at compressed air inlet port 711, passes through chamber 712 to the venturi nozzle 705, and into chamber 714. As discussed above, due to the venturi effect, the compressed air flow path 801 flowing through the venturi nozzle 705 desirably generates a reduction in pressure in chamber 714. The compressed air flow path 801 then flows through the nozzle 716 of the discharge housing 707 and out the discharge port 709. The discharge port 709 may be connected to a discharge pipe, a silencer, another component, or may be left unconnected.

The reduction in pressure in chamber 714 further causes a vacuum to be generated that creates vacuum flow path 803. Vacuum flow path 803 starts at vacuum port 713, travels through channel 719 into chamber 720 and the check valve seat screw 722, and through the check valve 721 into chamber 714. The flow path then proceeds out the discharge port 709 through nozzle 716, entrained with compressed air flow path 801.

As discussed above, as the level of vacuum in chamber 718 increases, the level of vacuum in chamber 724 also increases, and thus the pressure differential between breather port 725 and chamber 724 increases. Once the pressure differential is sufficiently high (e.g., high enough to overcome the downward bias of the flow control piston 703 caused by the compressed air pressure in chamber 712), the flow control piston 703 moves into the closed position, as shown in FIGS. 8C and 8D.

Figure 8C:
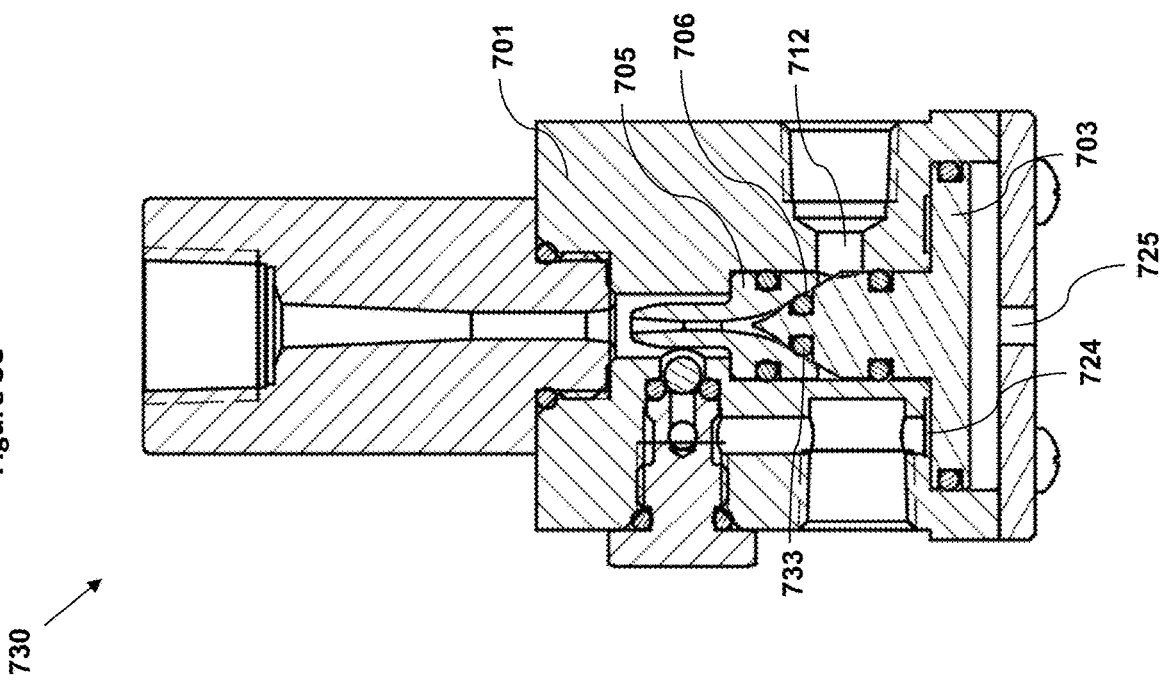

FIGS. 8C and 8B illustrate the same cross-sectional views as FIGS. 8A and 8B, except that the flow control piston 703 has moved upward to the closed position. The closed position means that the O-ring 733 is sealed against the inner surface 706 of the venturi nozzle 705, thus closing off compressed air flow path 801 at chamber 712. The vacuum flow path 803 is also desirably closed off by the check valve 721 and by O-rings 731 and 732 that seal chamber 724. Desirably, the upper surface of chamber 724 includes a space that creates a clearance between the upper surface of chamber 724 and the upper surface of the flow control piston 703, even when the flow control piston 703 is in the closed position. This space is shown as annular groove 727 in the present embodiment, but other features could also be used. Such a space can help to allow the level of vacuum present in chamber 713 to also be distributed across the flow control piston 703, even when in the closed position.

The flow control piston 703 desirably remains in the closed position of FIG. 8D until the pressure differential between chamber 724 and breather port 725 reduces sufficiently that the compressed air entering at inlet port 711 can force the flow control piston 703 back to the open position. For example, when the vacuum regulator 730 is used with the valve assembly 430 of FIG. 5A, the piston 432 may move to the extended position as shown in FIG. 6F, thus opening a pathway from the gas chamber 224 to discharge port 236, and reducing the level of vacuum present at vacuum port 713 of the vacuum regulator 730. Further, in some cases, there may be leaks in a system, and a slow leak may eventually lead to the vacuum level decreasing enough that the compressed air can force the flow control piston 703 back to the open position.

Although the position of the flow control piston 703 with respect to the valve housing 701 is primarily driven by the magnitude of the pressure differential between chamber 724 and breather port 725, the specific magnitude or range of magnitudes at which the flow control piston 703 will open or close can be adjusted in various ways. For example, the magnitude of the compressed air pressure present at inlet port 711 will have an effect on when the flow control piston 703 opens or closes. For example, a higher pressure at inlet port 711 will require a higher pressure differential between chamber 724 and breather port 725 in order to close the piston 703. Likewise, a lower pressure at inlet port 711 will require a lower pressure differential between chamber 724 and port 725 in order to close the piston 703.

Another way to adjust when the flow control piston 703 opens or closes is to adjust the relative diameters of the proximal end of the piston 703 to the distal end of the piston 703. With reference to FIGS. 9B and 9C, FIG. 9B illustrates a side view of the flow control piston 703, and FIG. 9C illustrates a cross-sectional view of the flow control piston 703. FIG. 9C illustrates that the proximal end 902 of the flow control piston 703 comprises a first diameter 901, and the distal end 904 of the flow control piston 703 comprises a second diameter 903. It can be desirable in some embodiments for the second diameter 903 to be smaller than the first diameter 901. In some embodiments, a ratio of the second diameter 903 to the first diameter 901 can be approximately 0.33. In some embodiments, a ratio of the second diameter 903 to the first diameter 901 can be approximately 0.1, 0.2, 0.3, 0.4, 0.5, 0.6, 0.7, 0.8, 0.9, 1.0, or greater. In some embodiments, the ratio of the second diameter 903 to the first diameter 901 can be within a range bounded by any of the above numbers. For example, the ratio may be within a range of 0.2 to 0.4, 0.1 to 0.5, 0.1 to 0.3, 0.3 to 0.6, or the like. Increasing the ratio can cause a higher pressure differential between the chamber 724 and breather port 725 to be required to close the flow control piston 703. Likewise, decreasing the ratio can cause a lower pressure differential between the chamber 724 and breather port 725 to be required to close the flow control piston 703.

In addition to being able to adjust the magnitude of pressure differential that is required to open or close the flow control piston 703, it can also be desirable to include some hysteresis in the system, meaning that the flow control piston 703 may not instantly close or open when a level of pressure differential between chamber 724 and breather port 725 exceeds or falls below a specific threshold. This can be beneficial, for example, in order to prevent the flow control piston 703 from fluttering back and forth and introducing undesired effects into the system and/or causing premature wear in the vacuum regulator 730 and/or other components of the system. Further, when the vacuum regulator 730 is used to supply vacuum to a fluid pump inlet dampener, such as the automatic inlet stabilizer dampener 402 of FIG. 4, it is desirable for the amount of hysteresis to be sufficient to absorb each pulse from the pump (such as pump 104 of FIG. 4) without opening and closing the flow control piston 703 in response to those pulses. For example, a certain amount of pressure fluctuation within the dampener 402 will occur with every pulse of the pump 104. This can also result in pressure fluctuations at vacuum port 713 with every pulse of the pump 104. Accordingly, the system is desirably configured to have at least enough hysteresis that these pressure fluctuations with each pulse of the pump 104 do not cause the flow control piston 703 to open and close with each pulse of the pump 104. Causing the flow control piston 703 to open and close with each pulse of the pump 104 would waste air and cause premature wear in the system.

One way to incorporate and/or control the amount of hysteresis is to control the configuration of how O-ring 733 seals against the tapered inner surface 706 of the venturi nozzle 705. For example, when the flow control piston 703 is moving from the open position (as shown in FIG. 8A) to the closed position (as shown in FIG. 8C), there will be a point at which the O-ring 733 first contacts the tapered surface 706 of the venturi nozzle 705. This point may be the start of the closed position of the flow control piston 703, although the flow control piston 703 may still be able to continue to move upward a certain additional distance, compressing the O-ring 733 as it goes, until the flow control piston 703 is mechanically stopped from further upward movement. For example, the system may be designed such that the mechanical stop is between the upper surface 910 of the proximal end 902 of the flow control piston 703 (see FIG. 9C) and surface 911 of valve housing 701 (see FIG. 9A). As another example, the system may be designed such that the mechanical stop is between one or both of distal tapered surfaces 912, 914 of the flow control piston 703 (see FIG. 9C) and the tapered surface 706 of venturi nozzle 705. When the pressure differential between chamber 724 and breather port 725 then starts to decrease, the flow control piston 703 may be able to retract or move downward toward the open position for at least a certain distance before O-ring 733 disengages from the inner surface 706 of the venturi nozzle 705 and thus opens the compressed air flow path 801 again.

Figure 9A:
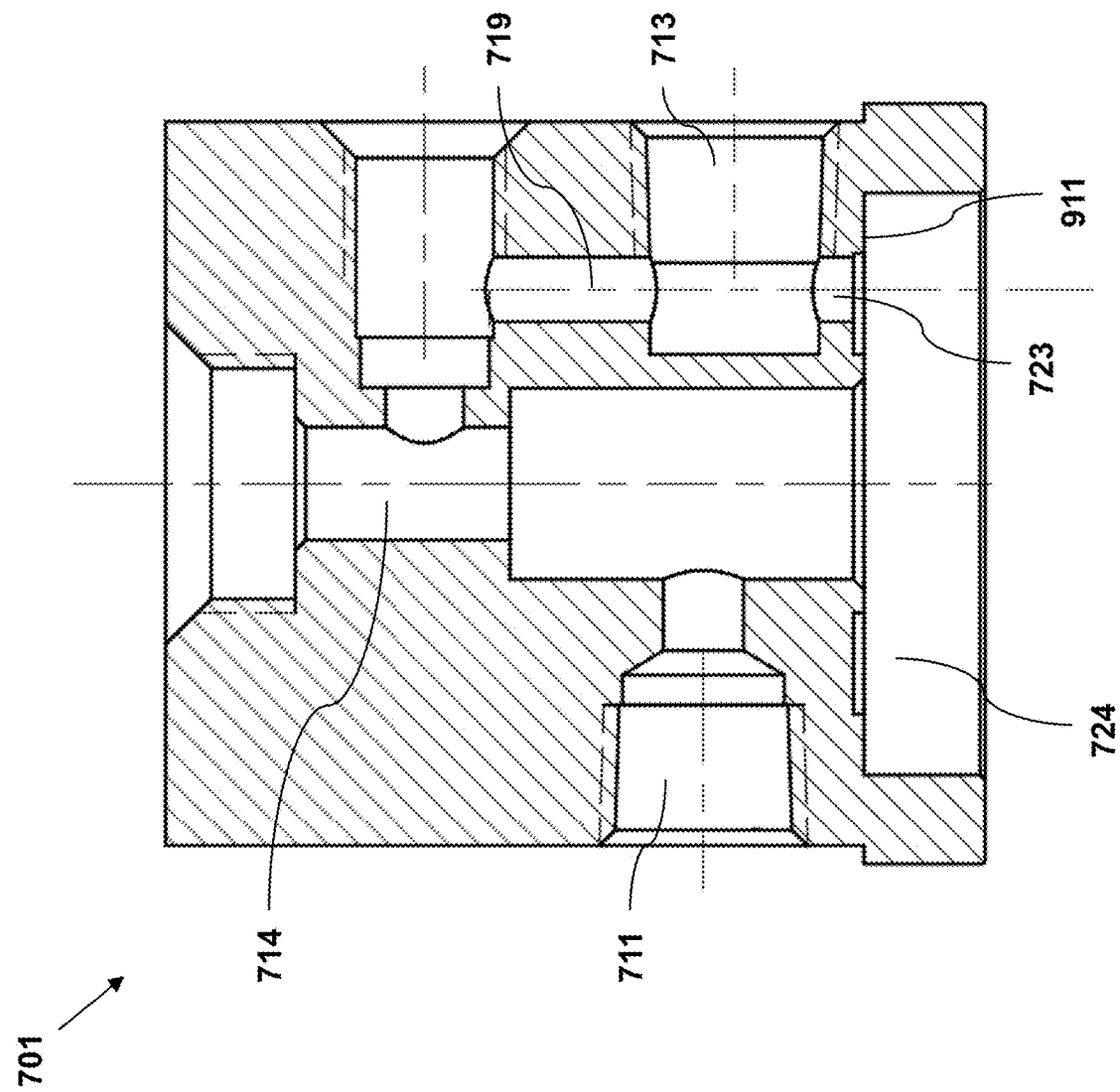
FIG. 9A is a cross-sectional view of a valve housing of the venturi vacuum regulator of FIG. 7B.
Figure 9C:
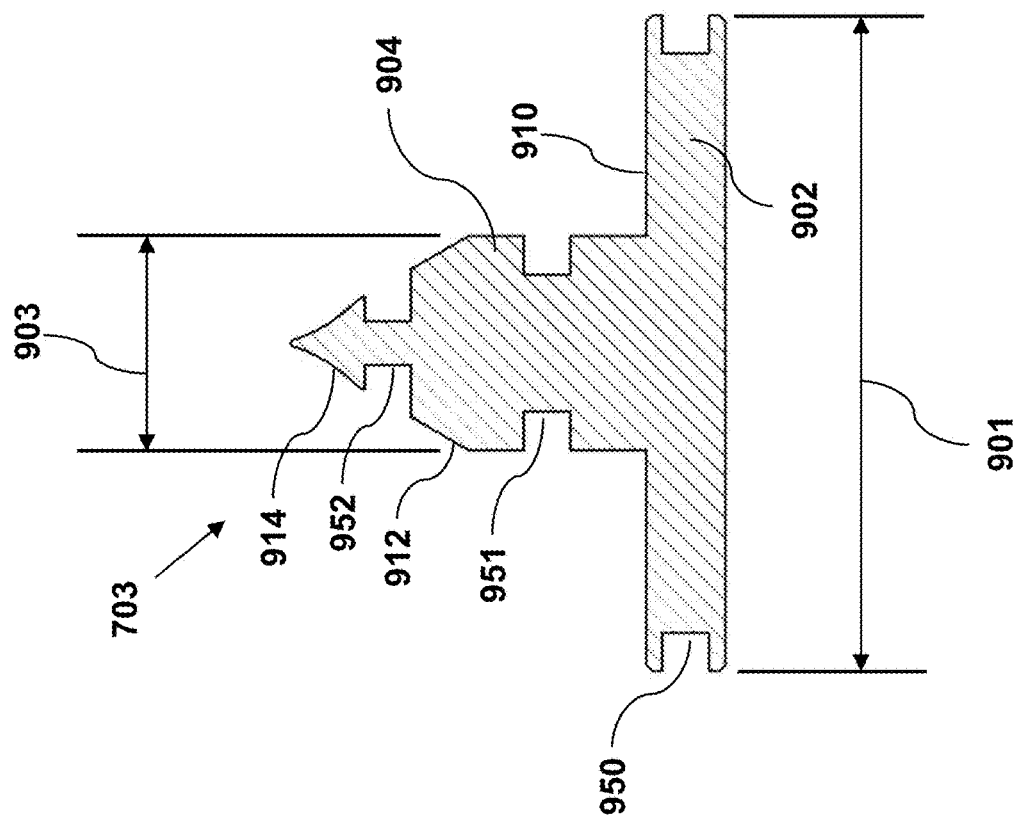
FIGS. 9B and 9C are side and cross-sectional views, respectively, of a flow control piston of the venturi vacuum regulator of FIG. 7B.
Figure 9B:
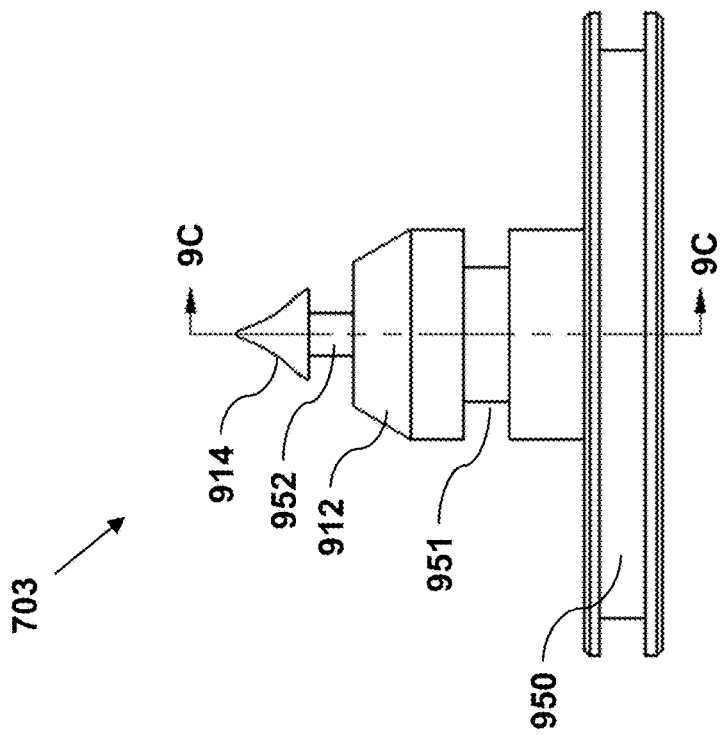
Figure 9G:
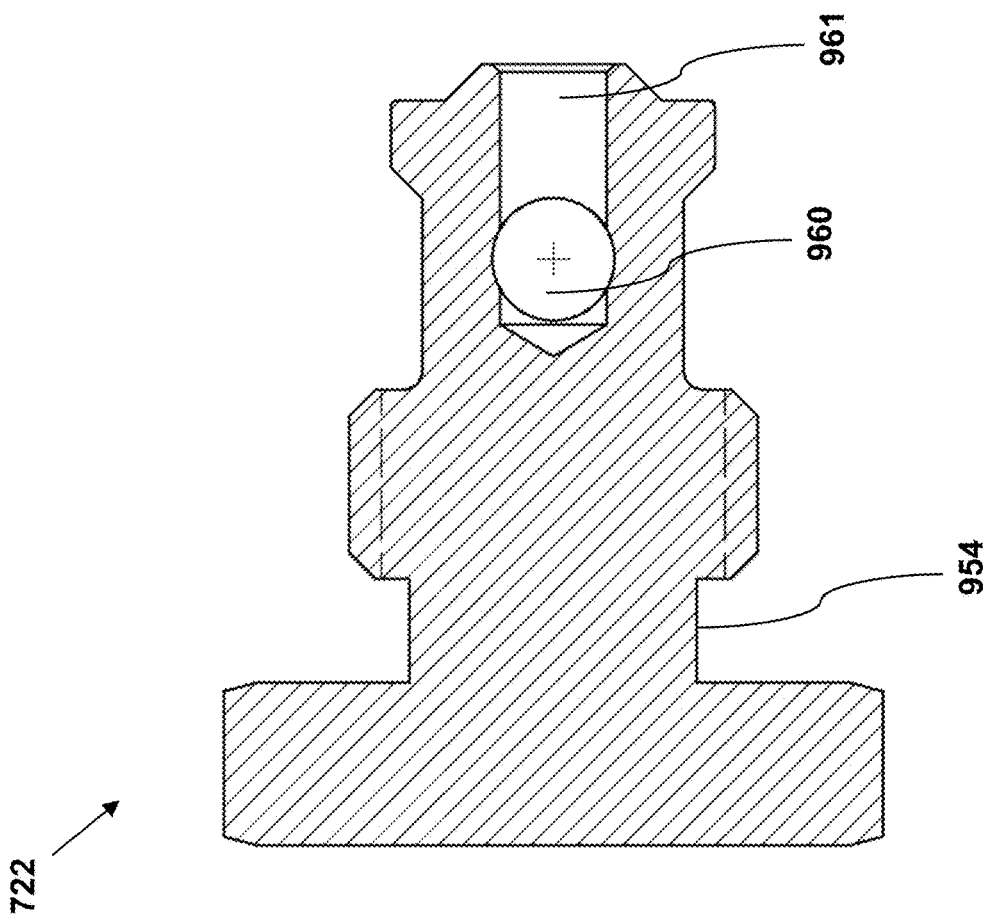
FIGS. 9F and 9G are side and cross-sectional views, respectively, of a check valve seat screw of the venturi vacuum regulator of FIG. 7B.
Figure 9F:
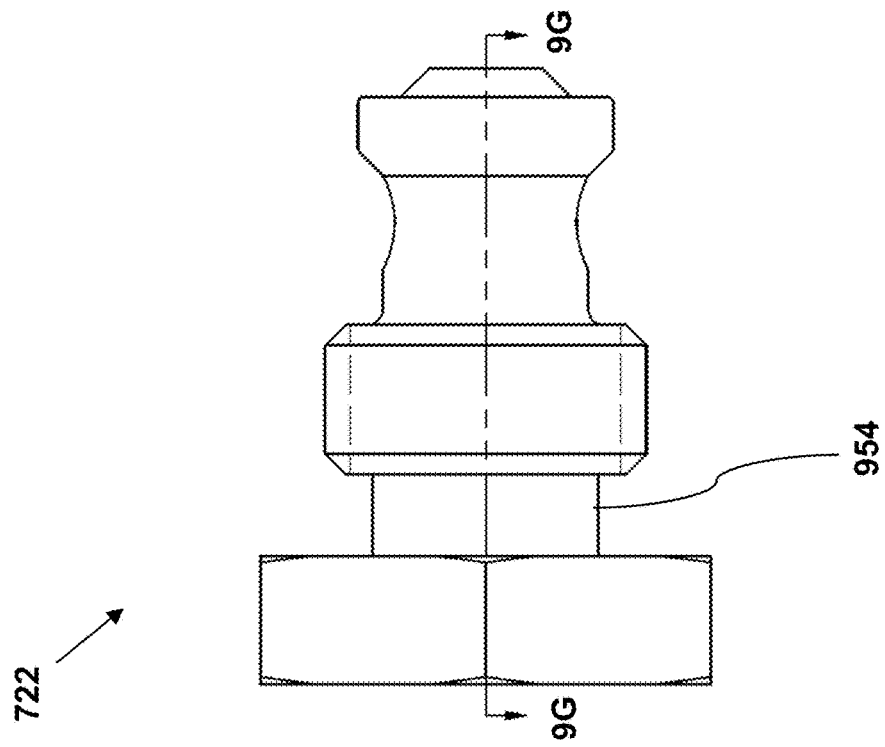

FIGS. 9A-9G illustrate additional detail of certain components of the venturi vacuum regulator 730, with the same reference numbers used to illustrate components as described above with reference to FIGS. 7A-8D. Specifically, FIG. 9A is a cross-sectional view of the valve housing 701, FIGS. 9B and 9C are side and cross-sectional views, respectively, of the flow control piston 703, FIGS. 9D and 9E are side and cross-sectional views, respectively, of the venturi nozzle 705, and FIGS. 9F and 9G are side and cross-sectional views, respectively, of the check valve seat screw 722.

With reference to FIGS. 9B and 9C, these figures further illustrate multiple grooves 950, 951, and 952 for positioning therein of O-rings 731, 732, and 733. FIGS. 9D and 9E further illustrate a groove 953 for positioning therein of O-ring 734. FIGS. 9F and 9G further illustrate a groove 954 for positioning therein of O-ring 735. FIG. 9G further illustrates two holes, channels, or orifices 960, 961 that enable fluid communication between the check valve 721 and chamber 720.

Returning to FIG. 9E, FIG. 9E further illustrates that the inner surface 706 of the venturi nozzle 705 may include a stepped taper structure that helps to smoothly accelerate the flow of air through the nozzle. For example, a first portion may comprise an angle 960 of approximately 60 degrees, while a second portion may comprise an angle 962 of approximately 14 degrees. These angles are merely examples, however, and other angles may be used. In some embodiments, the angle 960 may be adjusted to affect the hysteresis in the system. For example, a smaller angle may cause more hysteresis, while a larger angle may cause less hysteresis. In some embodiments, angle 960 may be approximately 30, 40, 50, 60, 70, or 80 degrees. In some embodiments, angle 960 may be within a range bounded by any of the above numbers, such as 50-70, 40-7, 40-60, or the like.

Additional Automatic Inlet Stabilizer Dampener

Figure 10:
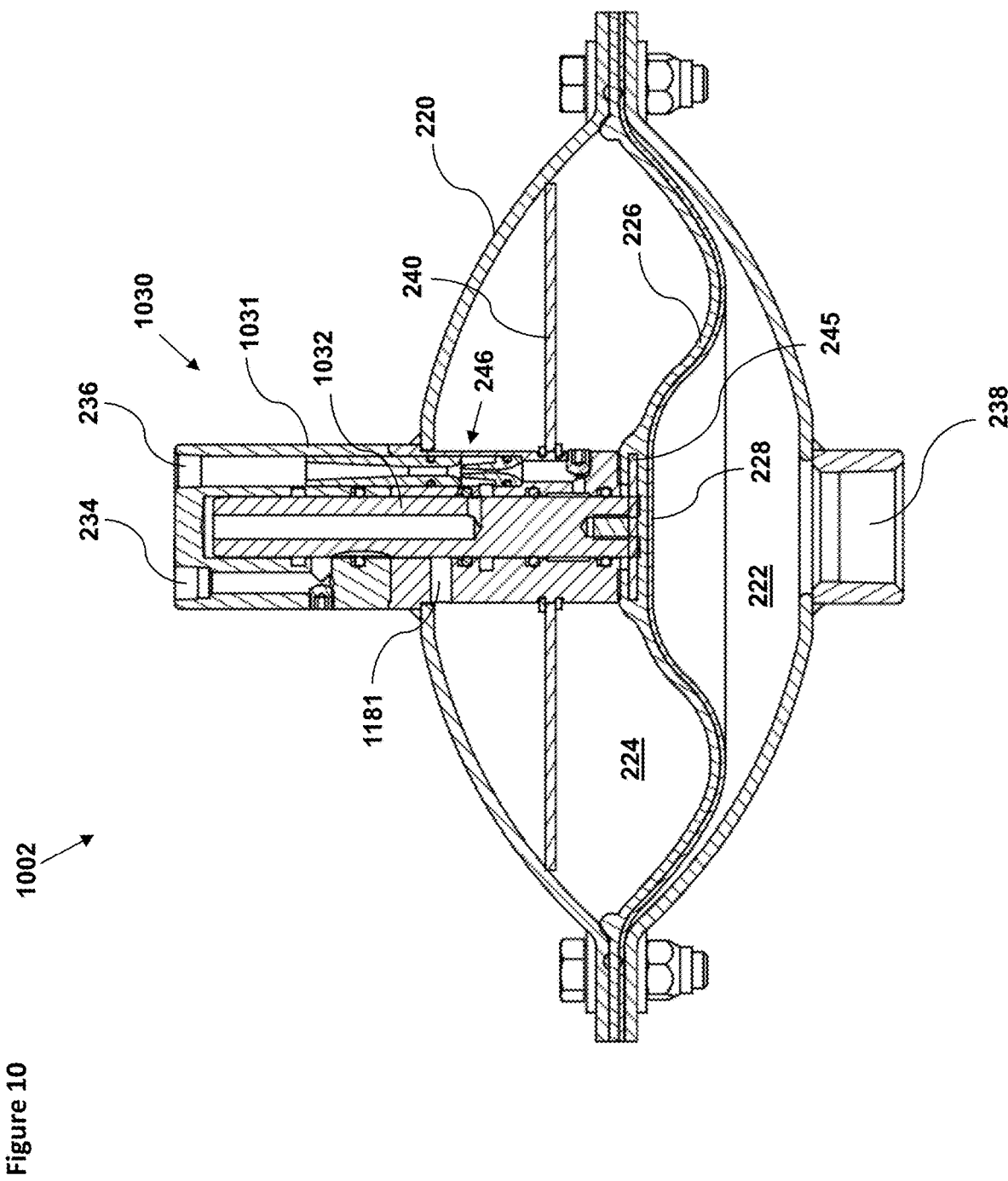
FIG. 10 is a cross-sectional view of another embodiment of an automatic inlet stabilizer dampener.

FIG. 10 illustrates a cross-sectional view of an additional example embodiment of an automatic inlet stabilizer dampener 1002. The automatic inlet stabilizer dampener 1002 is similar to the automatic inlet stabilizer dampener 102 of FIG. 2A, described above, and the same or similar reference numbers are used to refer to the same or similar features. For example, the automatic inlet stabilizer dampener 1002 includes the same enclosure 220 and bladder 226 as in the automatic inlet stabilizer dampener 102 of FIG. 2A. For clarity, the following description focuses on differences in the automatic inlet stabilizer dampener 1002 from the automatic inlet stabilizer dampener 102 described above. To the extent applicable, any features, benefits, dimensions, and/or the like discussed above with respect to the automatic inlet stabilizer dampener 102 may also apply to the automatic inlet stabilizer dampener 1002.

The automatic inlet stabilizer dampener 1002 comprises a valve assembly 1030 that is similar to the valve assembly 230 of FIG. 2A, but that has some differences. For example, the valve assembly 1030 comprises a valve housing 1031 that still includes a pressure inlet port 234 and a discharge port 236. Further, the valve assembly 1030 comprises a piston 1032 that operates similarly to the piston 232 of FIG. 2A, but with some differences, as described in further detail below.

Figure 11A:
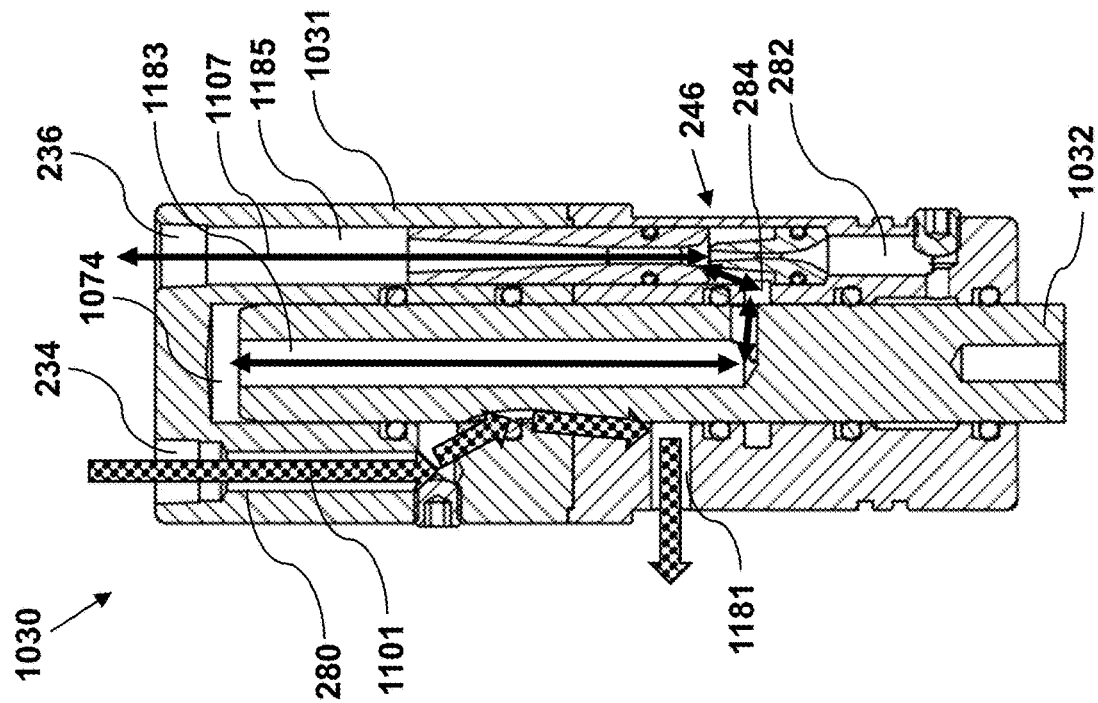
FIGS. 11A and 11B are cross-sectional views of a valve assembly of the automatic inlet stabilizer dampener of FIG. 10, illustrating fluid flow paths with a piston in a retracted position.
Figure 11B:
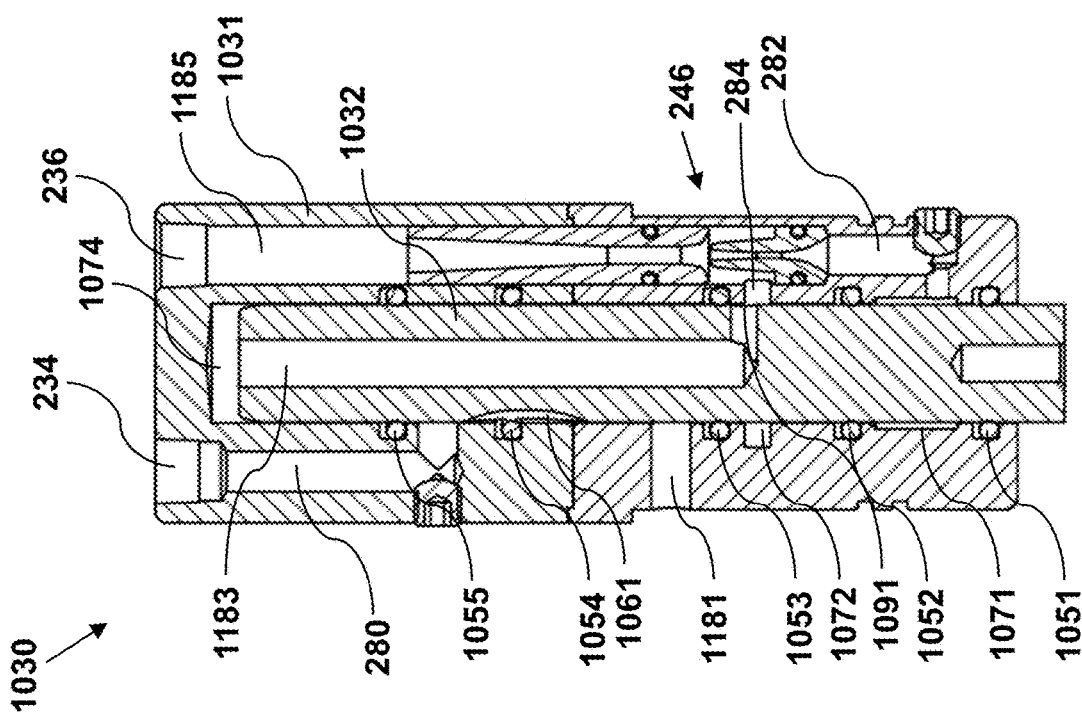
Figure 11C:
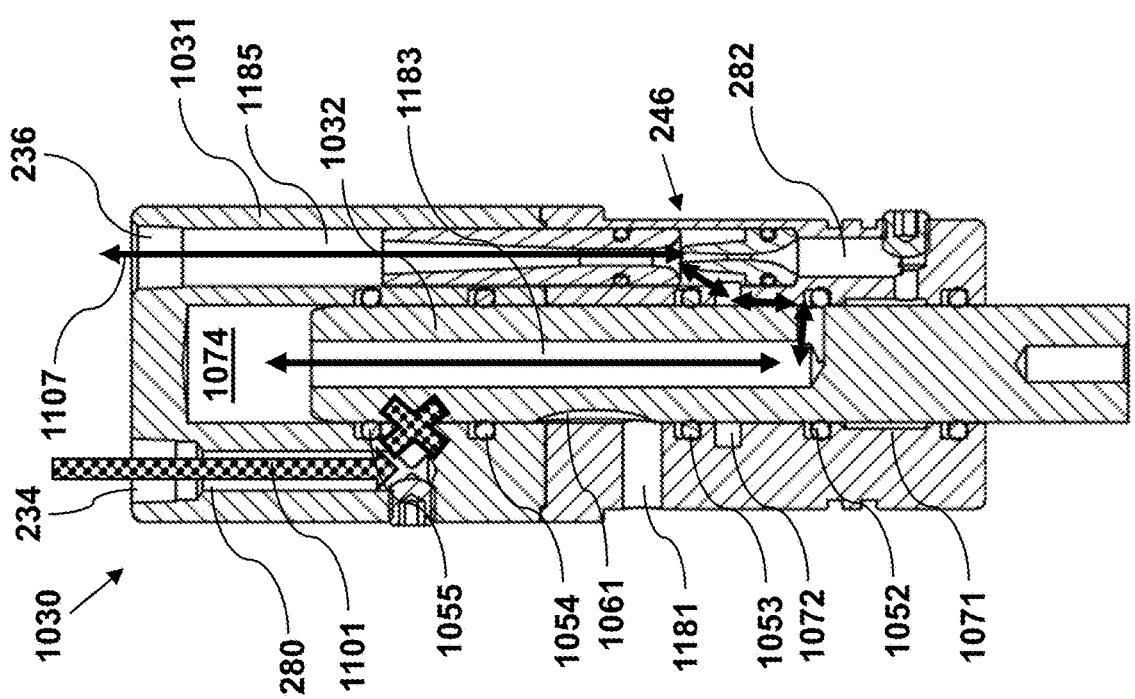
FIGS. 11C and 11D are cross-sectional views of the valve assembly of the automatic inlet stabilizer dampener of FIG. 10, illustrating fluid flow paths with the piston in an intermediate position.
Figure 11D:
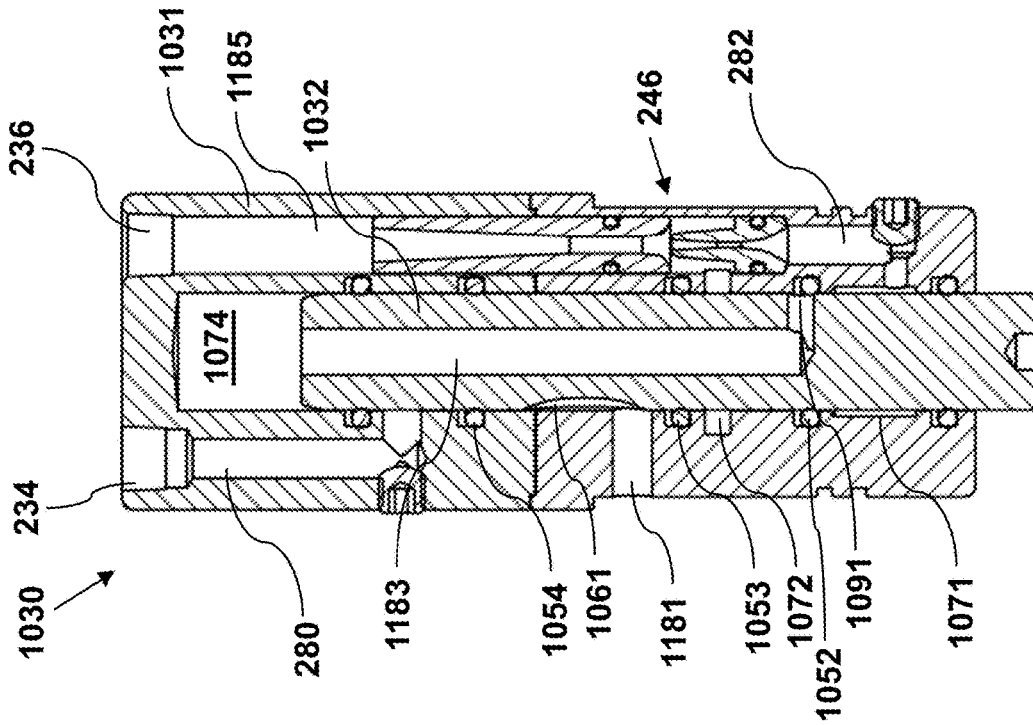
Figure 11F:
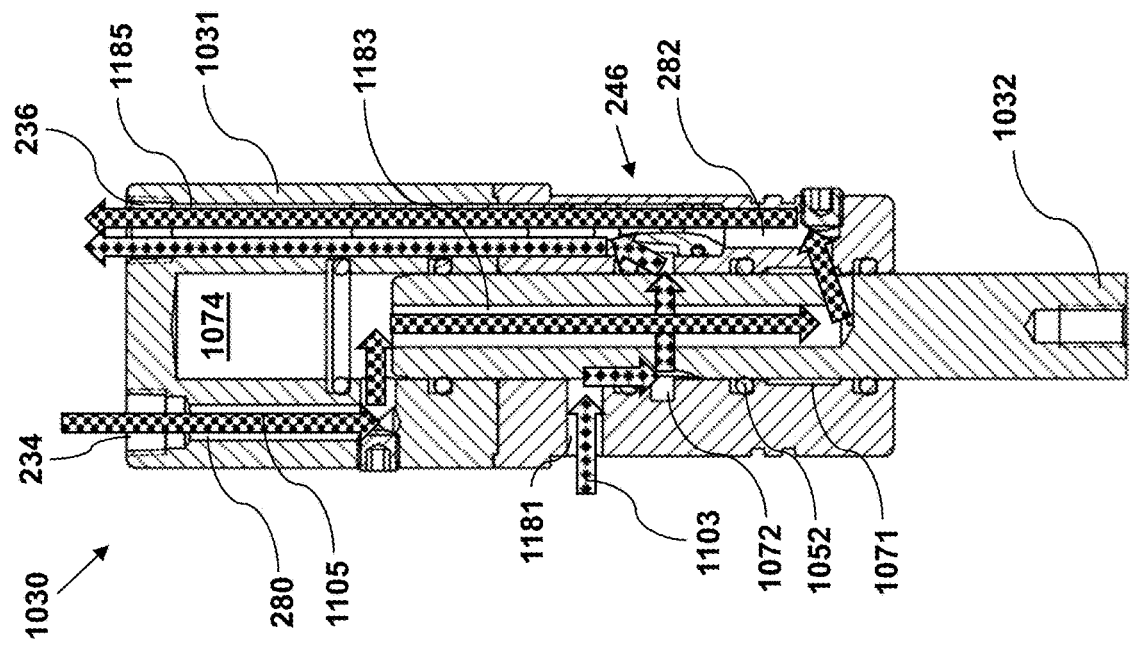
FIGS. 11E and 11F are cross-sectional views of the valve assembly of the automatic inlet stabilizer dampener of FIG. 10, illustrating fluid flow paths with the piston in an extended position.
Figure 11E:
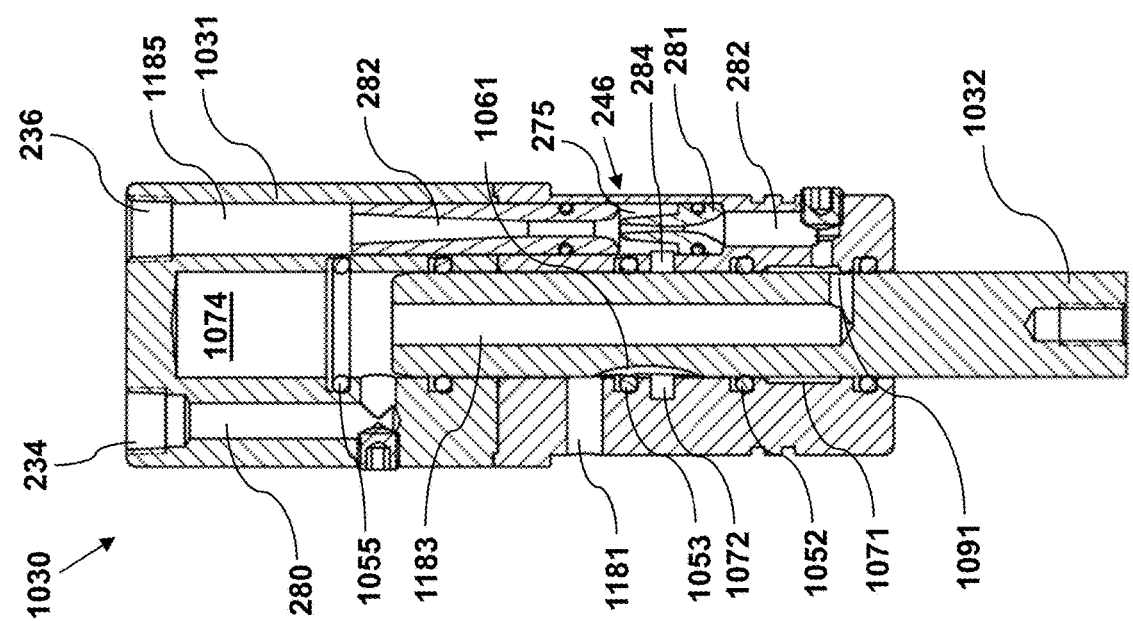

FIGS. 11A-11F illustrate cross-sectional views of the valve assembly 1030 with the piston 1032 in various positions. Specifically, FIGS. 11A and 11B illustrate the piston 1032 in a retracted position (similar to the position shown in FIGS. 3A and 3B), FIGS. 11C and 11D illustrate the piston 1032 and an intermediate position (similar to the position shown in FIGS. 3C and 3D), and FIGS. 11E and 11F illustrate the piston 1032 in an extended position (similar to the position shown in FIGS. 3E and 3F).

The valve assembly 1030 operates similarly in many respects to the valve assembly 230 described above. For example, the valve assembly 1030 comprises a plurality of selectively closable fluid flow paths, with the opening and closing of the fluid flow paths depending on the position of the piston 1032 with respect to the valve housing 1031. For example, with reference to FIG. 11B, the valve assembly 1030 comprises a compressed air flow path 1101 that allows pressurized gas to flow from the pressure inlet port 234 into the gas chamber 224 when the piston 1032 is in the retracted position. This function is similar to the compressed air flow path 301 of FIG. 3B, although the compressed air flow path 1101 follows a different route. As another example, with reference to FIG. 11D, the compressed air flow path 1101 is closed with the piston 1032 in the intermediate position, similar to how the compressed air flow path 301 is closed with piston 232 in an intermediate position as shown in FIG. 3D. Further, as another example, with reference to FIG. 11F, a second compressed air flow path 1105 is open when the piston 1032 is in an extended position, similar to how the compressed air flow path 305 is open when piston 232 is in the extended position as shown in FIG. 3E. Also, similar to the compressed air flow path 305, the compressed air flow path 1105, when open, activates the venturi vacuum generator 246 in order to generate vacuum at vacuum channel 284. This enables gas to be extracted from the gas chamber 224 through vacuum flow path 1103, similar to how gas can be extracted through vacuum flow path 303 of FIG. 3F.

As described above, the valve assembly 1030 desirably comprises three selectively openable or closable fluid flow paths 1101, 1103, and 1105 that, while routed differently, perform similar functions to the three selectively openable or closable fluid flow paths 301, 303, and 305, respectively, of the valve assembly 230. Another difference in the valve assembly 1030, however, is that the valve assembly 1030 desirably also comprises a fourth selectively openable or closable fluid flow path 1107, which is shown as a set of thick arrows in FIGS. 11B and 11D. The fluid flow path 1107 selectively fluidly couples chamber 1074 (the variable volume chamber behind the piston 1032, similar to chamber 274 of the valve assembly 230) to the discharge port 236 and/or to the atmosphere (e.g., through discharge port 236). Specifically, fluid flow path 1107 is desirably open with the piston 1032 in the retracted and intermediate positions shown in FIGS. 11B and 11D, but is desirably closed with the piston 1032 in the extended position of FIG. 11F. Further, when the piston 1032 is in the extended position of FIG. 11F, fluid flow path 1105 is desirably open, which introduces pressurized gas into the variable volume chamber 1074.

One benefit of the configuration of the valve assembly 1030 that adds the fourth fluid flow path 1107, as compared to the valve assembly 230, is that it can add some hysteresis into the system that, for example, can cause the piston 1032 to transition more quickly between the extended position of FIG. 11F and the intermediate position of FIG. 11D. For example, with reference to the valve assembly 230 discussed above, if the piston 232 is in the extended position (e.g., as shown in FIGS. 3E and 3F), the valve assembly will pull a vacuum in the dampener gas chamber 224; but, as the vacuum in the gas chamber 224 increases, the piston 232 will move up or retract and start to close off the air supply (e.g., compressed air flow path 305), causing the airflow in compressed air flow path 305 to slow down enough that less vacuum than desired may be generated by the venturi vacuum generator 246 in some cases. In the modified design of the valve assembly 1030, however, when the unit is pulling a vacuum (e.g., through vacuum flow path 1103 of FIG. 11F) and the piston 1032 moves upward or in the retract direction and starts to shut off the compressed air source (e.g., starts to close compressed air flow path 1105 of FIG. 11F when the proximal end of the piston 1032 approaches O-ring 1055), the pressure behind the piston 1032 in variable volume chamber 1074 can also start to drop. This reduces the force on the upper or proximal end of the piston 1032, making the piston 1032 less resistant to moving upward or in the retract direction and closing off the airflow completely (e.g., completely closing compressed air flow path 1105 by sealing against O-ring 1055). Such a design builds some hysteresis into the air control so that the venturi vacuum generator 246 and/or compressed air flow path 1105 will tend to turn on or off or open or close relatively quickly.

As mentioned above, the valve assembly 1030 includes at least some fluid flow paths that function similarly or at least produce a similar result as to fluid flow paths of the valve assembly 230, but that are routed differently and/or are opened or closed differently. Following is a description, with reference to FIGS. 11A-11F, of how the various fluid flow paths 1101, 1103, 1105, and 1107 are selectively opened or closed in the valve assembly 1030.

With reference to FIG. 11A, the valve assembly 1030 includes a number of seals that seal the piston 1032 to the valve housing 1031. Specifically, the valve assembly 1030 includes a first O-ring 1051, a second O-ring 1052, a third O-ring 1053, a fourth O-ring 1054, and a fifth O-ring 1055. Although the seals in this embodiment are depicted as O-rings, various other sealing members could be used. Additionally, the valve housing 1031 and piston 1032 may comprise or form a variety of grooves, channels, chambers, orifices, and/or the like that form portions of the various fluid flow paths.

With reference to FIGS. 11A and 11B, fluid flow path 1101, when open, flows from pressure inlet port 234 to channel 1181, and out of channel 1181 into the gas chamber 224 (see FIG. 10). The fluid flow path 1101 starts at the pressure inlet port 234, flows through pressure inlet channel 280, flows around O-ring 1054 through a groove 1061 in the piston 1032, and then out of the valve assembly 230 through channel 1181. In the embodiment shown in FIGS. 11A and 11B, there is desirably enough clearance between the outer diameter of the piston 1032 and the inner diameter of the wall of the valve housing 1031 that defines chamber 1074 that the flow path 1101 can pass through that space above and below the groove 1061. In some embodiments, however, the axial or longitudinal length of the groove 1061 may be such that the flow path 1101 does not need to pass through a space above and below the groove 1061, and/or a chamber similar to chamber 1071 or 1072 may be added. With reference to FIGS. 11C and 11D, the fluid flow path 1101 will be closed when the piston 1032 extends sufficiently such that groove 1061 passes O-ring 1054, and thus fluid can no longer bypass O-ring 1054 through the groove 1061.

Turning to FIGS. 11E and 11F, these figures show a configuration where fluid flow path 1103 is open. Fluid flow path 1103 flows from channel 1181 to discharge port 236, thus allowing gas to be extracted from the gas chamber 224 (see FIG. 10). The fluid flow path 1103 starts at channel 1181 and flows around O-ring 1053 through groove 1061 into chamber 1072. Chamber 1072 may, for example, comprise an annular groove or recess in the valve housing 1031 that allows fluid flow path 1103 to flow around the outside of the piston 1032 to vacuum channel 284 on the opposite side of the valve housing 1031. Once in the vacuum channel 284, the fluid flow path 1103 can then enter the venturi vacuum generator 246 and flow out of the valve assembly 230 through discharge port 236. It should be noted that the venturi vacuum generator 246 can operate similarly to and comprise the same or similar components as the venturi vacuum generator 246 shown in FIG. 2E and described above. For example, as shown in FIG. 2E, the venturi vacuum generator 246 can include a venturi nozzle 281, a chamber 275 that vacuum channel 284 leads into, and a discharge housing 282 leading to the discharge port 236 (via channel 1185). With reference to FIGS. 11C and 11D, the fluid flow path 1103 will be closed when the piston 1032 retracts sufficiently such that groove 1061 passes O-ring 1053, and thus fluid can no longer bypass O-ring 1053 through the groove 1061.

With reference to FIGS. 11E and 11F, these figures also show a configuration where fluid flow path 1105 is open. Fluid flow path 1105 flows from pressure inlet port 234 to discharge port 236 thus activating the venturi vacuum generator 246. More specifically, the fluid flow path 1105 starts at pressure inlet port 234, flows through pressure inlet channel 280, and into chamber 1074 behind the upper or proximal end of the piston 1032. The fluid flow path 1105 then flows through channel 1183 of the piston 1032 and out through an opening 1091 in a side of the piston 1032 into chamber 1071. The fluid flow path 1105 then flows through vacuum generator inlet channel 282, into the venturi vacuum generator 246, out the venturi vacuum generator 246 into channel 1185, and then out discharge port 236.

With reference to FIGS. 11C and 11D, the fluid flow path 1105 will be closed when the piston 1032 retracts sufficiently such that the upper or proximal end of the piston 1032 seals against O-ring 1055, and thus fluid can no longer flow from the pressure inlet channel 280 into the chamber 1074. In some embodiments, it can be desirable for the opening 1091 in the side of the piston 1032, the O-ring 1052, and the chamber 1071 to be positioned such that, when the upper or proximal end of the piston 1032 first engages the O-ring 1055 (e.g., in a position of the piston 1032 that is approximately halfway between the positions shown in FIGS. 11D and 11F), the portion of the fluid flow path 1105 that passes from opening 1091 to chamber 1071 and into channel 282 can remain open until the piston 1032 moves further upward such that opening 1091 passes O-ring 1052 (e.g., approximately in the position of piston 1032 shown in FIG. 11D). Such a configuration can desirably allow chamber 1074 to remain in fluid communication with the atmosphere throughout the entire stroke of the piston 1032 and/or throughout a majority of the stroke of the piston 1032, such as throughout at least 90% or 95% of the stroke of the piston 1032. In some embodiments, an axial length of opening 1091 is longer than an axial dimension of O-ring 1052, such that chamber 1074 will remain in fluid communication with the atmosphere even while opening 1091 is passing over O-ring 1052. In some embodiments, however, the opening 1091 is designed such that chamber 1074 will be sealed off from the atmosphere for at least a small portion of the stroke of the piston 1032 as opening 1091 passes over O-ring 1052. Keeping the chamber 1074 in fluid communication with the atmosphere, particularly while the compressed air flow path 1105 is being sealed off at O-ring 1055, can help to relatively quickly turn the venturi vacuum generator 246 off as the piston 1032 is retracting. Otherwise, if the chamber 1074 were sealed off from the atmosphere as the proximal or upper end of the piston 1032 is retracting and sealing against O-ring 1055, this could result in a pressure in chamber 1074 essentially working against the retraction movement of the piston 1032, and could cause the venturi vacuum generator 246 to be turned off more slowly.

In some embodiments, it may be desirable for O-ring or seal 1055 to comprise a type of seal that includes a rigid ring or other type of shape retaining member that helps to maintain the annular shape of the seal 1055 when the piston 1032 is not in contact with the seal 1055 (e.g., as shown in FIGS. 11E and 11F in the extended position of the piston 1032). This may, for example, help to keep the seal 1055 from becoming dislodged or otherwise moved into an undesirable position or shape when the piston 1032 is not in contact with the seal 1055.

With reference to FIGS. 11A and 11B, these figures show a configuration where fluid flow path 1107 is open. Fluid flow path 1107 flows from the discharge port 236 to chamber 1074. More specifically, the fluid flow path 1107 flows from the discharge port 236 through channel 1185 to the outlet of the venturi vacuum generator 246. The fluid flow path 1107 then flows through vacuum channel 284 into opening 1091 in the side of the piston 1032 that leads into channel 1183 of the piston 1032. The fluid flow path 1107 then exits the channel 1183 at the upper or proximal end of the piston 1032 into fluid chamber 1074. It should be noted that, although the fluid flow path 1107 is described as flowing from discharge port 236 to chamber 1074, when fluid flow path 1107 is open gas may flow in either direction. For example, if the piston 1032 is moving in a retraction direction, that may force gas from the chamber 1074 to the discharge port 236 in order to equalize the pressure in the chamber 1074 with the atmosphere. As another example, if the piston 1032 is moving in an extension direction, that may force gas from the discharge port 236 to the chamber 1074 in order to equalize the pressure in the chamber 1074 with the atmosphere. With reference to FIGS. 11E and 11F, the fluid flow path 1107 will be closed when the piston 1032 extends sufficiently such that the opening 1091 in the side of the piston 1032 moves beyond O-ring 1052 and thus fluid can no longer flow from the outlet or opening 1091 in the side of the piston 1032 to the vacuum channel 284. As discussed above, however, the chamber 1074 may still be in fluid communication with the atmosphere when fluid flow path 1107 is closed, such as through a portion of fluid flow path 1105.

Various other modifications, adaptations, and alternative designs are of course possible in light of the above teachings. Therefore, it should be understood at this time that within the scope of the appended claims the invention may be practiced otherwise than as specifically described herein. It is contemplated that various combinations or subcombinations of the specific features and aspects of the embodiments disclosed above may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. Thus, it is intended that the scope of the present inventions herein disclosed should not be limited by the particular disclosed embodiments described above. Moreover, while the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the various embodiments described and the appended claims. Any methods disclosed herein need not be performed in the order recited.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

What is claimed is:

1. A fluid pump inlet stabilizer dampener comprising:
   an enclosure defining an internal volume;
   a deformable diaphragm separating the internal volume into a gas chamber and a liquid chamber,
   wherein the enclosure comprises a liquid inlet port in fluid communication with the liquid chamber; and
   a valve comprising a venturi vacuum generator, a valve housing, and a piston axially slideable with respect to the valve housing, wherein a distal end of the piston is coupled to a portion of the deformable diaphragm such that movement of the deformable diaphragm will cause sliding of the piston with respect to the valve housing,
   wherein the valve defines a plurality of selectively closable fluid flow paths comprising at least:
      a first fluid flow path from a pressurized gas inlet port to the gas chamber;
      a second fluid flow path from the pressurized gas inlet port to the venturi vacuum generator; and
      a third fluid flow path from the gas chamber to the venturi vacuum generator,
   wherein the piston is configured to cooperate with a plurality of sealing members that seal the piston to the valve housing in order to selectively open or close the plurality of selectively closable fluid flow paths,
   wherein the piston is configured to be positioned at a plurality of positions with respect to the valve housing, comprising at least:
      a first position wherein the first fluid flow path is open and both of the second and third fluid flow paths are closed;
      a second position wherein the first, second, and third fluid flow paths are each closed; and
      a third position wherein the first fluid flow path is closed and both of the second and third fluid flow paths are open.

2. The fluid pump inlet stabilizer dampener of claim 1, wherein the first position of the piston comprises a retracted position.

3. The fluid pump inlet stabilizer dampener of claim 2, wherein the third position of the piston comprises an extended position.

4. The fluid pump inlet stabilizer dampener of claim 3, wherein the second position of the piston comprises a position between the retracted position and the extended position.

5. The fluid pump inlet stabilizer dampener of claim 1, wherein the piston comprises a plurality of grooves that cooperate with the plurality of sealing members by allowing fluid to flow past a sealing member of the plurality of sealing members through a groove of the plurality of grooves when the groove is positioned adjacent the sealing member.

6. The fluid pump inlet stabilizer dampener of claim 5, wherein the plurality of grooves comprises at least three grooves spaced apart along the length of the piston.

7. The fluid pump inlet stabilizer dampener of claim 6, wherein the plurality of sealing members comprises at least four sealing members spaced apart along the length of a cavity of the valve housing within which the piston slides.

8. The fluid pump inlet stabilizer dampener of claim 1, further comprising:
a variable volume chamber defined at least in part by the valve housing and the piston, the variable volume chamber configured such that movement of the piston with respect to the valve housing in an extension direction increases a volume of the variable volume chamber, and movement of the piston with respect to the valve housing in a retraction direction decreases the volume of the variable volume chamber; and
wherein the plurality of selectively closeable fluid flow paths further comprises a fourth fluid flow path from the variable volume chamber to a discharge port of the valve housing.

9. The fluid pump inlet stabilizer dampener of claim 8, wherein the fourth fluid flow path is open with the piston positioned in the first position and the second position, and the fourth fluid flow path is closed with the piston positioned in the third position.

10. The fluid pump inlet stabilizer dampener of claim 9, wherein the fourth fluid flow path passes through a channel in the piston.

11. The fluid pump inlet stabilizer dampener of claim 10, wherein the second fluid flow path also passes through the channel in the piston.

12. The fluid pump inlet stabilizer dampener of claim 9, wherein the fourth fluid flow path passes through at least a portion of the venturi vacuum generator.

13. The fluid pump inlet stabilizer dampener of claim 9, wherein the variable volume chamber is in fluid communication with the discharge port of the valve housing through a portion of the second fluid flow path when the fourth fluid flow path is closed.

14. The fluid pump inlet stabilizer dampener of claim 1, wherein the plurality of sealing members comprise O-rings.

15. The fluid pump inlet stabilizer dampener of claim 1, wherein the venturi vacuum generator comprises at least a venturi nozzle positioned within the valve housing.

16. The fluid pump inlet stabilizer dampener of claim 1, wherein the piston is configured to be axially slidable between the first position and the third position by a stroke length that is at least 0.5 times a diameter of the piston.

17. A fluid pump inlet stabilizer dampener comprising:
an enclosure defining an internal volume;
a deformable diaphragm separating the internal volume into a gas chamber and a liquid chamber,
wherein the enclosure comprises a liquid inlet port in fluid communication with the liquid chamber; and
a valve comprising a venturi vacuum generator, a valve housing, and a piston axially slideable with respect to the valve housing, wherein a distal end of the piston is coupled to a portion of the deformable diaphragm,
wherein the piston is configured to cooperate with a plurality of sealing members that seal the piston to the valve housing in order to selectively open or close a plurality of selectively closable fluid flow paths, and
wherein the piston is configured to be positioned at a plurality of positions with respect to the valve housing, comprising at least:
a first position wherein a first fluid flow path from a pressurized gas inlet port to the gas chamber is open;
a second position wherein the first fluid flow path is closed; and
a third position wherein the first fluid flow path is closed and a second fluid flow path that activates the venturi vacuum generator is open.

18. The fluid pump inlet stabilizer dampener of claim 17, wherein the second fluid flow path comprises a fluid flow path from the pressurized gas inlet port to the venturi vacuum generator.

19. The fluid pump inlet stabilizer dampener of claim 17, wherein the plurality of selectively closable fluid flow paths further comprises a third fluid flow path from the gas chamber to the venturi vacuum generator.

20. The fluid pump inlet stabilizer dampener of claim 19, wherein the third fluid flow path is configured to be open with the piston in the third position, and closed with the piston in the first position or the second position.

21. The fluid pump inlet stabilizer dampener of claim 17, further comprising:
a variable volume chamber defined at least in part by the valve housing and the piston, the variable volume chamber configured such that movement of the piston with respect to the valve housing in an extension direction increases a volume of the variable volume chamber, and movement of the piston with respect to the valve housing in a retraction direction decreases the volume of the variable volume chamber; and
wherein a fluid flow path that selectively fluidly couples the variable volume chamber to the atmosphere is open with the piston in the first position and the second position and closed with the piston in the third position.

22. The fluid pump inlet stabilizer dampener of claim 21, wherein the second fluid flow path passes through the variable volume chamber.

23. The fluid pump inlet stabilizer dampener of claim 22, wherein the variable volume chamber is in fluid communication with the atmosphere through a portion of the second fluid flow path when the fluid flow path that selectively fluidly couples the variable volume chamber to the atmosphere is closed.

24. The fluid pump inlet stabilizer dampener of claim 17, wherein the first position of the piston comprises a retracted position.

25. The fluid pump inlet stabilizer dampener of claim 24, wherein the third position of the piston comprises an extended position.

26. The fluid pump inlet stabilizer dampener of claim 25, wherein the second position of the piston comprises a position between the retracted position and the extended position.

27. The fluid pump inlet stabilizer dampener of claim 17, wherein the piston comprises a plurality of grooves that cooperate with the plurality of sealing members by allowing fluid to flow past a sealing member of the plurality of sealing members through a groove of the plurality of grooves when the groove is positioned adjacent the sealing member.

28. The fluid pump inlet stabilizer dampener of claim 27, wherein the plurality of grooves comprises at least three grooves spaced apart along the length of the piston.

29. The fluid pump inlet stabilizer dampener of claim 28, wherein the plurality of sealing members comprises at least four sealing members spaced apart along the length of a cavity of the valve housing within which the piston slides.

30. The fluid pump inlet stabilizer dampener of claim 17, wherein the piston comprises at least one groove that enables at least one of the plurality of selectively closable fluid flow paths to flow around at least one of the plurality of sealing members; and
wherein the piston comprises at least one channel that enables at least one other of the plurality of selectively closable fluid flow paths to flow through the piston.

* * * * *